(12) United States Patent
Shepherd et al.

(10) Patent No.: US 11,473,942 B2
(45) Date of Patent: Oct. 18, 2022

(54) WAVEGUIDES FOR USE IN SENSORS OR DISPLAYS

(71) Applicant: Cornell University, Ithaca, NY (US)

(72) Inventors: Robert Shepherd, Ithaca, NY (US); Huichan Zhao, Ithaca, NY (US); Rukang Huang, Ithaca, NY (US); Hedan Bai, Ithaca, NY (US); Shuo Li, Ithaca, NY (US)

(73) Assignee: Cornell University, Ithaca, NY (US)

( * ) Notice: Subject to any disclaimer, the term of this patent is extended or adjusted under 35 U.S.C. 154(b) by 881 days.

(21) Appl. No.: 16/079,798

(22) PCT Filed: Feb. 27, 2017

(86) PCT No.: PCT/US2017/019659
§ 371 (c)(1),
(2) Date: Aug. 24, 2018

(87) PCT Pub. No.: WO2017/147573
PCT Pub. Date: Aug. 31, 2017

(65) Prior Publication Data
US 2019/0056248 A1 Feb. 21, 2019

Related U.S. Application Data

(60) Provisional application No. 62/382,484, filed on Sep. 1, 2016, provisional application No. 62/299,582, filed on Feb. 25, 2016.

(51) Int. Cl.
*G01D 5/353* (2006.01)
*G01B 11/16* (2006.01)
(Continued)

(52) U.S. Cl.
CPC ........ *G01D 5/35345* (2013.01); *B25J 9/0006* (2013.01); *B25J 9/142* (2013.01);
(Continued)

(58) Field of Classification Search
CPC ........... G01D 5/35345; G01D 5/35341; G01D 5/35338; G01D 5/353; G01B 11/16;
(Continued)

(56) References Cited

U.S. PATENT DOCUMENTS 4,608,273 A * 8/1986 Brambley ............... C03C 25/12
385/128
4,701,614 A * 10/1987 Jaeger .................. G08B 13/186
250/227.14

(Continued)

OTHER PUBLICATIONS

To, C., et al., Highly Stretchable Optical Sensors for Pressure, Strain, and Curvature Measurement, International Conference on Intelligent Robots and Systems (IROS), Sep. 28, 2015-Oct. 2, 2015, pp. 5898-5903.

*Primary Examiner* — John R Lee
(74) *Attorney, Agent, or Firm* — Barnes & Thornburg LLP

(57) ABSTRACT

Waveguides, such as light guides, made entirely of elastomeric material or with indents on an outer surface are disclosed. These improved waveguides can be used in sensors, soft robotics, or displays. For example, the waveguides can be used in a strain sensor, a curvature sensor, or a force sensor. In an instance, the waveguide can be used in a hand prosthetic. Sensors that use the disclosed waveguides and methods of manufacturing waveguides also are disclosed.

40 Claims, 43 Drawing Sheets

(51) Int. Cl.
*G01L 1/24* (2006.01)
*G02B 6/42* (2006.01)
*B25J 9/14* (2006.01)
*B25J 13/08* (2006.01)
*B25J 15/00* (2006.01)
*B25J 15/12* (2006.01)
*B25J 9/00* (2006.01)
*G02B 6/10* (2006.01)

(52) U.S. Cl.
CPC ........... *B25J 13/081* (2013.01); *B25J 13/082* (2013.01); *B25J 13/084* (2013.01); *B25J 13/085* (2013.01); *B25J 13/088* (2013.01); *B25J 15/0009* (2013.01); *B25J 15/12* (2013.01); *G01B 11/16* (2013.01); *G01L 1/242* (2013.01); *G02B 6/10* (2013.01); *G02B 6/4202* (2013.01); *G01L 1/24* (2013.01)

(58) Field of Classification Search
CPC ........ G01B 11/18; G02B 6/10; G02B 6/4202; G02B 6/4203; G02B 1/045; G02B 1/046; G02B 6/138; G02B 1/048; G02B 6/3502; G01M 11/086; B25J 9/0006; B25J 9/142; B25J 13/081; B25J 13/082; B25J 13/084; B25J 13/085; B25J 13/088; B25J 15/0009; B25J 15/12; G01L 1/242; G01L 1/243; G01L 1/245; G01L 1/241; G01L 1/24
See application file for complete search history.

(56) References Cited

U.S. PATENT DOCUMENTS

| | | | |
|---|---|---|---|
| 4,830,461 A | 5/1989 | Ishiharada et al. | |
| 4,915,473 A | 4/1990 | Haese et al. | |
| 4,936,649 A * | 6/1990 | Lymer | G01M 5/0091 156/158 |
| 5,118,931 A * | 6/1992 | Udd | G01D 5/35383 250/227.16 |
| 5,222,165 A * | 6/1993 | Bohlinger | G02B 6/264 250/227.16 |
| 5,367,597 A * | 11/1994 | Palmskog | G02B 1/048 385/129 |
| 5,898,810 A | 4/1999 | Devens, Jr. et al. | |
| 6,766,091 B2 | 7/2004 | Beuth et al. | |
| 6,788,864 B2 | 9/2004 | Ahmad et al. | |
| 7,324,093 B1 | 1/2008 | Gettemy et al. | |
| 7,397,991 B1 | 7/2008 | Register | |
| 7,496,247 B2 | 2/2009 | Kuang et al. | |
| 7,787,733 B2 | 8/2010 | DiGiovanni et al. | |
| 8,215,179 B2 * | 7/2012 | Ohl | G01D 5/35316 73/800 |
| 2005/0205885 A1 | 9/2005 | Nakagawa et al. | |
| 2008/0128929 A1 | 6/2008 | Colombo et al. | |
| 2008/0181556 A1* | 7/2008 | Borgos | A61B 5/02108 385/13 |
| 2008/0200994 A1 | 8/2008 | Colgate et al. | |
| 2011/0280277 A1* | 11/2011 | Chung | G01K 11/32 374/137 |
| 2014/0056566 A1 | 2/2014 | Guillemette et al. | |
| 2014/0264400 A1* | 9/2014 | Lipson | H01L 33/58 257/88 |
| 2017/0241765 A1* | 8/2017 | Adie | G01B 9/02012 |
| 2018/0196577 A1* | 7/2018 | Li | G06F 3/045 |
| 2018/0297214 A1* | 10/2018 | Lessing | G01T 7/00 |
| 2019/0056248 A1* | 2/2019 | Shepherd | B25J 9/142 |
| 2019/0390985 A1* | 12/2019 | Kwok | G02B 6/02076 |
| 2020/0158544 A1* | 5/2020 | Harnett | G02B 6/02295 |
| 2020/0313379 A1* | 10/2020 | Chen | G02B 7/004 |
| 2020/0400886 A1* | 12/2020 | Xu | G02B 6/125 |
| 2021/0003388 A1* | 1/2021 | Shepherd | G02B 6/1221 |
| 2021/0055171 A1* | 2/2021 | Harnett | G02B 6/02 |

* cited by examiner

WAVEGUIDES FOR USE IN SENSORS OR DISPLAYS

CROSS-REFERENCE TO RELATED APPLICATIONS

This application claims priority to the provisional patent application filed Feb. 25, 2016 and assigned U.S. Appl. No. 62/299,582, the disclosure of which is hereby incorporated by reference. This application also claims priority to the provisional patent application filed Sep. 1, 2016 and assigned U.S. Appl. No. 62/382,484, the disclosure of which is hereby incorporated by reference.

FIELD OF THE DISCLOSURE

This disclosure relates to waveguides and, more particularly, to waveguides that can be used in sensors or displays.

BACKGROUND OF THE DISCLOSURE

Waveguides, such as light guides, can confine and guide waves. This can enable waves, such as optical waves, to be transported over a distance. Waveguides have many uses, including in sensors.

Soft robotics is an emerging area that shows great potential to serve as exoskeletons, because of the intrinsic compliance of soft robotics, which is an important feature for safe human-machine interaction. Soft robotic systems composed of organic elastomers have an intrinsic compliance that has demonstrated its potential as wearable devices because of their conformability, safety, and comfort. The intrinsic compliance stems from the material's low elastic modulus, which is comparable to bio-tissues. Though intrinsically compliant actuators like McKibben Artificial Muscles have existed for decades, new designs of fluidically-powered elastomeric actuator (FEAs) have shown great potential as wearable orthotics. However, a lack of compliant sensors that are reliable, easy to incorporate, and inexpensive limits application of soft robotics.

For wearable soft actuators, bending is the most commonly used motion as they work by driving the joints to move. Therefore, a bending curvature sensor may be required because curvature is the direct variable to be controlled. However, it is difficult to manufacture such a curvature sensor that is accurate, reliable, and affordable.

Current hand orthotics under development usually serve two functions: (1) rehabilitation training or (2) assisting activities of daily living. Both of these uses require safe, reliable, and predictable performance and feedback control systems. Despite increasing sophistication in the design and fabrication of FEAs, the sensing and control of these actuators are still nascent. A prime reason for the lag in control sophistication is the high nonlinearity of these systems and relatively specialized fabrication required for soft sensors. Though compliant and stretchable sensors have been developed for FEAs, open-loop control is still the most commonly used method for their operation. Many control systems require higher accuracy, repeatability and resolution than presently available. Besides simple open loop control, some other control methods for FEAs include adaptive control, real-time finite element method and vision-based proportional-integral-derivative (PID) control. Adaptive control has been applied to McKibben Muscles, which is essentially a linear actuator, but not bending FEAs. A real-time finite element method can give a good estimate of the actuator's behavior, but this method requires sufficient knowledge of the system to perform accurate simulations. Traditional PID feedback control based on computer vision has been applied to hydraulic FEAs, yet this method requires external cameras that limit the potential mobility of the wearer.

Fluidically-powered soft actuators have shown potential as prosthetics and orthotics. These devices, compared with motor-driven counterparts, are lighter, undergo continuous and more natural deformation with simple control inputs, are easier to fabricate, and, due to their liquid phase processing, are more likely to be realized in mass production (e.g., injection molding). Very few soft prosthetics, however, have demonstrated equivalent sensing ability as rigid linkage based hand prosthetics, which many times achieve proprioceptive sensing through motor motion encoders and realize tactile sensing through thin-film force sensors. On the contrary, fluidically driven soft systems operate via stretching of their bodies at strains, $e=L-L_0/L$, of typically >50%. Most existing sensors are incompatible with these strains and, while efforts are being made in the area of developing stretchable sensors for soft actuators, there is still an opportunity for reliable, easy to fabricate, safe, and chemically stable ones.

Attempting to improve performance, a stretchable optical waveguide coated with a thin coating of a reflective metal layer on the outer walls was tested. Emitted light was internally reflected without loss due to the encapsulating reflective walls. However, micro-cracks would form in the reflective layer as the waveguide deformed because the reflective layer would not stretch. The micro-cracks enabled light to escape, which is related to the deformation applied to the waveguide. Thus, the reflective layer would not ensure total reflection, meaning light loss occurred along the interface. The reflective layer was made from materials like gold, which is expensive and needs extra application steps. Furthermore, the micro-cracks are formed randomly instead of in a controlled manner, which will increase noise when working as a sensor.

Therefore, an improved waveguide is needed.

BRIEF SUMMARY OF THE DISCLOSURE

Waveguides, such as light guides, and methods of making and using them are disclosed. In a first embodiment, an apparatus with an optical waveguide having at least two elastomer materials is disclosed. The elastomers in the optical waveguide are lossy and more light is lost to an environment as deformation of the optical waveguide increases. In a second embodiment, a sensor with a light guide that includes at least one indent on the outer surface of the light guide is disclosed. The light guide is disposed between a light source and a photodetector, wherein a first point of the light guide is in optical communication with the light source and a second point of the light guide is in optical communication with the photodetector. These improved waveguides can be used in, for example, sensors, soft robotics, displays, or other devices. Applications for the waveguides, such as sensors or displays, are disclosed. In an instance, the waveguides can be used in a strain sensor, a curvature sensor, or a force sensor. In another instance, the waveguide can be used in a hand prosthetic. Methods for making and using the waveguides also are disclosed.

The following Statements are presented for illustrative purposes and are not intended to be limiting. Other embodiments, combinations, and variations are possible.

Statement 1. An apparatus comprising an optical waveguide that includes at least two elastomer materials, wherein the elastomer materials are lossy and more light is lost to an environment as deformation of the optical waveguide increases.

Statement 2. An apparatus according to Statement 1, wherein the elastomer materials have a difference in refractive index greater than or equal to 0.0001.

Statement 3. An apparatus according to Statement 2, wherein the difference in refractive index is from 0.001 to 1.

Statement 4. An apparatus according to Statement 2, wherein the difference in refractive index is from 0.003 to 1.

Statement 5. An apparatus according to Statement 2, wherein the difference in refractive index is from 1 to 2.

Statement 6. An apparatus according to Statement 2, wherein the difference in refractive index is from 0.001 to 2.

Statement 7. An apparatus according to Statement 6, wherein the difference in refractive index is from 0.001 to 1.

Statement 8. An apparatus according to Statement 2, wherein the difference in refractive index is from 0.003 to 2.

Statement 9. An apparatus according to Statement 8, wherein the difference in refractive index is from 0.003 to 1.

Statement 10. An apparatus according to Statement 2, wherein the difference in refractive index is 0.06.

Statement 11. An apparatus according to one of Statements 1-10, wherein the optical waveguide is entirely fabricated of the elastomer materials.

Statement 12. An apparatus according to one of Statements 1-11, wherein the optical waveguide is a step index multimode optical fiber.

Statement 13. An apparatus according to one of Statements 1-12, wherein the optical waveguide has a core/cladding interface roughness that includes features having dimensions from 1 nm to 500 nm.

Statement 14. An apparatus according to one of Statements 1-13, wherein the elastomer materials include synthetic rubbers, natural latex rubbers, or biodegradable materials.

Statement 15. An apparatus according to Statement 14, wherein one or more of the elastomer materials includes at least one functional group grafted onto at least one main chain of the elastomer material to modify optical properties of a core and/or a cladding.

Statement 16. An apparatus according to Statement 14, wherein colloids or particles are mixed into pre-polymers of one or more of the elastomer materials to adjust a refractive index.

Statement 17. An apparatus according to Statement 14, wherein colloids or particles are mixed into pre-polymers of one or more of the elastomer materials to selectively control light emission.

Statement 18. An apparatus according to one of Statements 1-17, wherein the elastomer materials are polyurethane rubber and a silicone composite.

Statement 19. An apparatus according to one of Statements 1-18, wherein ultimate elongation of the optical waveguide is greater than 50%.

Statement 20. An apparatus according to one of Statements 1-19, wherein ultimate elongation of the optical waveguide is 400%.

Statement 21. An apparatus according to one of Statements 1-19, wherein ultimate elongation of the optical waveguide is 700%.

Statement 22. An apparatus according to one of Statements 1-19, wherein ultimate elongation of the optical waveguide is 1000%.

Statement 23. An apparatus according to of one of Statements 1-22, wherein the optical waveguide is stretchable, non-metallic, and crack-resistant.

Statement 24. An apparatus according to one of Statements 1-23, wherein the optical waveguide further includes a coating around at least part of the optical waveguide, wherein the coating is configured to contain light within the light guide.

Statement 25. An apparatus according to Statement 24, wherein the coating is configured to be stretchable, non-metallic, crack-resistant, and includes a dopant with a high index of refraction.

Statement 26. An apparatus according to one of Statements 1-25, wherein the optical waveguide does not include a coating around at least part of the optical waveguide.

Statement 27. An apparatus according to one of Statements 1-26, wherein the optical waveguide defines a flat region or a disc-shaped region.

Statement 28. An apparatus according to one of Statements 1-27, wherein the optical waveguide has a length from 1 cm to 10 m.

Statement 29. An apparatus according to one of Statements 1-28, wherein the optical waveguide is 3D printed or molded.

Statement 30. An apparatus according to one of Statements 1-29, further comprising a light source and a photodetector.

Statement 31. An apparatus according to Statement 30, wherein the light source is a light-emitting diode.

Statement 32. An apparatus according to Statement 30, wherein the optical waveguide, the light source, and the photodetector are configured for use in one or more of a strain sensor, a curvature sensor, or a force sensor.

Statement 33. A sensation system for a prosthetic comprising the apparatus of one of Statements 30-32.

Statement 34. A sensation system according to Statement 33, wherein the prosthetic includes a prosthetic hand.

Statement 35. A display comprising the apparatus of one of Statements 1-29.

Statement 36. A stretchable display comprising the apparatus of one of Statements 1-29, wherein the display includes a plurality of flexible panels, wherein at least one of the optical waveguide is disposed between the flexible panels, and wherein the flexible display includes a light source disposed on an end of the optical waveguide.

Statement 37. A method comprising: forming a mold for a cladding; pouring pre-elastomer cladding material into the mold; curing the pre-elastomer cladding material in the mold; peeling the cladding from the mold; filling the cladding with pre-elastomer core material; and pouring the pre-elastomer cladding material to enclose the pre-elastomer core material.

Statement 38. A method according to Statement 37, further comprising casting holes at each end of a waveguide formed from the pre-elastomer cladding material and the pre-elastomer core material.

Statement 39. A method according to one of Statement 37 or 38, wherein the forming includes 3D printing.

Statement 40. A method according to one of Statements 37-39, further comprising connecting a light source and a photodetector to a waveguide formed from the pre-elastomer cladding material and the pre-elastomer core material.

Statement 41. A method according to one of Statements 37-40, wherein the pre-elastomer core material is polyurethane rubber.

Statement 42. A method according to one of Statements 37-41, wherein the pre-elastomer cladding material is a silicone composite.

Statement 43. A method according to one of Statements 37-42, further comprising: forming a plurality of a waveguide formed from the pre-elastomer cladding material and the pre-elastomer core material; and casting each of the waveguides into a finger actuator using over molding, wherein a body of the finger is a silicone.

Statement 44. A sensor comprising: a light source; a photodetector; and a light guide disposed between the light source and the photodetector, wherein the light guide defines at least one indent on an outer surface of the light guide, wherein a first point of the light guide is in optical communication with the light source and a second point of the light guide is in optical communication with the photodetector.

Statement 45. A sensor according to Statement 44, wherein the indent comprises a zebra crossing.

Statement 46. A sensor according to one of Statement 44 or 45, wherein the light guide is u-shaped.

Statement 47. A sensor according to one of Statements 44-46, wherein the light source is a light-emitting diode.

Statement 48. A sensor according to one of Statements 44-47, wherein the light guide is a fiber optic wire.

Statement 49. A sensor according to one of Statements 44-48, wherein the light guide is configured to provide greater than or equal to 1% transmission of light.

Statement 50. A sensor according to one of Statements 44-49, wherein the light guide is tube-shaped.

Statement 51. A sensor according to one of Statements 44-50, wherein the light guide further includes a coating around at least part of the light guide, wherein the coating is configured to contain light within the light guide.

Statement 52. A sensor according to Statement 51, wherein the coating is configured to be stretchable, non-metallic, crack-resistant, and includes a dopant with a high index of refraction.

Statement 53. A sensor according to one of Statements 44-52, wherein the light guide comprises a plurality of the indents, and wherein each of the indents is from 0.5 mm to 4 mm in length and spaced at intervals from 0.5 mm to 4 mm.

Statement 54. A sensor according to one of Statements 44-53, wherein a depth of the indents from an outer surface of the light guide is from 100 nm to 1 mm.

Statement 55. A sensor according to one of Statements 44-54, wherein the sensor is configured to sense at least one of curvature, force, strain, elongation, or pressure.

Statement 56. A device comprising: the sensor of one of Statements 44-55 and a soft actuator.

Statement 57. A device according to Statement 56, wherein the soft actuator completely encloses the light source, the photodetector, and the light guide.

Statement 58. A device according to Statement 56 or 57, wherein the light source is disposed in the soft actuator at a first end and the photodetector is disposed in the soft actuator at the first end.

Statement 59. A device according to one of Statements 56-58, wherein the light guide is u-shaped.

Statement 60. A device according to one of Statements 56-59, wherein the soft actuator is an elastomeric actuator.

Statement 61. A device according to one of Statements 56-60, wherein the soft actuator defines a plurality of chambers.

Statement 62. A device according to Statement 61, wherein the actuator further comprises nylon mesh on a side of each of the chambers.

Statement 63. A method comprising: shaping a light guide; heating the light guide after the shaping; forming at least one indent on an outer surface of the light guide after the heating; assembling a light source, a photodetector, and the light guide within a mold for a soft actuator after the forming; and casting the soft actuator after the assembling.

Statement 64. A method according to Statement 63, wherein the shaping comprises bending the light guide into a u-shape.

Statement 65. A method according to Statement 63 or 64, wherein the heating is at a temperature of at least 50° C. for at least 45 minutes.

Statement 66. A method according to one of Statements 63-65, wherein the casting comprises at least one of rotational casting and injection molding.

Statement 67. A method according to one of Statements 63-66, wherein the forming the at least one indent comprises at least one of engraving, sand blasting, bead blasting, tooling, grinding, and acid etching.

Statement 68. A method according to Statement 67, wherein the engraving comprises using a laser.

Statement 69. A method according to Statement 67, wherein the tooling comprises using a razor.

Statement 70. A method comprising: illuminating a waveguide with a light input at a first power level; measuring light output from the waveguide, wherein the light output is at a second power level less than the first power level; and determining a position on the waveguide where a strain was applied based on the first power level, second power level, total length of the waveguide, and the attenuation coefficient of material in the waveguide.

Statement 71. A method according to Statement 70, wherein the waveguide is the optical waveguide of Statement 1.

Statement 72. A method according to Statement 70, wherein the waveguide is the light guide of Statement 44, and wherein the illuminating and measuring use the light source and the photodetector of Statement 44.

DESCRIPTION OF THE DRAWINGS

For a fuller understanding of the nature and objects of the disclosure, reference should be made to the following detailed description taken in conjunction with the accompanying drawings.

Figure 48:
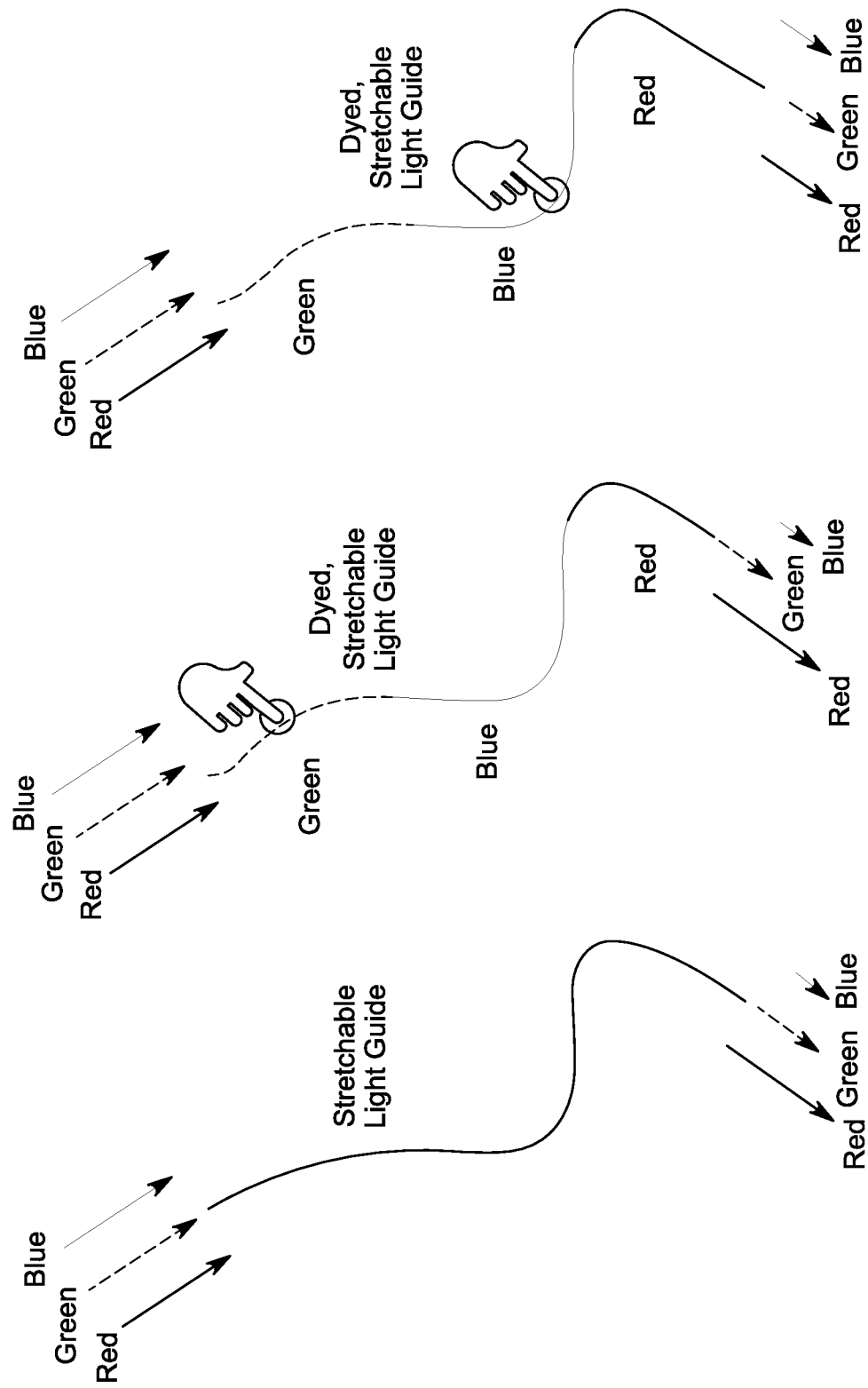

FIG. 48 is a diagram showing pressure being applied to different points on a waveguide.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure.

Improved waveguides, such as light guides, are disclosed. These improved waveguides can be used in, for example, sensors or soft robotics. Methods of manufacturing waveguides also are disclosed.

Waveguide Entirely Made of Elastomeric Material

In an embodiment, a waveguide made entirely of elastomeric material is disclosed. A sensor, such as one on the scale of a human hand, can use an optical waveguide made entirely of elastomeric material. This waveguide is fabricated to be intentionally lossy. Thus, as light propagates through it, some is lost to the environment. The more the waveguide is deformed, the more light is lost. The amount of light loss is an output signal for strain. The waveguide can be stretchable, non-metallic, and crack-resistant.

In an example, the sensory waveguide is a step index multimode optical fiber include of a high index of refraction ($n_{core}$) core (e.g., approximately 1.46) with cross sectional area ($A_{core}$) of, for example, approximately 1 mm×1 mm clad with a lower index of refraction ($n_{clad}$) elastomer (e.g., approximately 1.40) with cross-sectional area of ($A_{clad}$) of, for example, approximately 3 mm×3 mm. Other values for indices of refraction or cross sectional areas are possible. Any two elastomers with different refractive indices can be used. A larger index contrast may be preferred to ensure a bigger acceptance angle, though smaller index contrasts are acceptable. In an instance, the waveguide has dimensions from 100 μm to 1 cm, including all ranges and values to the 1 μm between. The refractive index difference can be any value of 0.0001 or greater.

Figure 28:
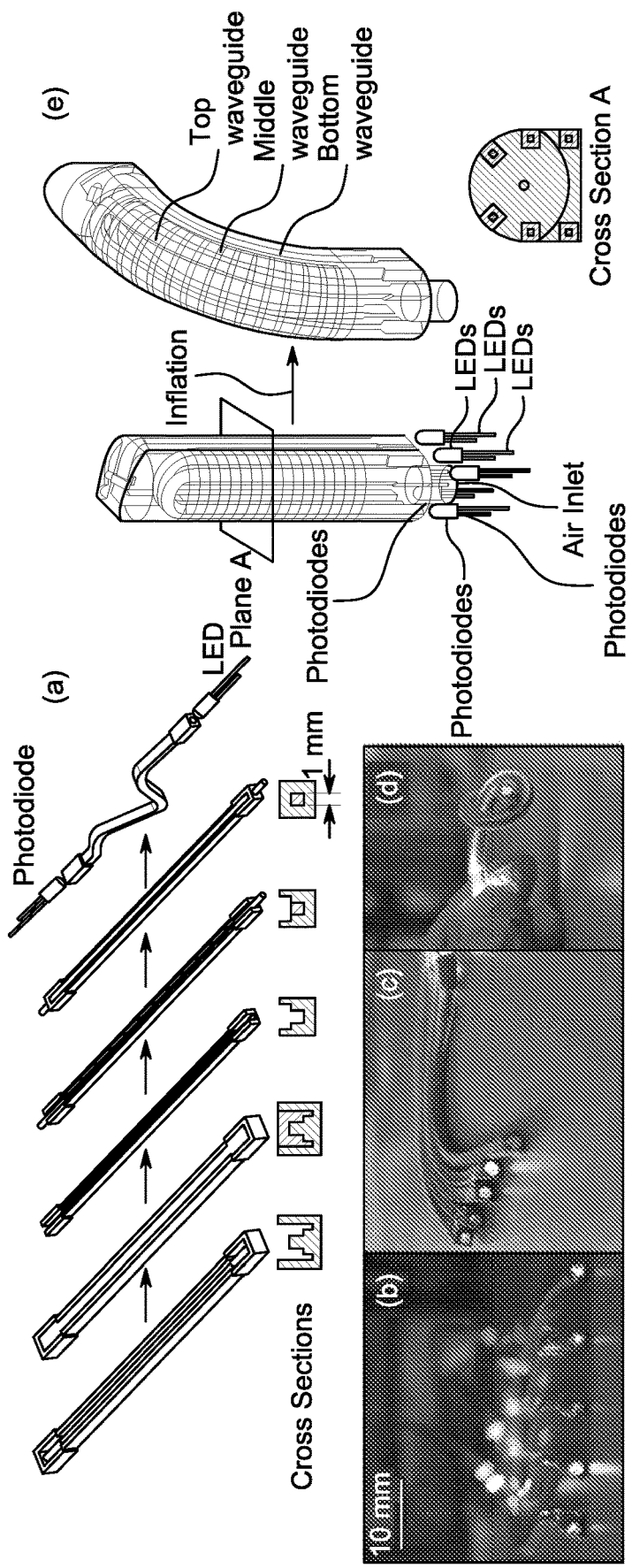
FIG. 28 illustrates stretchable waveguides fabrication, structures and the synthetic innervation of a soft finger, wherein (A) steps for fabricating a waveguide and the corresponding cross section for each step; (B) fabricated waveguides with assorted color LEDs inserted from one end in a sinuous shape; (C) waveguides in a curved shape; (D) waveguides in a knot; (E) schematic of a soft innervated finger in both unpowered state (left) and powered state (right) and its cross section (bottom right corner).

For example, to fabricate the stretchable lightguide or waveguide, a four step soft lithography process is used. As seen in FIG. 28a: (i) form a mold for making the cladding (e.g., formed by 3D printing), (ii) pour pre-elastomer for cladding into the mold and peel it off after curing, (iii) fill the cladding with the pre-elastomer core material, and (iv) pour pre-elastomers of the cladding to enclose the core. Two holes are cast at each end of the waveguide to house the LED and photodetector (i.e., photodiode). Soft lithography ensures that all structures of the initial mold are replicated in the final waveguide without any detail loss, including surface roughness. The wavelength of the LED may be within the sensitive wavelength region of the photodetector. The wavelength of the LED and photodetector can be, for example, of infrared or of visible light.

3D printing also can be used to form various parts of the waveguide designs disclosed herein.

Materials that are compatible with the developed stretchable waveguide fabrication technique include various synthetic rubbers (e.g., silicone rubber, polyurethane, styrene-butadiene rubber, polybutadiene, neoprene, etc.), natural latex rubbers, biodegradable materials (e.g., poly sebacic acid), or combinations thereof. Various functional groups (e.g., alkene, carboxylate, benzene, acryloyl group, etc.) can be grafted onto the main chains of these materials to modify the optical properties (e.g., refractive index, light absorbance) of both the core and the cladding.

The cladding can be fully or partly opaque. For example, the cladding may have more than 10 dB/cm absorbance. In an instance, the cladding can be configured to absorb light.

Colloids and/or particles can be mixed into the pre-polymers of the rubbers in the layers of the waveguide to adjust their refractive indices (e.g., zirconium dioxide, titanium dioxide, silicon dioxide, hafnium oxide, etc.) or to selectively control light emission (e.g., quantum dots). These colloids and/or particles are typically light-absorbing. In an instance, light emission is controlled at a particular wavelength with these colloids and/or particles. Total weight percentage of the colloids and/or particles in the pre-polymers may be kept low. For example, the colloids and/or particles can be less than 5% weight of the pre-polymers, less than 4% weight of the pre-polymers, less than 3% weight of the pre-polymers, less than 2% weight of the pre-polymers, or less than 1% weight of the pre-polymers.

Figure 27:
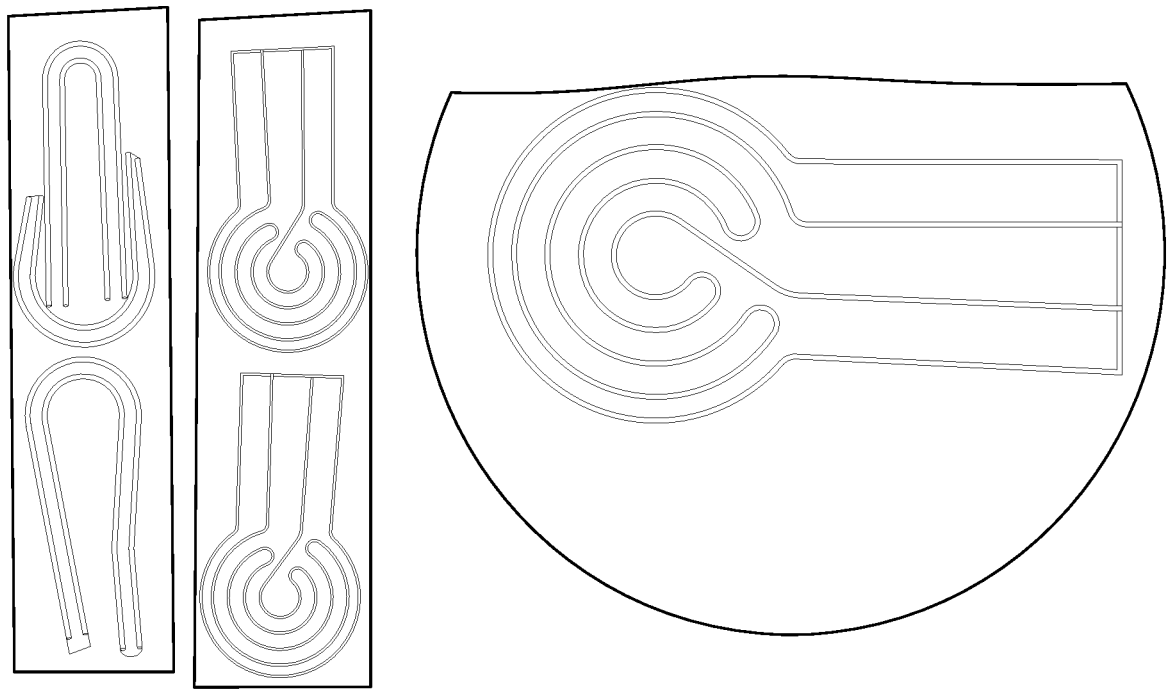
FIG. 27 shows examples of light guides defining a flat region or a disc-shaped region.

In an example, the waveguide defines a flat region or a disc-shaped region. Examples of a light guides with a flat region or disc-shaped region can be seen in FIG. 27. As seen in FIG. 27, the light guide may be encased in another material, but also may be standalone. Nonlinear waveguides can extend the area of sensing, conform to more complex shape, or help put a light guide or sensor into various spaces of an actuator. Nonlinear waveguides also can adjust the sensing format, such as by, for example, enabling the configuration to work as a high-resolution force sensor.

The waveguide can include a coating around at least part of the waveguide or all the outer surfaces the waveguide not connected to the light source and photodetector. The coating may be configured to contain light within the waveguide. The coating can be configured to be stretchable, non-metallic, crack-resistant, and include a dopant with a high index of refraction. For example, the coating can be a transparent silicone rubber (e.g., Sylgard 184 from Dow Corning, Solaris from Smooth-On), transparent polyurethane rubber (e.g., Vytaflex 20 from Smooth-On) or other transparent stretchable materials. The waveguide also may not include a coating around at least part of the waveguide (e.g. the entire waveguide may not include a coating).

In an instance, the core material of the waveguide is a transparent polyurethane rubber (e.g., Vytaflex 20 manufactured by Smooth On, Inc.) with a refractive index ($n_{core}$) of 1.461 and a propagation loss of 2.4 dB cm$^{-1}$ at a wavelength of 860 nm. The cladding material can be an absorbing silicone composite (e.g., ELASTOSIL® M 4601 AB manufactured by Wacker Chemie AG) with a refractive index ($n_{core}$) of, for example, 1.389 and a propagation loss of 1,500 dB cm$^{-1}$ at a wavelength of 860 nm. Due to the relatively large difference in n for the elastomers, the numerical aperture (NA=0.45 at 860 nm) ensures a large acceptance angle ($\theta_{max}$ of approximately 26°) of light input and thus lowers the coupling difficulties for the LED and the photodetector at the extents of the waveguide. A typical commercially available optical fiber has a very small refractive index difference (e.g., 0.003) while the refractive index difference used in the embodiments disclosed herein can be approximately one order larger than this.

Figure 1:
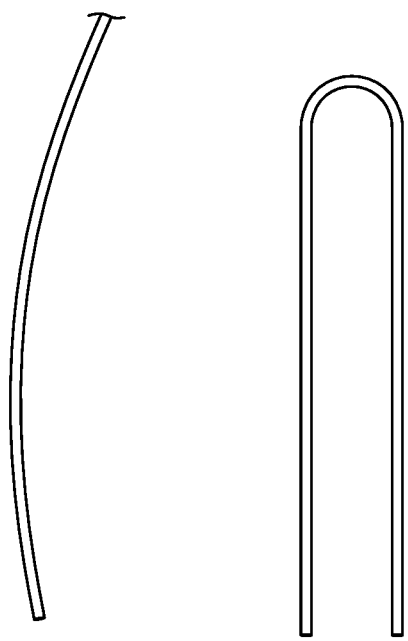
FIG. 1 is a picture of an original light guide (left) and a light guide with a u-shape (right).

In an example, three of the waveguides are fabricated and are cast into a finger actuator using over molding (FIG. 1e).

The body of the finger is made of a third kind of elastomer, which can also be a silicone (e.g., Ecoflex 0030 manufactured by Smooth On, Inc.). The three dimensional integration of the sensors and actuators means the waveguides are parts of the body and they will deform when the actuator does, serving as proprioceptive sensors.

A sensor using this waveguide includes a light source, at least one of the waveguide, and a photodetector. The waveguide is positioned between the light source and the photodetector and is in optical communication with both the light source and photodetector. Embodiments of the sensor disclosed herein can embed a waveguide in a soft actuator.

The light source can be an LED. The LED may provide, for example, an infrared wavelength or wavelengths, a visible light wavelength or wavelengths, or another wavelength or wavelengths. In an example, the wavelength is approximately 850 nm. Other light sources besides LEDs can be used.

The photodetector can be phototransistor or photodiode. A photo-Darlington is an example of a photodetector that can be used, though other photodetectors known to those skilled in the art also can be used. The photodetector can be configured to be sensitive to the wavelength or wavelengths of the light source.

The optical waveguide can have a length from 1 cm to 10 m (e.g., 1 m or less). The cross-sectional shape of the optical waveguide can be square, circular, or other shapes. The optical waveguide can be straight, curved, spiral, or other shapes.

The resulting waveguide is different from existing waveguides for several reasons.

Figure 2:
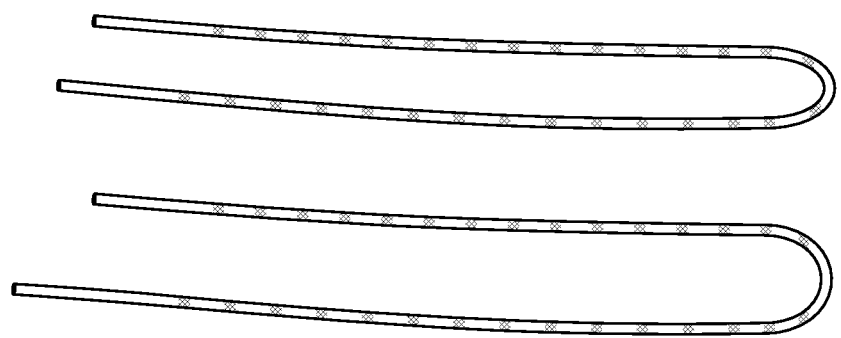
FIG. 2 is a picture of a light guide without indents (bottom) and a light guide with indents (top).
Figure 3:
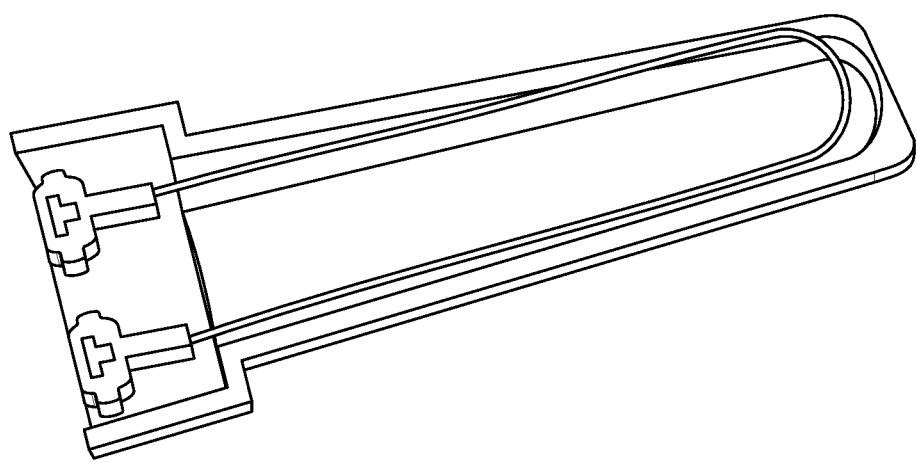
FIG. 3 is a picture of a sensor assembly prior to casting in a soft actuator.
Figure 4:
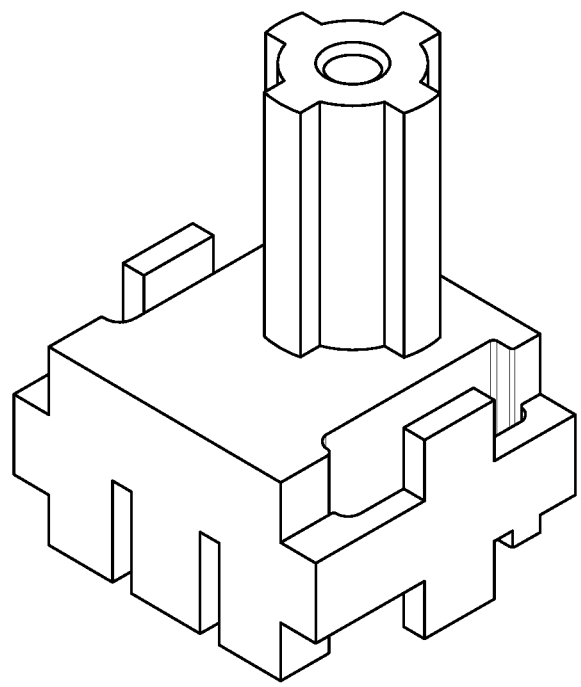
FIG. 4 is a perspective view of an embodiment of a holder used to connect the optical fiber with an LED or photodetector casted inside the soft actuator in accordance with the present disclosure.

First, the waveguides disclosed herein are highly compliant and stretchable. The core material has an ultimate elongation ($e_{ult}$) of approximately 10 and elastic modulus (E') of approximately 300 kPa (measured at 100% strain) and the cladding material is $e_{ult}$ of approximately 7 and E' of approximately 400 kPa (FIG. 2d). Any stretchable materials can be used.

Ultimate elongation for the waveguide may be greater than 50%. For example, the ultimate elongation for the waveguide can be greater than 50% to 700%, such as greater than 50% to 100%, greater than 50% to 110%, greater than 50% to 200%, greater than 50% to 500%, greater than 50% to 700%, or greater than 50% to 1000%, including all values and ranges to the 1% between. The combination of compliance and extensibility allows these waveguides or light guides to operate as bending, elongation, and/or pressure sensors.

In an instance, elongation is dependent on the lowest value of ultimate strain in the composite waveguide. The ultimate elongation can be 700% or more if the waveguide was fabricated ideally. For an ultimate elongation of 700% the waveguide may include silicone. At the ultimate strain, however, the waveguide may become damaged with increasing degrees of damage approaching 700%.

For reversible use with no noticeable damage to the waveguide, the ultimate elongation may be approximately 400% strain.

In another instance, the elastomers are selected such that the ultimate elongation of the waveguide is approximately 1000% with negligible damage. The waveguide may be fabricated of one or more of a polyurethane, silicone, or latex to obtain the ultimate elongation of approximately 1000%.

Second, the core material of the embodiments disclosed herein have a relatively large propagation loss as compared to ones used for fiber optic communication. Commercial fiber optics have a typical propagation loss of 0.2 dB/km, while the embodiments disclosed herein have propagation losses of approximately 2 dB/cm. The waveguides disclosed herein can be applied to prosthetic hands for sensation, and this relatively large propagation loss improves sensitivity during elongation while still allowing a detectable amount of light over the size scales of a human hand.

Third, the cladding material disclosed herein is absorbing (e.g., −150 dB $mm^{-1}$). This low-index material not only serves as the cladding to ensure total internal reflection (TIR) for the waveguide, but also serves as the jacket, which protects the core and forms the coupling house for LED and photo detector and prevents ambient light from altering the signal.

Fourth, the molds used herein can be 3D printed using a polyjet printer (Objet 30) for the optical waveguides disclosed herein. This fabrication process generates a surface roughness between the core and cladding of approximately 6 nm (RMS). The core/cladding interface roughness can be of several nanometers or smaller. For example, the core/cladding interface roughness can include features having dimensions from 1 nm to 500 nm (e.g., 1 nm to 100 nm), including all ranges and values to the 1 nm therebetween. This relatively rough interface causes scattering and, thus, more loss of propagation. However, the design freedom of 3D printing allows for complex sensor shapes.

Any two stretchable elastomers with two different refractive indices can be used to make the waveguides disclosed herein. In an example, the difference in refractive indices is greater than or equal to 0.0001. The difference in refractive index can be from 0.001 to 2 (e.g., 0.001 to 1) 0.003 to 2 (e.g., 0.003 to 1), 0.001 to 1, 0.003 to 1, or 1 to 2 including all ranges and values to the 0.001 therebetween. In another example, the difference in refractive indices is greater than 0.01. In a particular example, the difference was 0.06 (1.46 minus 1.40).

The waveguides disclosed herein can be of more complex shapes and patterns using 3D printing. For example, the waveguide can be have multiple inputs, multiple outputs, a splitter, a curved section, etc.

The waveguides disclosed herein can be sewn onto a structure or connected to the structure using adhesives, magnets, clips, or other connection methods.

Embodiments disclosed herein can be used in a sensor. For example, embodiments of the optical waveguide disclosed herein can provide sensation for any soft robotic system. Embodiments disclosed herein also can be used as a sensor by themselves. Use as a strain sensor, pressure sensor, force sensor, curvature sensor, or other types of sensors are possible.

The embodiments disclosed herein also can be used in display systems to transfer light power. This display may be a flexible, stretchable display. For example, embodiments of the optical waveguide disclosed herein can serve as passive light pipes for LED or natural light transmission. Embodiments of the optical waveguide disclosed herein also can be used as a light-emitting component by incorporating quantum dots into the core. These quantum dots can be excited by the light passing them and can emit photons. An optical waveguide used as a light-emitting component may be formed as a sheet. Formation of such a sheet-shaped optical waveguide may be performed using techniques disclosed herein.

The waveguides disclosed herein can be formed by forming a mold for a cladding (e.g., by 3D printing). A pre-elastomer cladding material is poured into the mold. The pre-elastomer cladding material is cured in the mold. The cladding is peeled from the mold. The cladding is filled with pre-elastomer core material. The pre-elastomer cladding material is poured to enclose the pre-elastomer core material. Holes can be cast at each end of a waveguide formed from the pre-elastomer cladding material and the pre-elastomer core material. A light source and a photodetector can be connected to a waveguide formed from the pre-elastomer cladding material and the pre-elastomer core material. The pre-elastomer core material can be polyurethane rubber and the pre-elastomer cladding material can be a silicone composite.

In an instance, a plurality of a waveguide formed from the pre-elastomer cladding material and the pre-elastomer core material can be formed. Each of the waveguides can be cast into a finger actuator using over molding, wherein a body of the finger is a silicone.

Waveguide with Indents on Outer Surface

In another embodiment, a sensor using a waveguide, such as an optical fiber, is disclosed. The waveguide may be a light guide. This sensor can be used with a device that includes an elastomeric actuator. A method of forming the sensor and assembling the device also is disclosed. For their good reliability, repeatability, sensitivity as well as easy fabrication process, low power consumption, and low price, these sensors can be used in the modeling and control of soft actuators. The sensor can be used as the curvature sensor for any kind of soft actuators. Hysteresis in the sensor is reduced or avoided.

A soft orthotic with position control enabled via embedded light guide also is presented. The design, manufacture, and integration of both the pneumatically powered actuators and optical sensors are described. This orthotic actuator-sensor pair is self-contained and worn on a human finger. When un-powered, the elastomeric actuator allows facile movement and, when pneumatically actuated, the orthotic causes bending of the wearer's finger. Position control is achieved by measurement of signal intensity from a light-emitting diode (LED) input traveling through an embedded light guide. Greater radius of curvature results in increased light intensity. Both the static and dynamic states are monitored via the photodetector and the prescribed curvatures are achieved accurately and with stability by a gain-scheduled proportional-integral-derivative (PID) controller implemented by applying pulse-width-modulation (PWM) signals to a solenoid valve to adjust the internal pressure of the actuator.

To better improve the functionality of previous actuators toward hand orthotics, an optical light guide for curvature sensing is monolithically integrated. In addition to fabrication and integration, a controller to maintain the curvature of FEAs also is disclosed. Specifically, the system's static and dynamic responses are characterized experimentally and a curvature control algorithm using gain-scheduled PID controller is disclosed. The algorithm is implemented by adjusting the actuator's inflating pressure, which is generated from a compressed air source through a fast-responsive, PWM controlled solenoid valve.

A sensor includes a light source, a light guide, and a photodetector. The light guide defines at least one indent on an outer surface of the light guide. The light guide is positioned between the light source and the photodetector and is in optical communication with both the light source and photodetector. Embodiments of the sensor disclosed herein can embed a light guide, such as an optical fiber, in a soft actuator.

The light source can be an LED. The LED may provide, for example, an infrared wavelength or wavelengths, a visible light wavelength or wavelengths, or another wavelength or wavelengths. In an example, the wavelength is approximately 850 nm. Other light sources besides LEDs can be used.

The photodetector can be phototransistor or photodiode. A photo-Darlington is an example of a photodetector that can be used, though other photodetectors known to those skilled in the art also can be used. The photodetector can be configured to be sensitive to the wavelength or wavelengths of the light source.

The light guide can be an optical fiber. For example, a fiber optic wire, such as a plastic fiber optic wire, can be used. Light from the light source passes through the light guide to the photodetector. A first point of the light guide is in optical communication with the light source and a second point of the light guide is in optical communication with the photodetector. The first point and second point may be, for example, ports or ends of the light guide. The first point and second point may be in direct contact with the light source or photodetector. The first point and second point also may be separated from the light source or photodetector, but still in optical communication with the light source or photodetector.

The light guide can have one or more indents formed in its surface. These indents can be formed by, for example, engraving, sand blasting, bead blasting, tooling (e.g., using a razor), grinding, or acid etching. The indents can be from 0.5-4 mm in length and spaced at intervals from 0.5-4 mm, including all ranges and values to the 0.1 mm between. Indents can be oriented such that the indents close when bent, though other orientations are possible. The indent length and interval length can be adjusted based on the sensitivity requirements and the total length of the sensing range. These dimensions can range from several mm to several cm. The orientation of the indents can be toward the bending direction, opposite to the bending direction, or other orientations therebetween. The depth of the indents from the outer surface of the light guide can be from 100 nm to 1 mm, including all values to the 1 nm and ranges therebetween. The depth of the indents from the outer surface of the light guide may be uniform or may vary between indents. The depth may represent a value from 0.5% to 49% from the outer surface to the center of the light guide. For example, the depth may be 1%, 2%, 3%, 4%, 5%, 10%, or 15% from the outer surface to the center of the light guide.

In an instance, the light guide is engraved by laser cutter. During such a process, both the intensity and the pattern of engraving can be well controlled.

In particular, the light guide is shaped (e.g., bending the light guide into a u-shape) and heated after the shaping (e.g., at a temperature of at least 50° C. for at least 45 minutes). At least one indent is formed on an outer surface of the light guide after the heating. A light source, a photodetector, and the light guide are assembled within a mold for a soft actuator after the forming. A soft actuator is cast after the components are assembled (e.g., by rotational casting or injection molding). The indent can be formed by at least one of engraving (e.g., using a laser), sand blasting, bead blasting, tooling (e.g., using a razor), grinding, and acid etching.

The indents can be patterned in a zebra crossing. A zebra pattern can reserve more light while extending total sensing length.

While indents are described, other forms or regular or irregular roughening on the surface of the light guide can used.

The light guide can be u-shaped. This can prevent twisting and can enable the light source and photodetector to be positioned on the same end of the light guide. However, the light guide can be linear or other shapes besides u-shaped. The shape of the light guide can depend on the design of the sensor or the actuator it is located in.

The light guide is configured to provide greater than or equal to 1% transmission of light. Transmission in the light guide can be up to 100%. For example, the light guide can provide greater than or equal to 10%, 25%, 50%, 75%, 90%, or 99% transmission. Transmission refers to the intensity of light coming out of a light guide over the intensity entering into the light guide.

The light guide can be stretchable or non-stretchable. A stretchable light guide can be fabricated of an elastomer or polyurethane. The elastomer can be or include silicone, an acrylic, or transparent rubber. Other transparent stretchable materials are possible. A non-stretchable light guide can be made of a transparent plastic, such as poly(methyl methacrylate) (PMMA).

The sensor using the light source, photodetector, and light guide is configured to sense at least one of curvature, force, strain, elongation, or pressure. As the light guide bends, more light is lost or is not received by the photodetector. Indents or other roughened surfaces on the light guide can enable more light to be lost or not received by the photodetector when the light guide is bent. Embodiments of this sensor can reduce power consumption needed for sensing operation and can avoid hysteresis.

A soft actuator can include an embodiment of the sensor disclosed herein. The soft actuator, which can be an elastomeric actuator, can completely enclose the light source, the photodetector, and the light guide. The light source can be disposed in the soft actuator at the same end as the photodetector. This may be enabled by the light guide having a u-shape.

To assemble the soft actuator, a light guide can be shaped and then heated. At least one indent is formed on an outer surface of the light guide after the heating. The light source, photodetector, and light guide are then assembled within a mold for an elastomeric actuator. The soft actuator is then cast. The actuator can be formed using, for example, rotational casting or injection molding.

In an example, the optical fiber (which can be u-shaped) is cast in a mold and placed in an oven at a temperature of at least 50° C. for at least 45 minutes. A laser cutter is used to engrave indents on the optical fiber. An LED and phototransistor are assembled within a mold for an actuator. The actuator is then cast in the mold. A signal from the phototransistor is measured and calibrated after casting.

The light source, photodetector, and light guide can all be cast in the soft actuator. The fabrication process can be simplified because the light source, photodetector, and light guide are cast during manufacturing of the soft actuator.

A technique for fabricating waveguides, which can be stretchable, is disclosed in this embodiment and can be applied for use in a sensation system for prosthetics. Based on different designs, these waveguides can be used as a strain sensor, curvature sensor, force sensor, or combination thereof. Also, these waveguides can be incorporated into soft systems like soft prosthetics and serve as sensors to provide proprioception and exteroception sensing.

EXAMPLE 1

A monolithic actuator was formed using rotational casting and without encapsulation. Previously, each chamber of the actuator was not connected after rotational casting. To actuate the whole actuator together, an extra step was required. This rotational casting technique interconnects of each chamber during rotational casting so that no extra steps are required for actuation.

Figure 5:
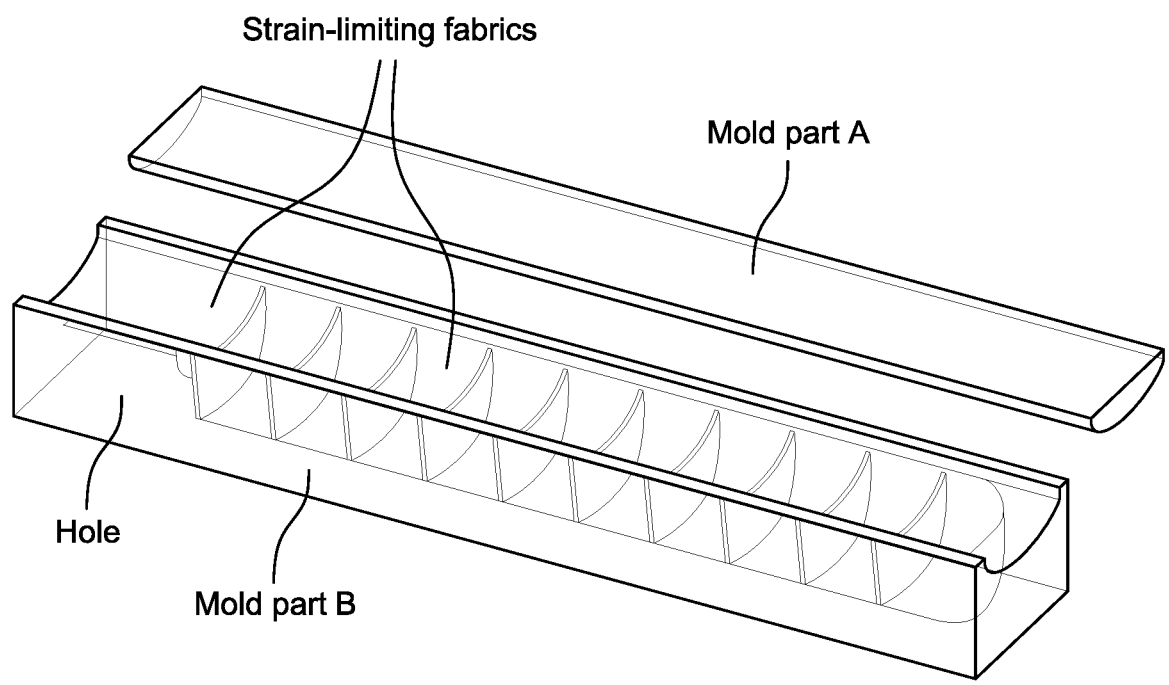
FIG. 5 is a perspective view of a mold used for rotational casting of a soft actuator.
Figure 6:
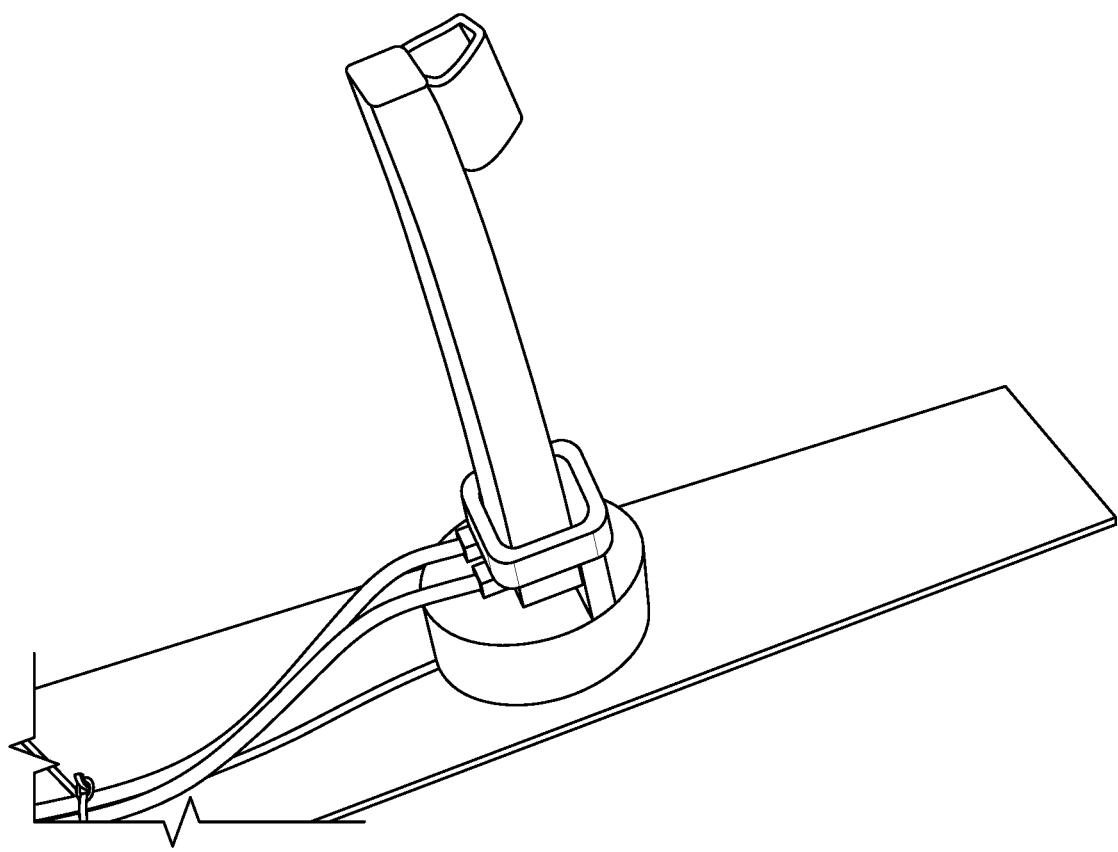
FIG. 6 is a picture of an embodiment of a soft actuator with a sensor cast inside in accordance with the present disclosure.

FIG. 5 is a perspective view of a mold used for rotational casting of a soft actuator. Mold part B was filled with pre-elastomers and strain-limiting fabrics were put both on the top and along the bottom side surfaces. The cap (mold part A) was closed and the assembled mold was fixed on a rotational casting machine. The mold was rotated for three hours non-stop. A steel wire was inserted through the small hole of the mold. The mold was then placed in an oven to fully cure. The mold was later taken out of the oven and the wire removed. The actuator was then peeled off and tested.

Using this technique, a one-step monolithic actuator is formed using rotational casting. There is a connecting structure design between each chamber. The wire is inserted after rotation was complete but before the elastomers are fully cured. The strain-limiting fabrics provide more surface area.

EXAMPLE 2

Figure 7:
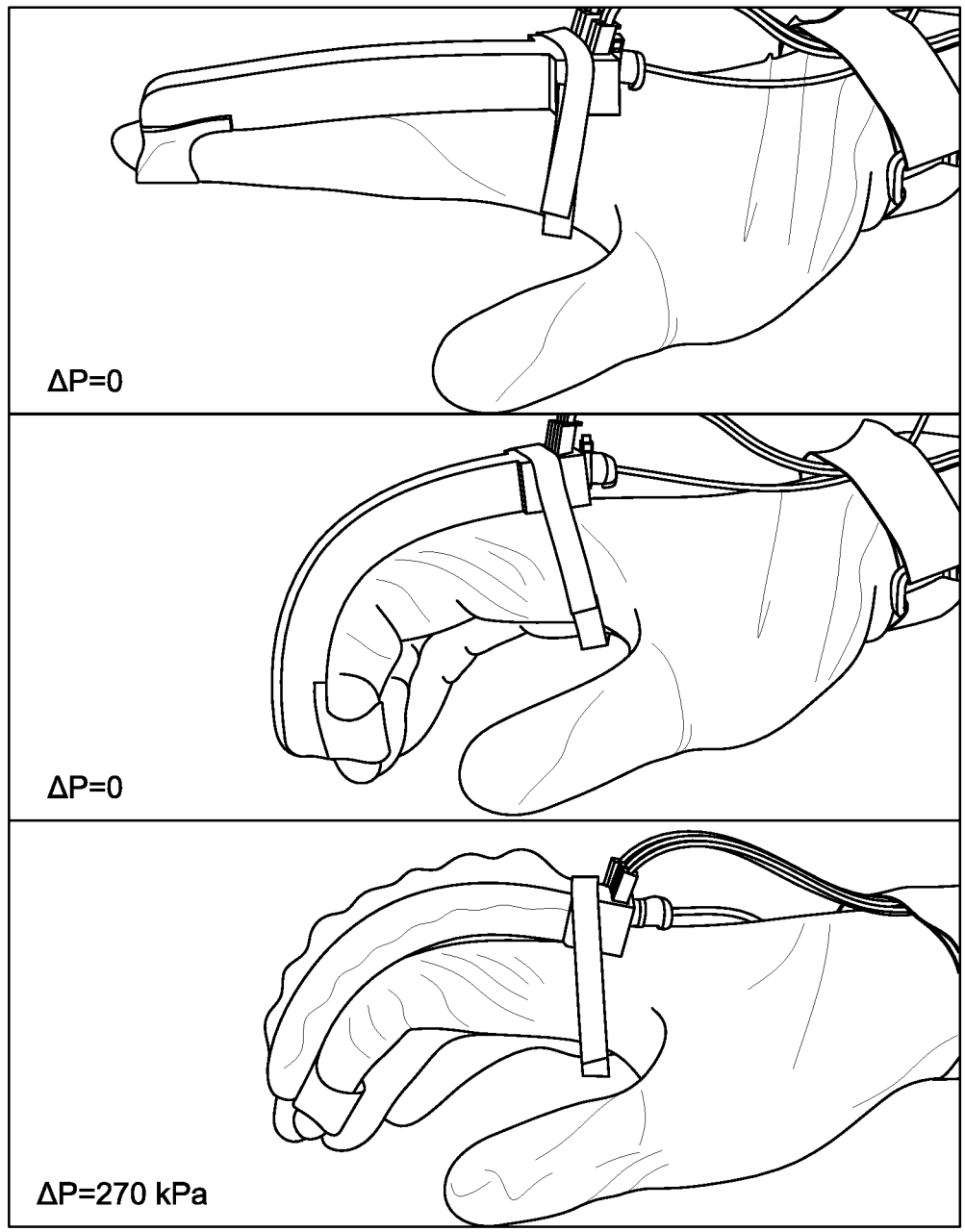
FIG. 7 includes pictures of an optical fiber embedded orthotic unpowered (top), moving a finger while unpowered (middle), and actuating causing the finger to move while being pressurized (bottom).

The orthotic of FIG. 7 has the following features: (1) low stiffness when deflated, which enables easy movement of the wearer's finger; (2) high force/torque generation; (3) repeatable performance from its manufacturing technique (rotational casting); (4) integrated curvature sensor with high repeatability and resolution; (5) compatible bending range for finger motions. The finger exoskeleton had a length of 110 mm, an effective length of 70 mm, a range of motion from 0° to 105°, provided 0 kPa to 270 kPa pressure, and had a tip force between 0 N and 5 N.

Figure 9:
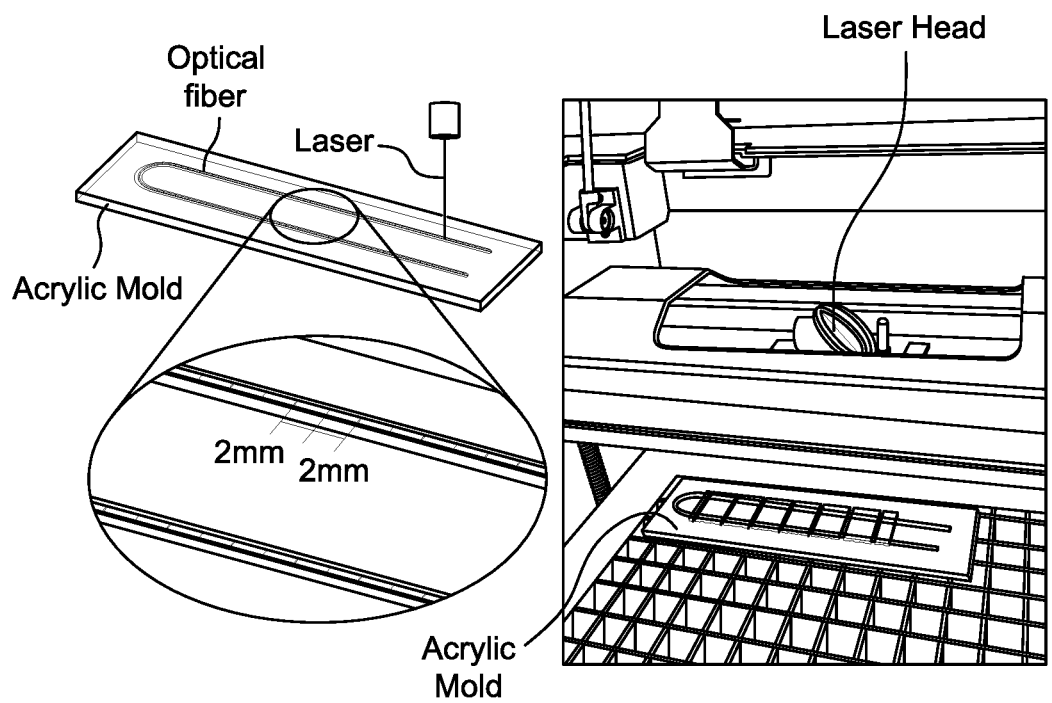
FIG. 9 is (left) a u-shaped optical fiber being roughened by a laser cutter and (right) a photo of the optical fiber being roughened or cut by a laser cutter.
Figure 10:
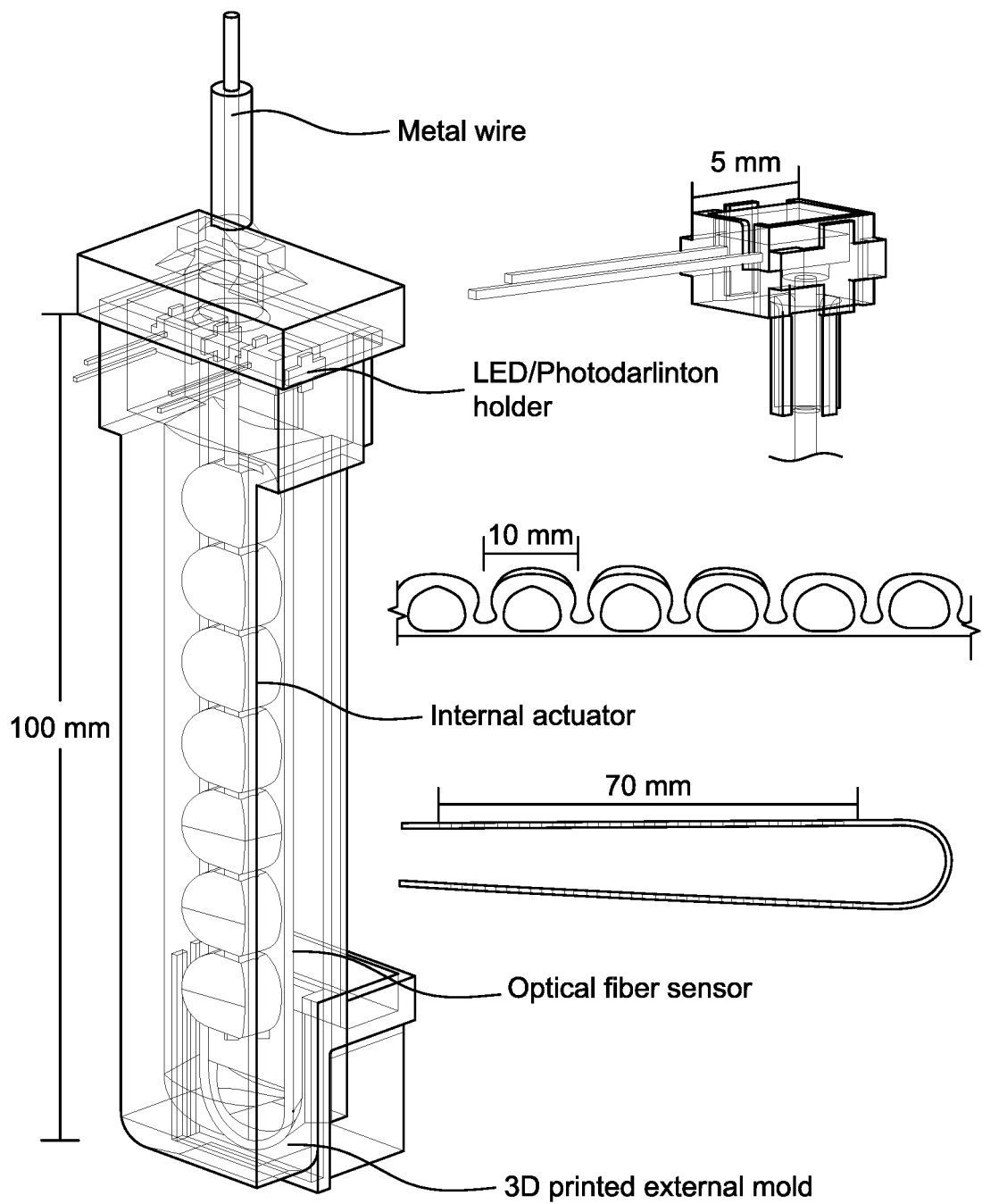
FIG. 10 is a schematic of an assembly of parts cast into a single orthotic, wherein an optical fiber and LED/photo-Darlington were housed in the holders, and the holders were fixed on the mold through four pins.

The fabrication process for the orthotic with embedded curvature sensor includes three stages: (1) fabricate the internal actuator (FIG. 8), (2) shape and pattern the sensor's light guide (FIG. 9), and (3) assemble and cast into a complete orthotic (FIG. 10).

Figure 8:
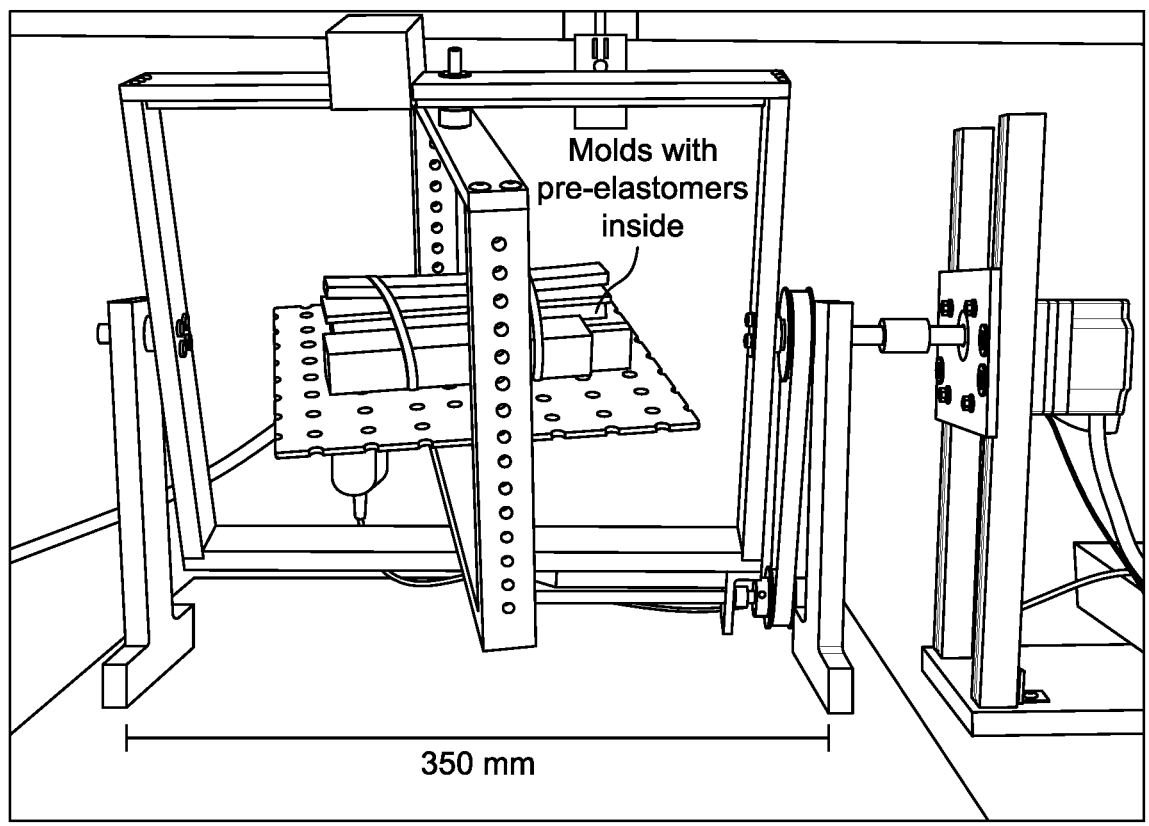
FIG. 8 is a picture of a rotational casting machine with multiple molds wherein viscous pre-elastomers inside the mold flow against the internal walls coating them and form a seamless actuator.

The internal actuator is a monolithic structure having a series of hollow chambers with nylon mesh incorporated in one side to program a bending mode of inflation. FIG. 8 shows the rotational casting machine used to cast the seamless FEAs. The material used for the internal actuator is a blend of commercially available silicone rubbers (90% ELASTOSIL M 4601, 10% silicone thinner from Smooth On, Inc., by volume).

This system inputs light from an LED into a light guide and a Photo-Darlington detector reads the output signal on the other side. Increased bending causes lower light intensity from the waveguide and less current output from the photosensitive detector. To fabricate the light guide, a piece of 1-mm-diameter acrylic optical fiber was bent into a u-shape via thermoforming, and then a laser cutter (Zing 24 from Epilog) was used to roughen the optical fiber on one side (FIG. 9). The anisotropic roughening enhances the signal change upon bending.

Excessive roughening will cause the output light intensity to drop to zero. Therefore, the optical fiber was engraved with 2 mm roughened lengths at intervals of 2 mm (FIG. 9). The total engraving section is of the same length as the orthotic's effective bending length. To avoid cracks from engraving causing fracture upon actuation, the fiber was oriented so it bends in a direction that closes the indents. In this orientation, light intensity detected by the photo-Darlington increases with bending curvature.

To embed the sensor in the orthotic, the LED, photo-Darlington, and the engraved optical fibers were cast into the actuator. The peak wavelength of the LED and the sensitive wavelength of the photo-Darlington were both at the range of infrared light, which eliminated the interference of visible light. To ensure the best contact angle for the optical fiber, LED and photo-Darlington inside the actuator, the housing shown in FIG. 10 was designed. As the optical fiber is inextensible, it was placed close to the neutral bending plane of the actuator with the strain limiting fabric. Silicone rubber pre-elastomer was then poured into the mold and cast them into a single piece. The resulting orthotic has the following features: seven internal pneumatic chambers, nylon mesh fabric on one side, optical fiber curvature sensor close to the neutral plane, encapsulated LED and photo-Darlington, two pairs of exposed pins as electrical connections to the outer circuit, a rubber band for fixing onto the finger, and a flat section for fixing onto the back of hand.

Figure 11:
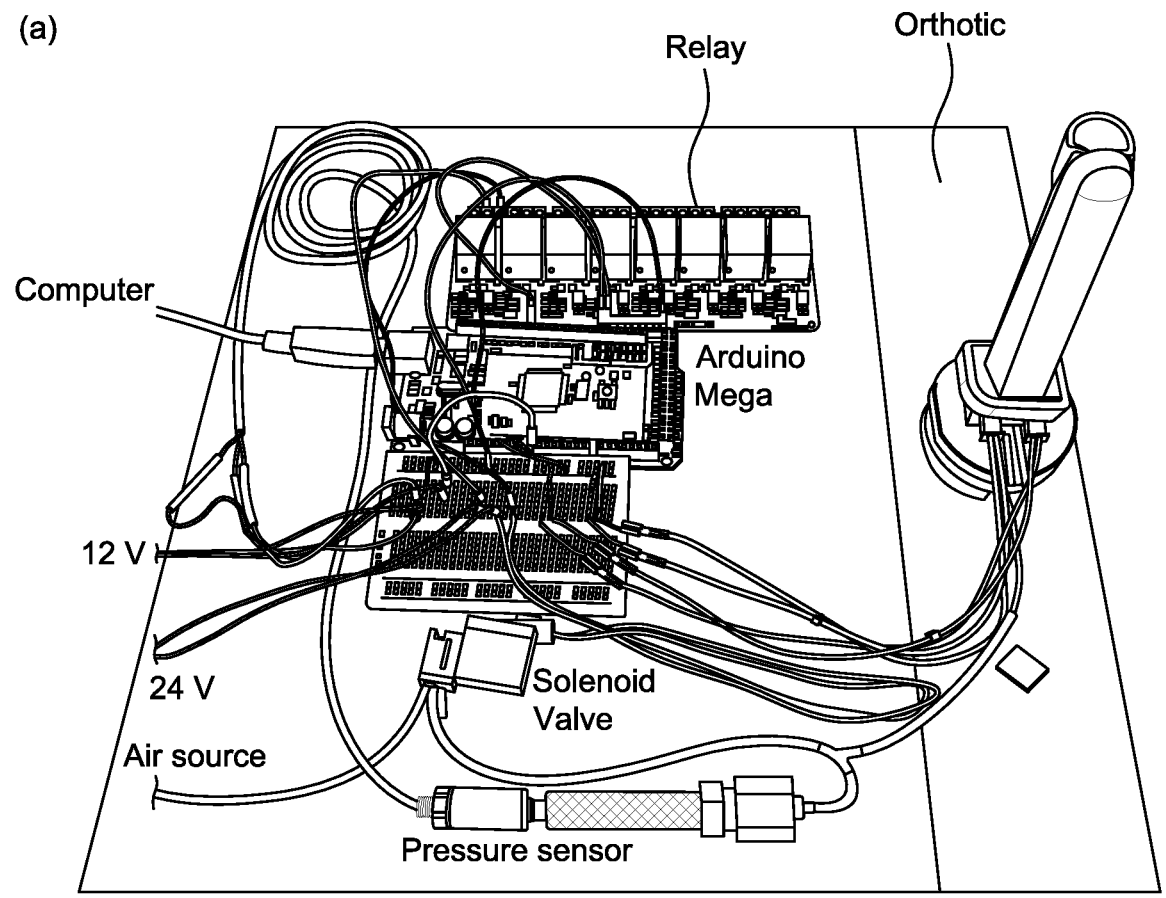
FIG. 11 is a testing platform for the orthotic including (a) a photo of the setup, (b) a schematic of the circuit set up, and (c) schematic of the air flow at both the on and off state for the solenoid valve.
Figure 11:
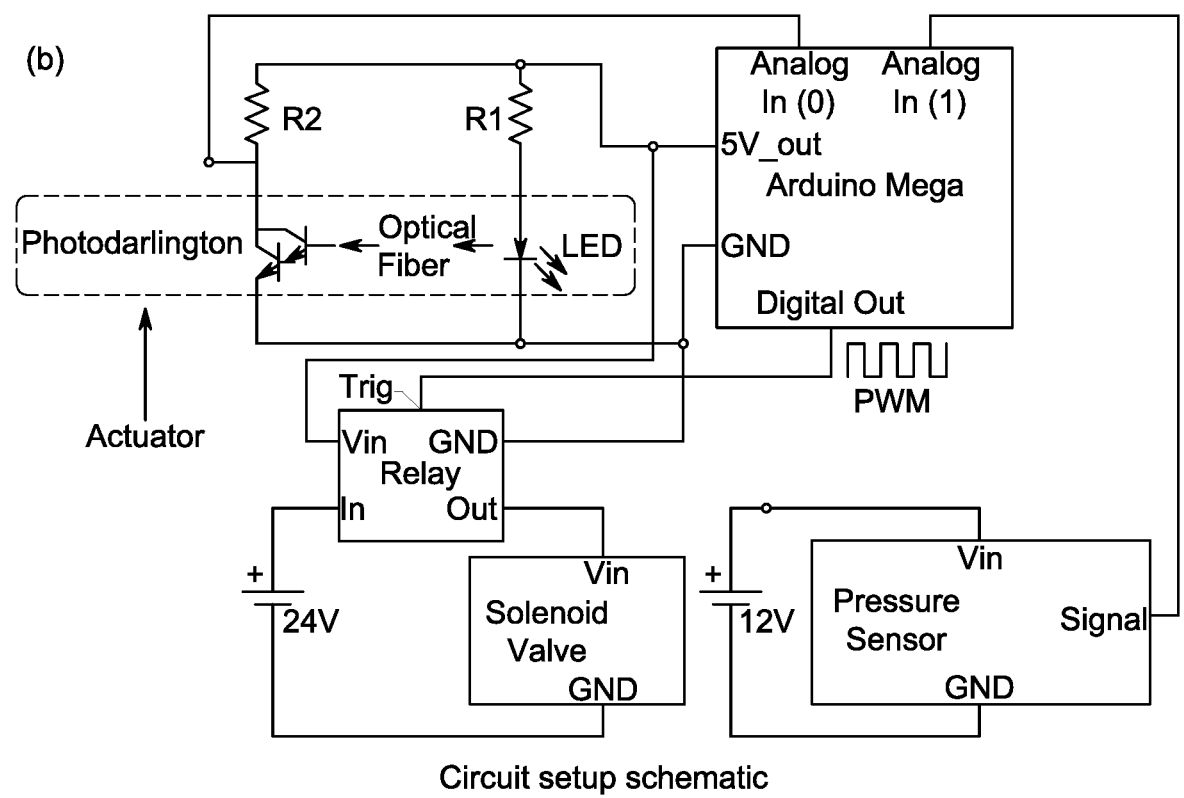
Figure 11:
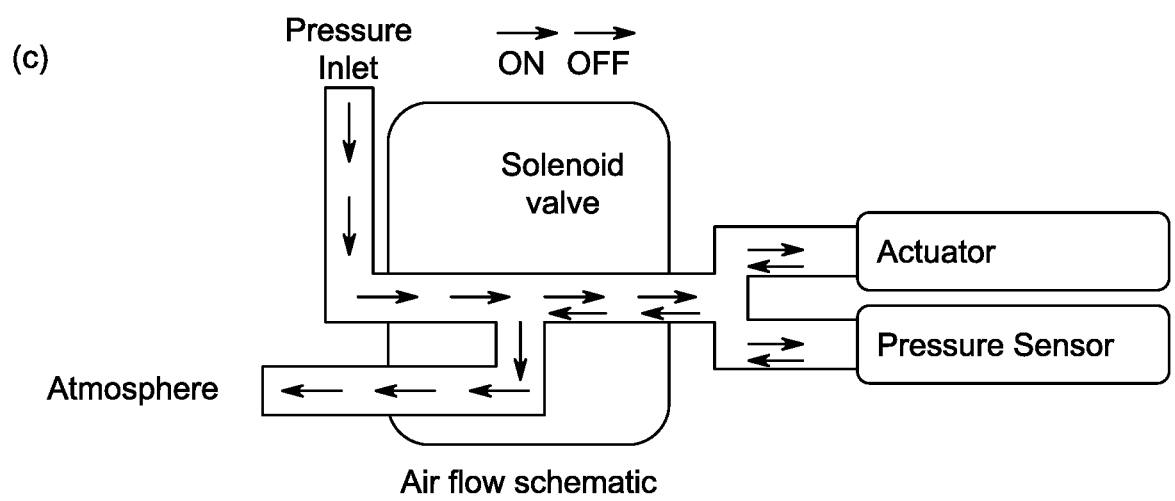

To characterize and control the orthotic system, a platform was built that is composed of a microcontroller board, an electrical relay and solenoid valve, a pressure sensor (PSE 530-R06 from SMC), a circuit for the optical fiber sensor, a constant-pressure air source, and power supply (FIG. 11a).

The microcontroller was an Arduino MEGA 2560 that collects analog data from the pressure and optical fiber sensors and implements the PID controller to output the Pulse Width Modulation (PWM) signals for valve control. The solenoid valve was a VQ110U-5M from SMC Corporation. It is a large flow, normally closed, three-port solenoid valve with a fast response time (On: 3.5 ms, off: 2 ms). The airflow schematic is shown in FIG. 11c. The relay was an SRD-05 VDC-SL-C from Songle Relay with an operation time of 10 ms and release time of 5 ms. The response times of the solenoid valve and the relay can limit the PWM frequency used to control the open and close the valve. Using this relay and valve system, 60 Hz was chosen as the PWM frequency. Acrylic optical fiber (CK-40, Eska, Inc.) and an 870 nm LED (IF E91D, Industrial Fiber Optics, Inc.) were used. The photo-Darlington detector (IF D93, Eska, Inc.) has a peak photosensitivity of 850 nm. To limit the current, resistances of 220 ohm (R1) and 100 ohm (R2) were used in the circuits of the LED and photo-Darlington, respectively (FIG. 11b). This test platform can be easily extended to control multiple FEAs or otherwise be extended to a full-hand orthotic.

Figure 12:
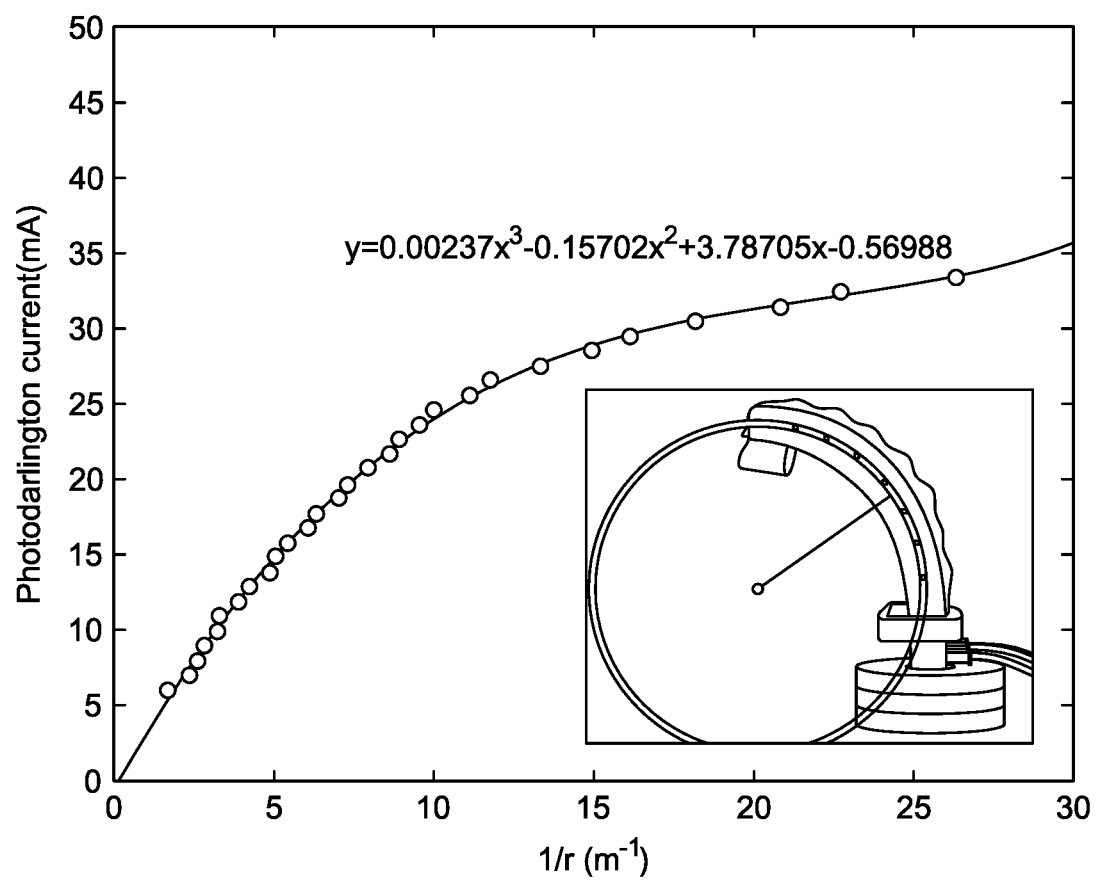
FIG. 12 is a calibration curve of the embedded optical sensor.

Before conducting tests on the finger orthotic, an optical fiber sensor embedded into elastomeric orthotic was calibrated using a video camera and image processing. The curvatures (1 r) were achieved through a high-resolution camera located facing the side of the orthotic and 7 points were picked on the neutral plane line to fit the orthotic curvature into a circle. Despite a non-linear response (fit into a third-order polynomial as shown in FIG. 12), the sensor exhibited very good properties in terms of resolution, accuracy, repeatability and curvature range. Additionally, the sensor also exhibits good dynamic properties (i.e., a very short response time of 5 ms). Table 1 summarizes the capabilities of the embedded curvature sensor.

TABLE 1

| Properties | Parameters, Unit | Value |
| --- | --- | --- |
| Sensitivity | Slope of current over curvature, mA/m$^{-1}$ | 0.3-3.8 |
| Accuracy (average value) | Relative error, % | 5.4 |
| Resolution (average value) | Minimum discriminated curvature, m$^{-1}$ | 0.04 |

TABLE 1-continued

| Properties | Parameters, Unit | Value |
| --- | --- | --- |
| Repeatability (average value, based on three separate tests performed on same optical fiber sensor) | Curvature standard deviation, m$^{-1}$ | 0.05 |
| Range | Curvature range, m$^{-1}$ | 0-26 |
| Dynamic Properties | Response time, ms | 5 |

Note that the values collected above were specific to the orthotic sensor. Some of the properties could be further improved to satisfy stricter requirements; for example, the range of the sensor could be extended to as large as 50 m$^{-1}$ by changing the roughening pattern.

Figure 13:
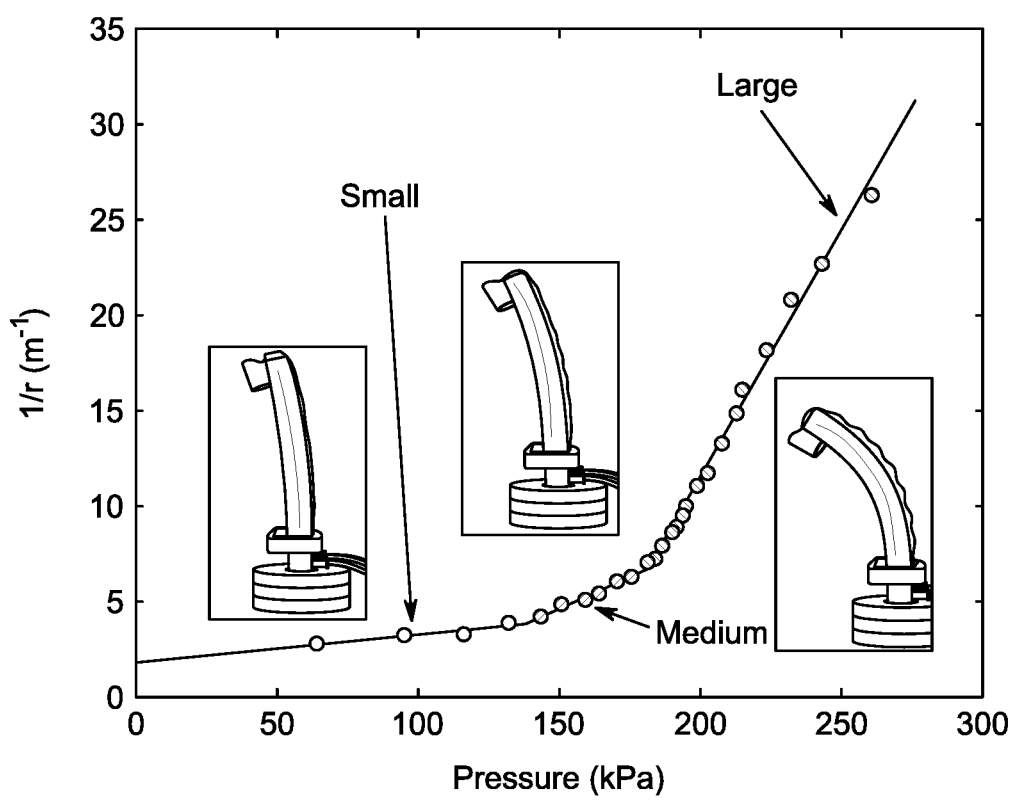
FIG. 13 is a quasi-static state response of the orthotic approximated by a piecewise linear model: small curvature range (left), medium curvature range (center), and large curvature range (right).

Using the calibrated curvature sensor, the quasi-steady state response of the orthotic was tested (FIG. 13). For the orthotic system, a constant curvature along the orthotic is assumed and pressure (P) was chosen as the input and curvature ($\kappa=1/r$) as the output. The single input single output (SISO) system is described in Equation 1.

$$\dot{\kappa}=f(\kappa,P) \quad (1)$$

The quasi steady state response of this system where the internal pressure was fixed and $\kappa=0$ was assumed was recorded and shown in FIG. 13. It is a nonlinear system, due to the nonlinear properties of the hyperelastic elastomer and the geometry of the actuator design. However, it was fit to a piecewise linear system. The response was divided into three ranges based on their slopes: (1) small curvature range (0 to 4 m$^{-1}$); (2) medium curvature range (4-7 m$^{-1}$); and (3) large curvature range (7-26 m$^{-1}$). Within each range, the system shows linearity. This approximation allowed characterization of the dynamic response of the system and implementation of the gain scheduled controller design.

Figure 14:
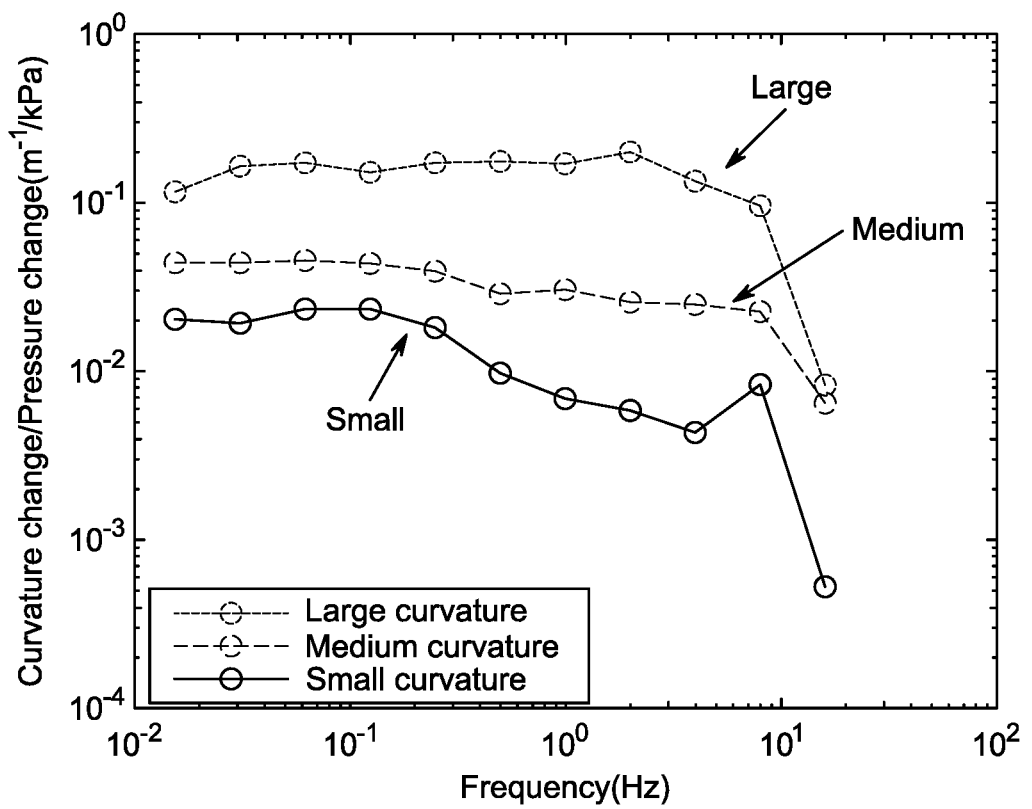
FIG. 14 is dynamic response of the orthotic at different curvature ranges.

For each of the three ranges described above, the orthotic's dynamic response was tested by generating sinusoidal input of different frequencies using a PWM signal (FIG. 14). The results show that the dynamic responses for each region are similar. However, the gains (i.e., ratio of curvature to pressure) are different. This orthotic has a bandwidth of around 8 Hz, allowing it to absorb high frequency oscillation of pressure resulting from relative low frequency of PWM signal (60 Hz).

Figure 15:
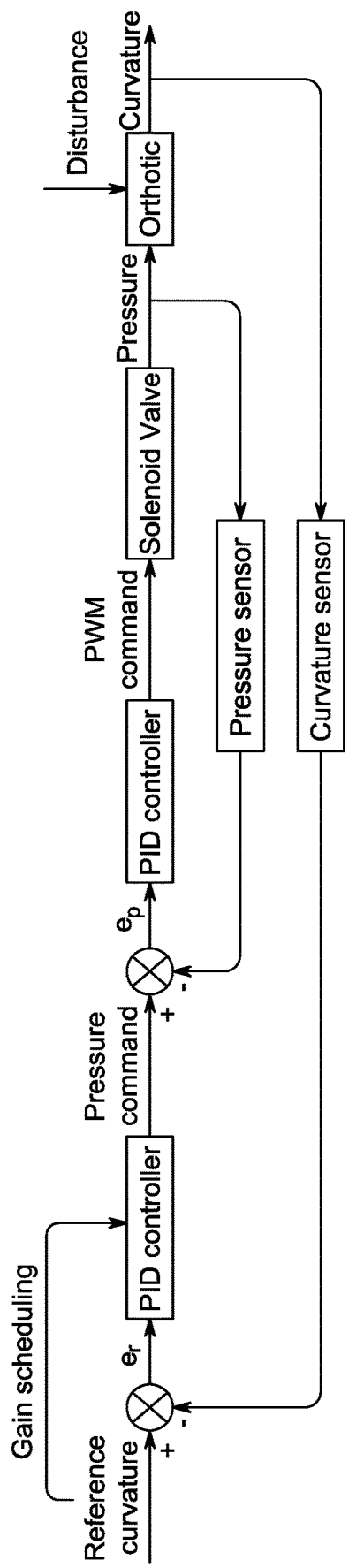
FIG. 15 is a block diagram of a dual loop control system.

A dual loop PID was used to control the curvature of a free moving orthotic. The block diagram of the control system is shown in FIG. 15. The inner loop was a low-level PID controller that uses input from a pressure sensor to adjust the internal pressure of the soft orthotic, which is required because pressure generated from the low-frequency PWM signal is nonlinear and frequency-dependent. Due to the covering the complete range will cause either instability at high curvature range or slow response at small curvature range. Therefore, a gain-scheduled PID controller was used for the outer loop and, based on the static response of the system in FIG. 13, the scheduling variable was chosen to be the reference curvature ($\kappa_{ref}$). The discrete implementation of the gain-scheduled PID controller by the microcontroller is in Equation 2.

$$P_{command,\kappa}=K_{P,j}e_{r,k}+K_{D,j}(e_{r,k}-e_{r,k-1})+K_{I,j}\Sigma e_{r,i} \quad (2)$$

In Equation 2, $\Sigma$ is from 1 to k. j equals small range when $\kappa_{ref}\in[0, 4]$ m$^{-1}$. j equals medium range when $\kappa_{ref}\in[4,7]$ m$^{-1}$. j equals large range when $\kappa_{ref}\in[7,26]$ m$^{-1}$.

Figure 16:
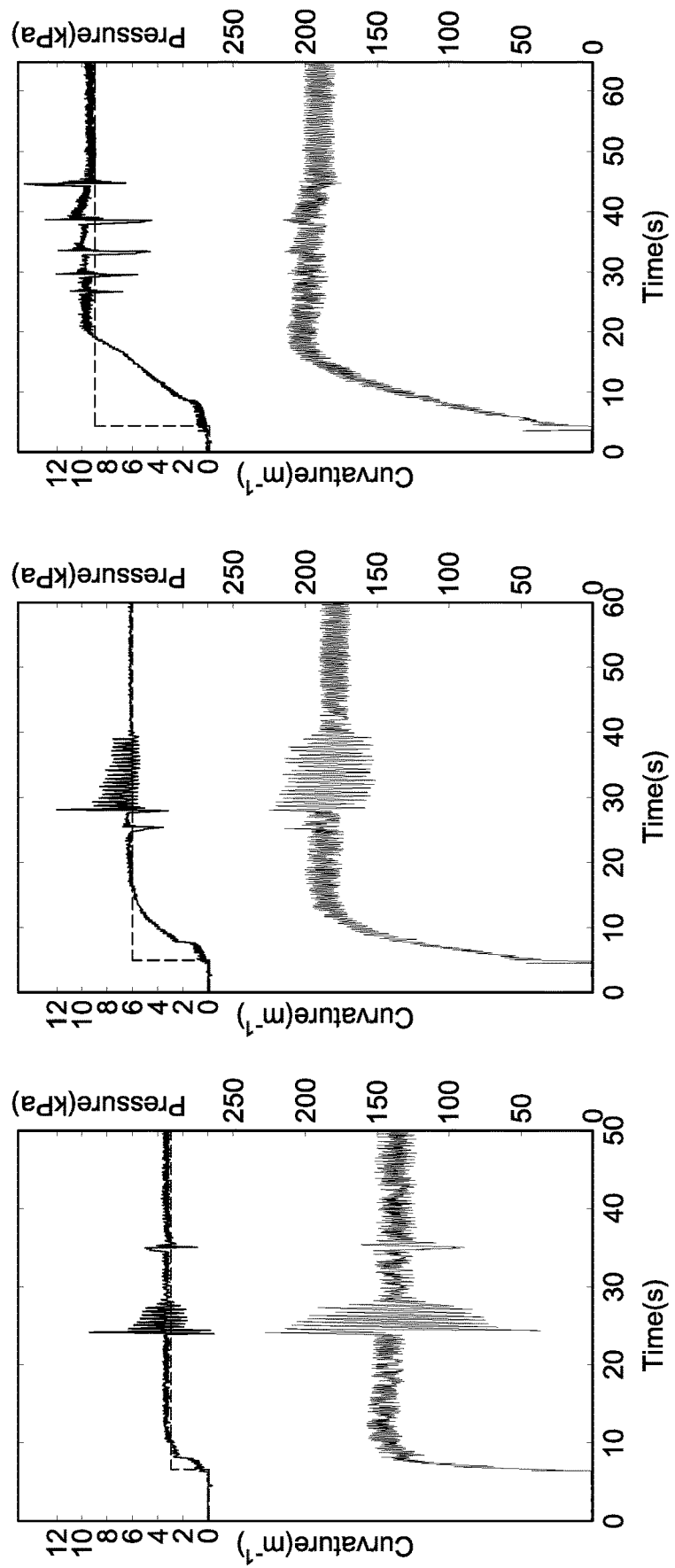
FIG. 16 is gain-scheduled PID control performance of small curvature range (left), medium curvature range (middle), and large curvature range (right), wherein a step reference signal is exerted (linear top signal) and the input pressure (bottom) and output curvature (top) was tracked through the embedded optical fiber sensor over time, and wherein disturbances were introduced to test the systems' robustness.

To test the system's ability to absorb external disturbances and maintain its prescribed curvature, disturbances of different intensities (ranging from 2 m$^{-1}$ to 5 m$^{-1}$) were intentionally introduced after it reached equilibrium (FIG. 16). Its disturbance rejection ability was demonstrated by using a weight to block its way to the prescribed curvature. It could easily push a small weight (e.g., 1N) and reach its targeted curvature, yet when it came to large weight (e.g., 5N) it oscillated and exhibited instability. Also, when the reference curvature was changing very rapidly, the system also exhibited instability. These dynamic instabilities are most pronounced at the threshold of each range in the piecewise linear function. Sophisticated controllers can account for these highly dynamical systems. The gain-scheduled PID controller parameters and performance are summarized in Table 2. Despite the small tracking error and good performance in rejecting disturbances, the dual-loop gain-scheduled PID controller has a large rise time that can make it difficult to perform dynamic tracking of time-varying reference signals. Using simpler discontinuous controller may reduce the rising time.

TABLE 2

|  |  | Small Range | Medium Range | Large Range |
| --- | --- | --- | --- | --- |
| PID Parameters | Kp | 2.4 | 0.6 | 0.2 |
| PID Parameters | Ki | 0.0002 | 0.0005 | 0.002 |
| PID Parameters | Kd | 0.02 | 0.005 | 0.01 |
| Performance | Steady state error, $m^{-1}$ | 0.26 | 0.19 | 0.37 |
| Performance | Rising time from 10% to 90% of equilibrium value, s | 2.5 | 8.2 | 12.1 |
| Performance | Stability, tested by giving disturbance greater than 2 $m^{-1}$ | Stable | Stable | Stable |

A soft orthotic with position control via embedded solid-state curvature and pressure sensors was demonstrated. The fabrication of each part, including the rotational casted internal actuator, the laser cut optical fiber-based curvature sensor and their integration with off the shelf hardware is disclosed in this Example. A PID control system for both the optical and pressure sensing system is disclosed and the sensor calibration, static characterization, dynamic characterization, and demonstrated curvature feedback control were performed.

These results not only provide more knowledge on FEAs, including their nonlinearity, dynamic response and control complexity, but also demonstrates a low-cost, reliable, and easy to implement optical fiber based sensor. Though a constant curvature assumption was used for the model and to control the finger orthotic, multiple fibers can be included for piecewise curvature sensing.

EXAMPLE 3

Due to their persistent use and complex and delicate forms, hands and fingers are among the most vulnerable human parts. Over 3 million people in the United States suffer from hand or forearm disabilities, and worldwide hand injuries account for one third of all work injuries. Due to the importance of hands and prevalence of hand issues, there has been an increasing effort toward developing hand orthotics. Active hand orthoses have been shown to assist in rehabilitation training and the restoration of partial hand function. Many orthoses use mechanical compliance to ensure safety and to reduce control complexity. Mechanically compliant actuators use under-actuated linkages or low stiffness materials and structures (e.g., rubbers and flexible wires). Of these options, those composed of elastomeric materials tend to be comfortable because their very low elastic modulus (10 kPa<G'<1 MPa) is similar to that of human skin (~100 kPa).

Orthotic systems made of elastomers and powered with fluid pressure show potential for both rehabilitation and gripping assistance. Most systems are "open-loop" primarily due to sensor limitations in providing feedback-based control. Commercially available flexible sensors usually suffer from low sensitivity, low repeatability and severe drift. Liquid-metal based resistive and capacitive sensors can have great sensitivity but are presently expensive, requiring a multi-step construction process. Computer vision can provide high-quality position sensing and control, but the external camera system, besides being costly and complex, can interfere with the user's motion.

To address these issues, a low-cost, closed-loop controlled soft orthotic is disclosed. Reasonable functionality has been achieved at low cost using three advances: (i) manufacturing using a new rotational-casting technique followed by an over-molding process for the glove; (ii) a new use of optical losses in a molded-into-place etched plastic fiber-optic cable to measure finger motion; and (iii) a state-machine based, discontinuous control system of inexpensive pneumatic switches for actuation. The composite glove is purely polymeric and highly compliant, providing little resistance to natural motion when not pressurized. When inflated, the fingers of the glove curve and stiffen. The design and construction of the glove, the sensor, and the controller along with the functionality of the resulting product are disclosed in this Example.

Figure 17:
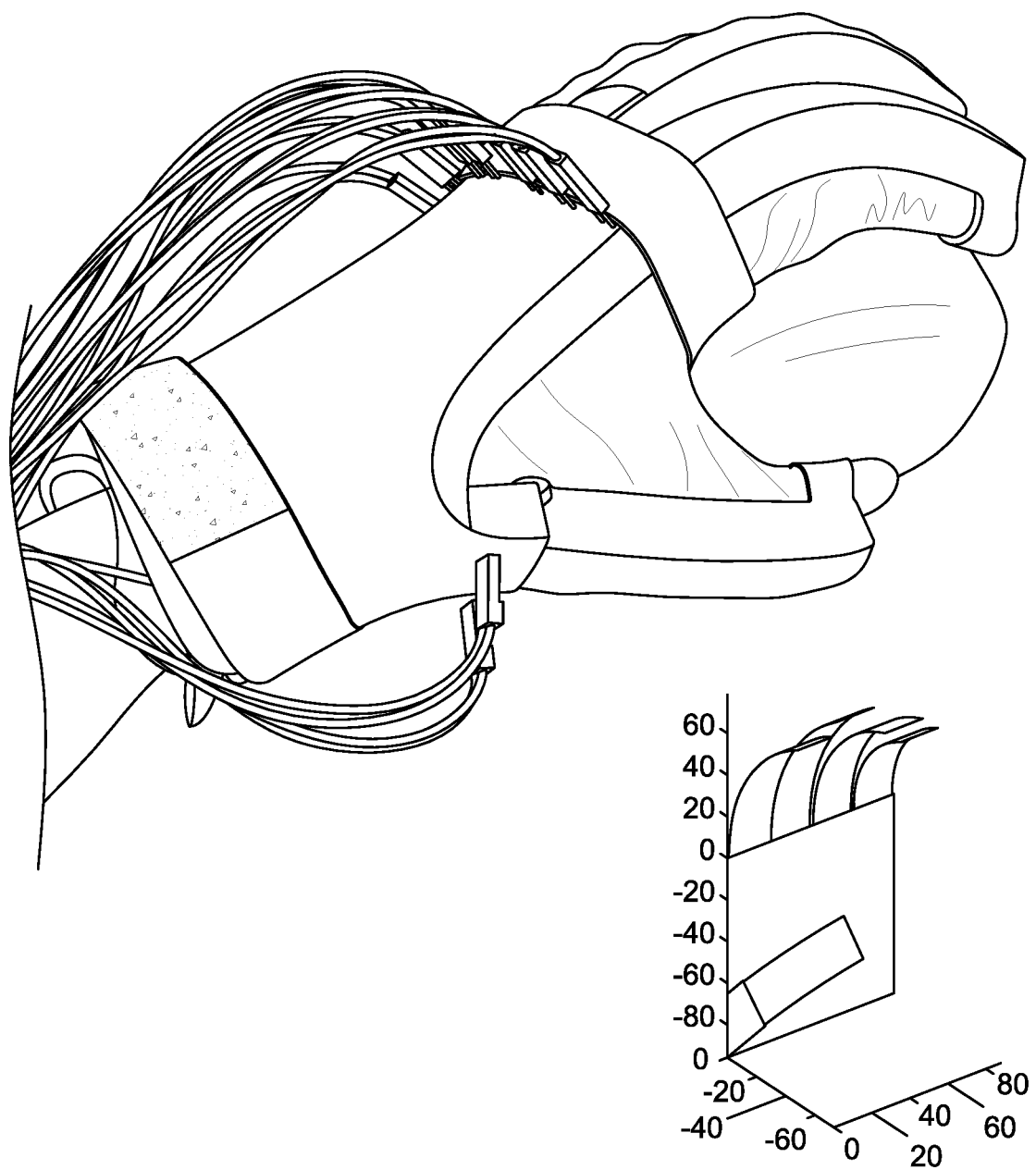
FIG. 17 is a picture of a soft orthosis that is configured to cause a limp human hand to grasp an apple at a prescribed curvature, wherein the insert shows a computer representation of the finger shape as estimated using curvatures sensed by the embedded fiber optic cables (used in the feedback control loop).

The overall design of the soft orthosis is shown in FIG. 17. The glove performs multiple functions: 1) it is an actively powered assistive device that helps each independent finger bend; 2) it is a self-contained sensing device such that the optical fibers that are molded into the fingers serve as curvature sensors, and thus approximate deflection, even when the device is unpowered; and 3) by combining actuation and control, the glove is a robotic hand in which the fingers can achieve prescribed configuration and trajectories.

Figure 18:
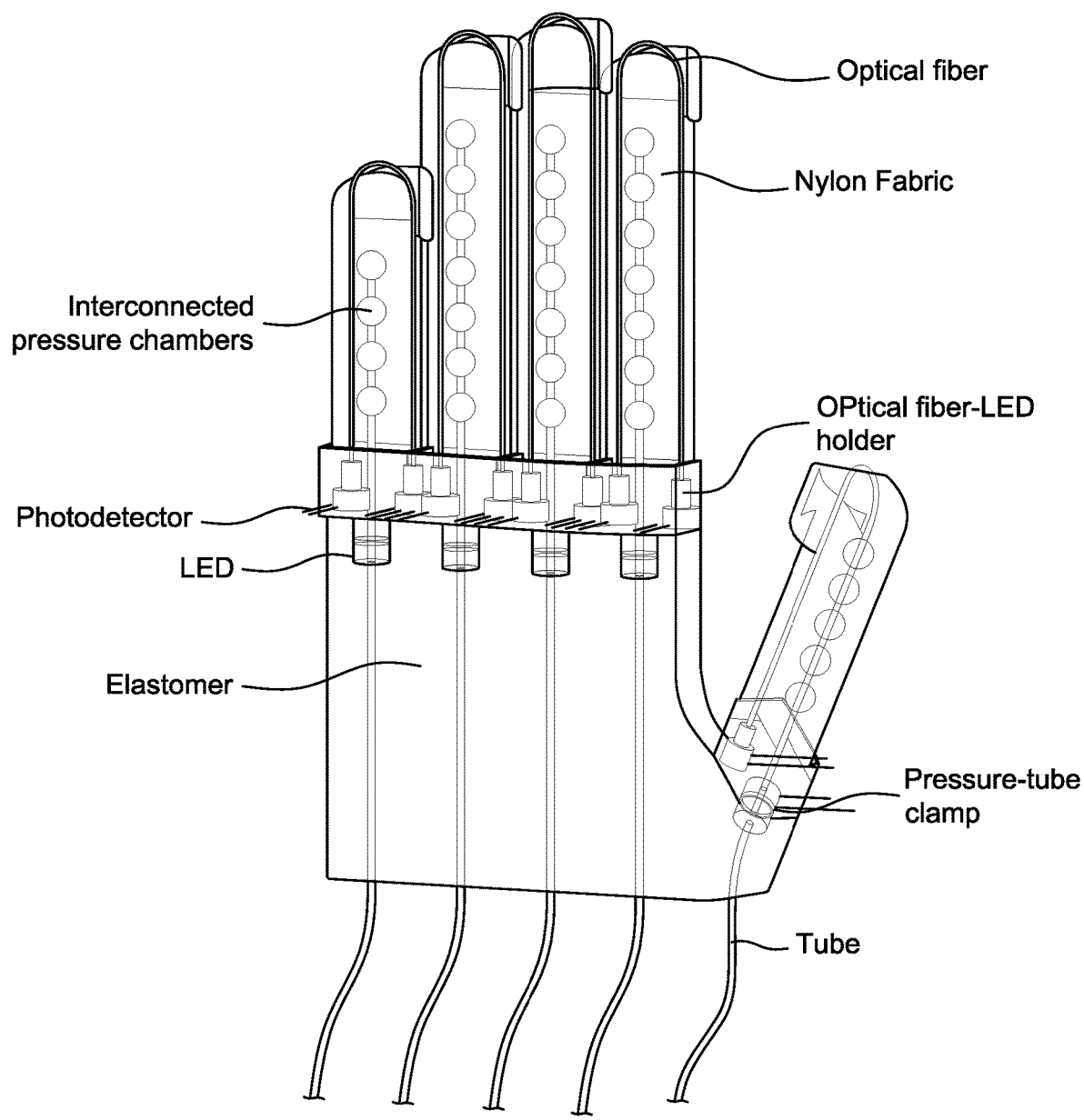
FIG. 18 is a schematic of the glove, wherein each finger includes LEDs, pressure-chambers, optical fibers, photodetectors, nylon fabric, clamps, air-supply tubes, and optical-component holders.

The body of the glove is made of a silicone elastomer (ELASTOSIL® M4601 AB; Wacker Chemie, AG) to which 10% Silicone Thinner from Smooth-On, Inc. was added (FIG. 18). Each finger has a series of interconnected air chambers and a relatively inextensible nylon fabric along the palm side of each finger to cause a grasping motion upon pneumatic inflation. In the language of beam theory, the neutral plane axis for bending is near to this strain-limiting fabric, and not in the middle of the finger.

The optical-fiber sensors go from the root of the finger to the tip and back, bent in a U around the nylon fiber and approximately in the bending beam's neutral plane. At one end of each optical fiber is an LED and at the other a photodetector (e.g., a photo-Darlington that reacts to light intensity by amplifying a current). These transmitter-sensor pairs are held to the fiber ends with custom 3D-printed holders and they are powered via thin electrical wires (seen in FIG. 17). Pneumatic power comes from an external pressure source via tubes that insert into holes molded into the wrist side of the glove. The tubes are connected to a pressure source via three-position (pressurize, hold, and drain) electrical solenoid valves.

Figure 19:
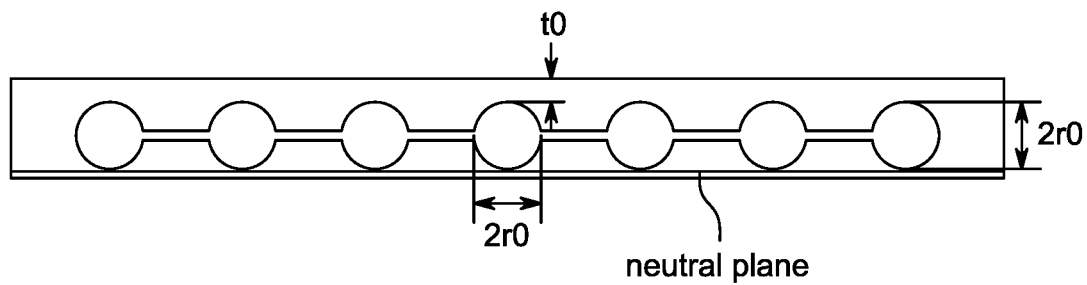
FIG. 19 includes cross-sections of the bending actuator: (a) rest state when no gas is applied; and (b) bending equilibrium state where internal pressure is balanced by the stretching of elastomer.
Figure 19:
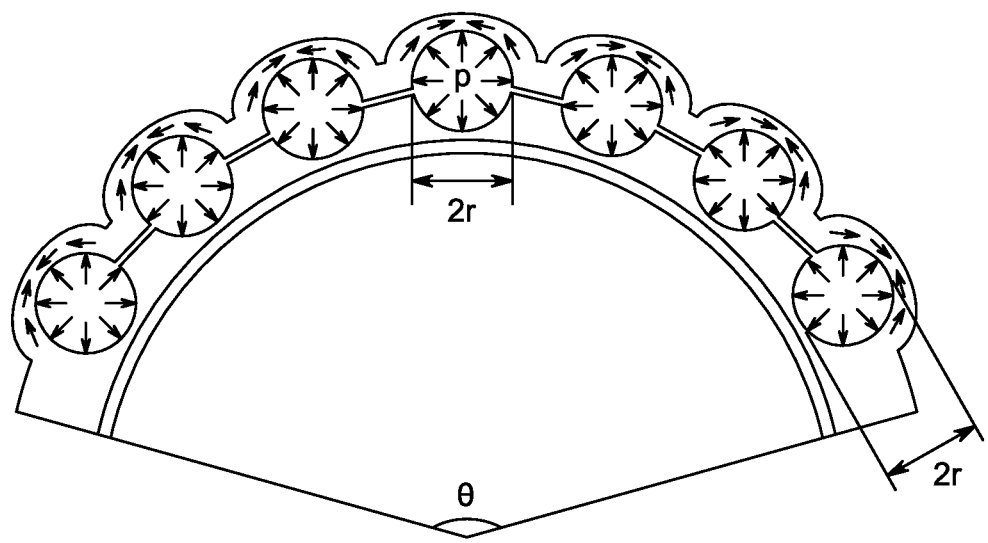

Each of the five fingers making up the soft orthosis has a series of interconnected hollow chambers. FIG. 19 shows the cross sections of a single finger in two configurations: (a) its "rest state," when the difference in pressure between the interior and exterior is zero (ΔP=0); and (b) bent to a degree caused by the pressure difference (ΔP>0).

This embodiment of an orthotic glove is constructed using a new rotational-casting technique followed by an over-molding process. The optical fiber sensor is also fabricated from an innovative method.

Figure 20:
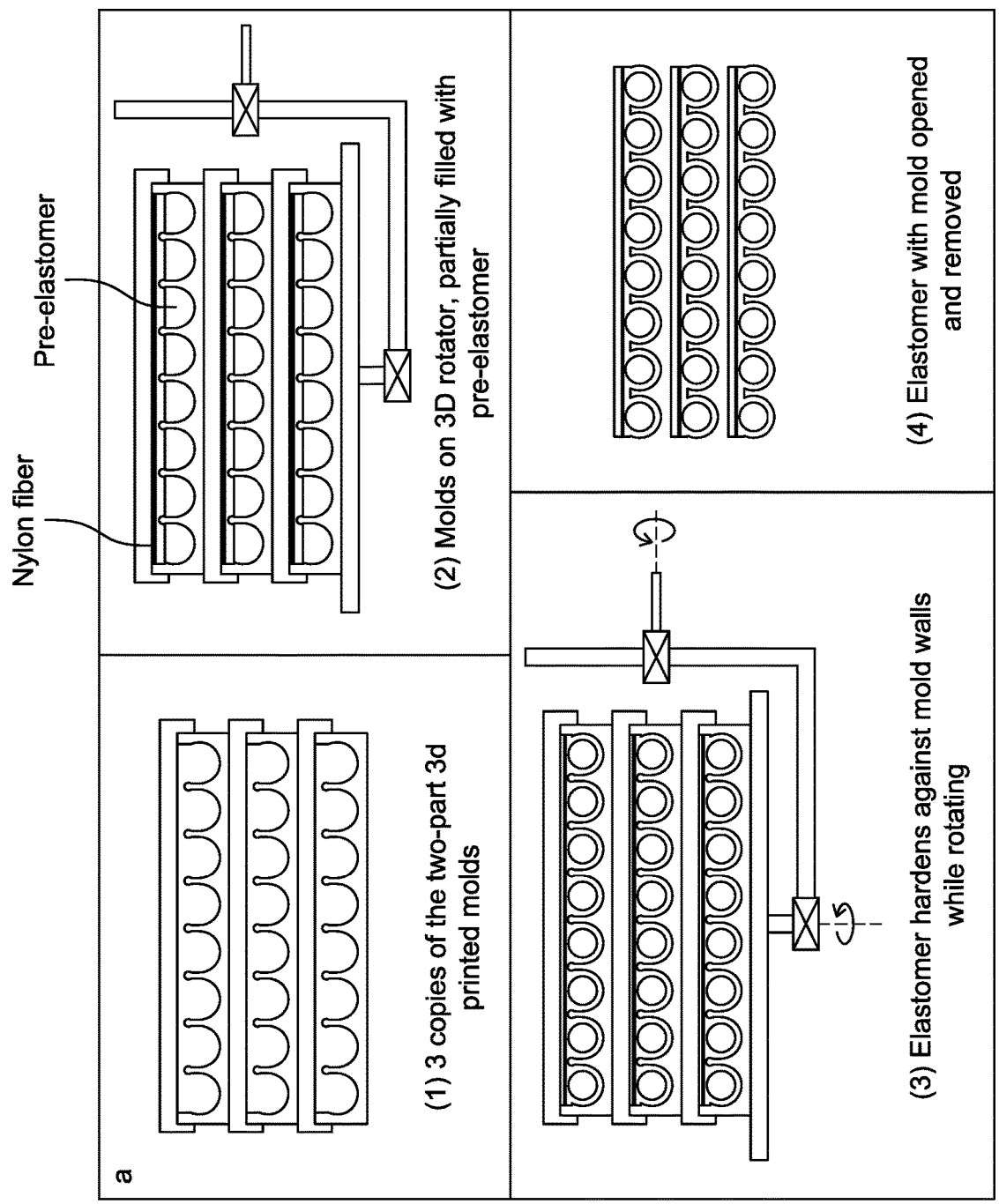
FIG. 20 illustrates rotational casting: (a) casting process: 1) molds; 2) partially filled molds; 3) rotational casting process; 4) final elastomer structure; (b) rotational casting machine with multiple molds affixed; and (c) molds used (top) and monolithic elastomers produced from those molds, with cross sections shown in the bottom right corner.
Figure 20:
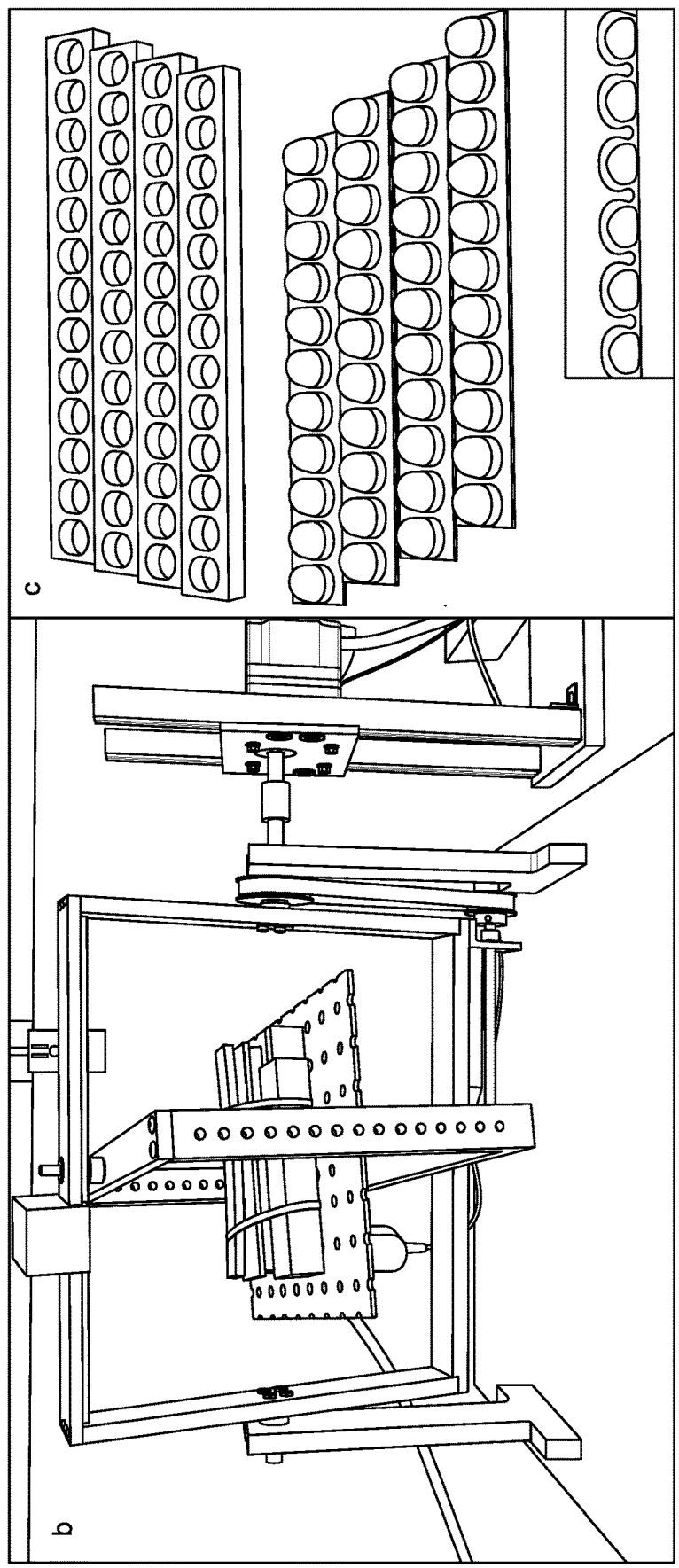

There exist several methods to produce soft actuators, each with its own drawbacks. Replica molding (also called soft lithography), can lead to delamination at material bonds. Investment casting (also called lost-wax casting) involves the building and destruction of molds for each part, which is costly and time consuming. Using rotational casting, however, reusable molds were used to produce, simultaneously, multiple actuators that do not suffer from delamination when pressurized (FIG. 20). Re-usable molds can be 3D printed, partially filled with viscous pre-elastomers, fixed onto the casting machine, and rotated until the materials inside the mold cure into solid elastomers. Finally, the actuators are peeled from the molds (FIG. 20c).

Figure 21:
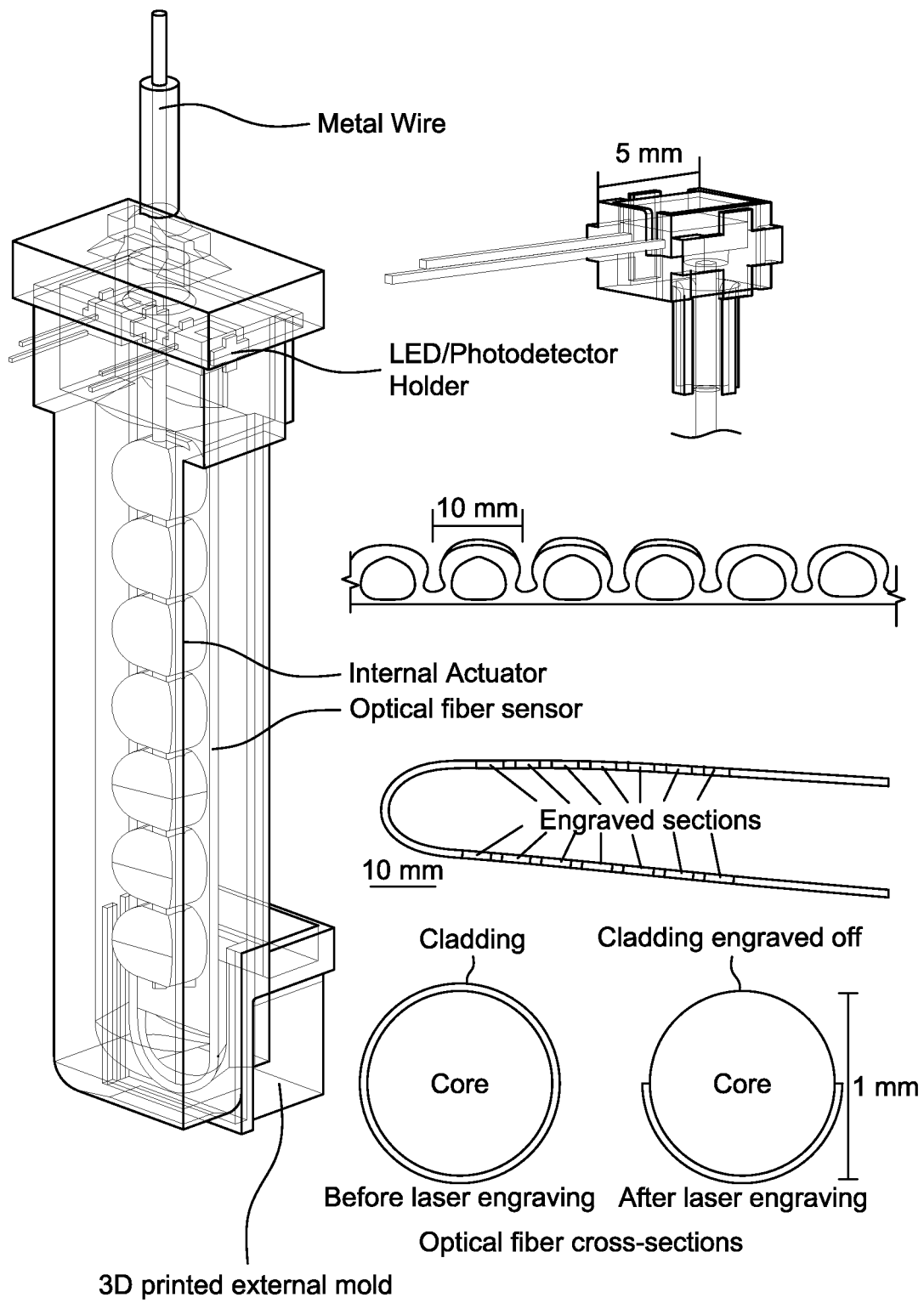
FIG. 21 illustrates over-molding of different components, wherein internal chambers of the actuator are aligned with the over-mold, one end of the U-shaped optical fiber sensor attaches to the fixtures in the over-mold, the fixtures are attached by the pins of the LED and photodetector, and silicone pre-elastomer is poured into the over-mold to form a single finger actuator with sensors after assembly.

The strain sensor is a light guide fabricated from a piece of plastic optical fiber. The light guide is first shaped into U shape via thermoforming at 50° C. Then a thin layer of the u-shaped piece is taken off from one side using a laser engraver (50 Watts Epilog Zing 24; FIG. 21 shows cross sections of the un-etched and etched light guide). By engraving, the cladding layer of light guide was taken off or destroyed and, therefore, the trapping of light through total internal reflection is reduced. In other words, part of the light is lost when travelling the length of light guide. Because only one side is engraved, the amount of light dissipation is affected by bending, and the light intensity lost from the light guide can be measured via a light sensor and this raw data can be translated into curvature. The u-shape is chosen to reliably align the engraved side of the light guide with the compression from both the wearer's finger and the actuator bending (FIG. 21).

If too much of the light guide is engraved, the light dissipation can saturate while the light guide sensor is still in a desired working range of curvature. To ensure the sensor lies below this saturation limit, the light guide was partially engraved in an alternating sequence. The optical fiber sensor responds to both extension and compression of the engraved side. Bending compresses the engraved side is preferable because there is an increasing light transmission along the light guide if it is oriented in that way. In addition, by compressing the engraved side of the fiber, the likelihood of fatigue fracture of the light guide due to repeated tensile stresses applied to the micro-cracks introduced during the engraving process is reduced.

After preparing the internal chambers from rotational casting and the lossy light guide sensor from laser engraving, these were assembled into a 3D printed finger mold and over-molded into a self-contained finger actuator. As shown in FIG. 21, a steel wire was used to connect the internal actuator and the mold cap to make sure the internal chamber was fixed in the correct position and orientation inside the mold. The wire also connected the separate chambers together after it was taken out after molding. A custom 3D-printed holder was used to connect the optical fiber sensor, the LED, photodetector, and to fix the optical fiber sensor into the correct position and orientation. After assembling, more silicone pre-elastomer is poured into the mold to over-mold into a complete finger with integral actuator and sensors. After molding five fingers of appropriate lengths, the fingers were cast into a complete hand orthosis.

Figure 22:
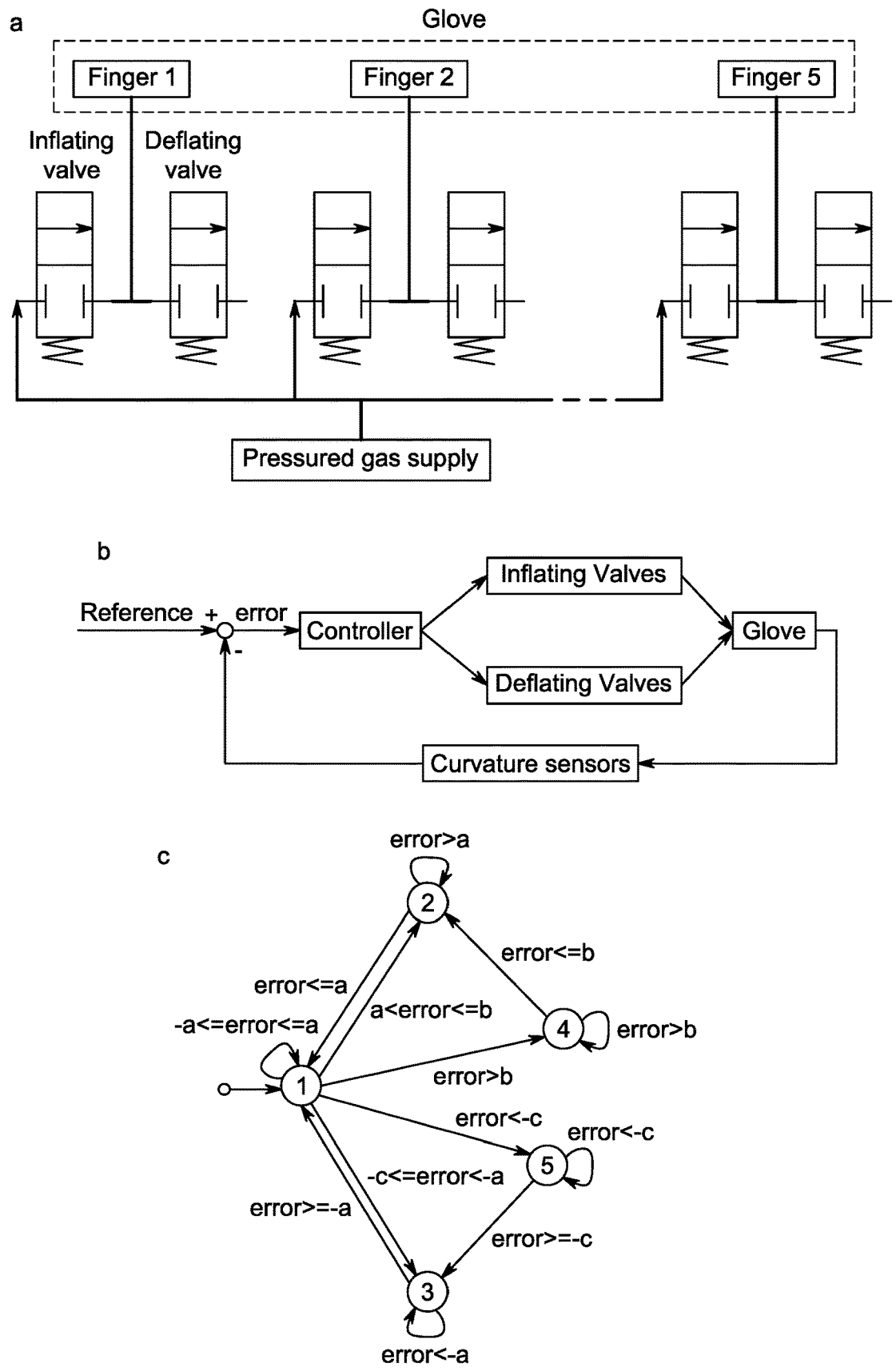
FIG. 22 illustrates a control system: (a) diagram of how each finger is connected to the gas supply through valves; (b) block diagram of the control system; (c) controller represented in a state machine diagram, wherein error is calculated from the current measured value subtracted from the targeted value and a, b and c are three threshold parameters to compare with error, and wherein definitions of state 1 to 5 are in Table 3.

The control system uses the state machine controller shown in FIG. 22. Actuation was achieved using a 3-position valve (air in, hold, and air out) for each finger. Each 3-position valve was implemented using two 2-position valves (air in and air out) and a pressure manifold. These flow control valves were actuated to control the curvature of each finger. The control signal is nonlinear and is based on simple logic: air flows into the actuator chamber to increase curvature, and air is let out to decrease curvature. If the curvature is within a deadband of the target then flow is stopped, maintaining actuator pressure and preventing set point hunting. Near the deadband region, state transitions are slowed down to prevent control oscillations due to overshoot.

Two 2-way, normally closed valves (FIG. 22a; X-valve from Parker Hannifin Corporation) were used for each finger. These valves are driven by power transistors (TIP120). The inflating valve connects the gas source to the actuator, and the deflating valve vents the actuator to the atmosphere. When the inflating valve is open and deflating valve is closed, gas from the source pressurizes the actuator, which is the "in" state. When the inflating valve is closed and the deflating valve is open, gas vents from the actuator to atmosphere, which is the "out" state. When both are closed, gas remains inside the actuator, which is the "hold" state. A hardware schematic and controller block diagram can be found in FIG. 22a, b. Due to the time delay of the output (curvature) from an input (gas entering the actuator), caused by the viscoelastic properties of the material and the mass transport of gas, a simple on-off controller with a deadband will lead to oscillations. A small deadband will not mitigate this behavior, and one large enough to prevent oscillations will result in poor system response in terms of accuracy. To prevent oscillations and maintain a desirable system response, new states were added between the "hold" state and "in" or "out" states. The full controller is shown in FIG. 22c and Table 3.

TABLE 3

| State | Inflating valve | Deflating valve | Comments |
| --- | --- | --- | --- |
| 1 | Off for Δt | Off for Δt | "Hold" |
| 2 | On for Δt, then Off for XΔt | Off for (X + 1)Δt | "In and hold" |
| 3 | Off for (Y + 1) Δt | On for Δt, then Off fo (Y + 1) Δt | "Out and hold" |
| 4 | On for Δt | Off for Δt | "In" |
| 5 | Off for Δt | On for Δt | "Out" |

The state-machine controller has five states with transition between them determined by error, which is the difference between the reference and measured curvature. There are three threshold parameters in the state-machine controller: "a" defines the deadband region of small-enough error, where large a's prevent constant attempts at correction; and "b" and "c" define the thresholds of the large-error region. When these thresholds are exceeded, inflation or deflation is continuous, driving the system as quickly as possible towards the prescribed curvature. Between the high and low error regions, two settling time variables "X" and "Y" for positive error and negative error, respectively were introduced to allow system transients to subside when approaching small errors. In general, a determines the accuracy of tracking but leads to an instability if set too small. Increasing b and c will increase stability but decrease the actuating speed. X and Y represent how long to wait during both the "in and hold" and "out and hold" states, which increases X and Y, improves stability, and decreases speed. Decisions about whether to change states, using the parameters above, are made repeatedly every sampling period $\Delta t$.

Comparatively, a previous controller used an inner pulse-width modulation (PWM) control loop to regulate pressure and an outer control loop that uses this pressure to regulate curvature. Its settling times ranged from 2-12 seconds, which may be slow, yet it has been used in other systems. The new controller yielded fair performance with little overshoot, no steady-state oscillations, and reasonable tolerance to changes in source pressure or finger composition.

Figure 23:
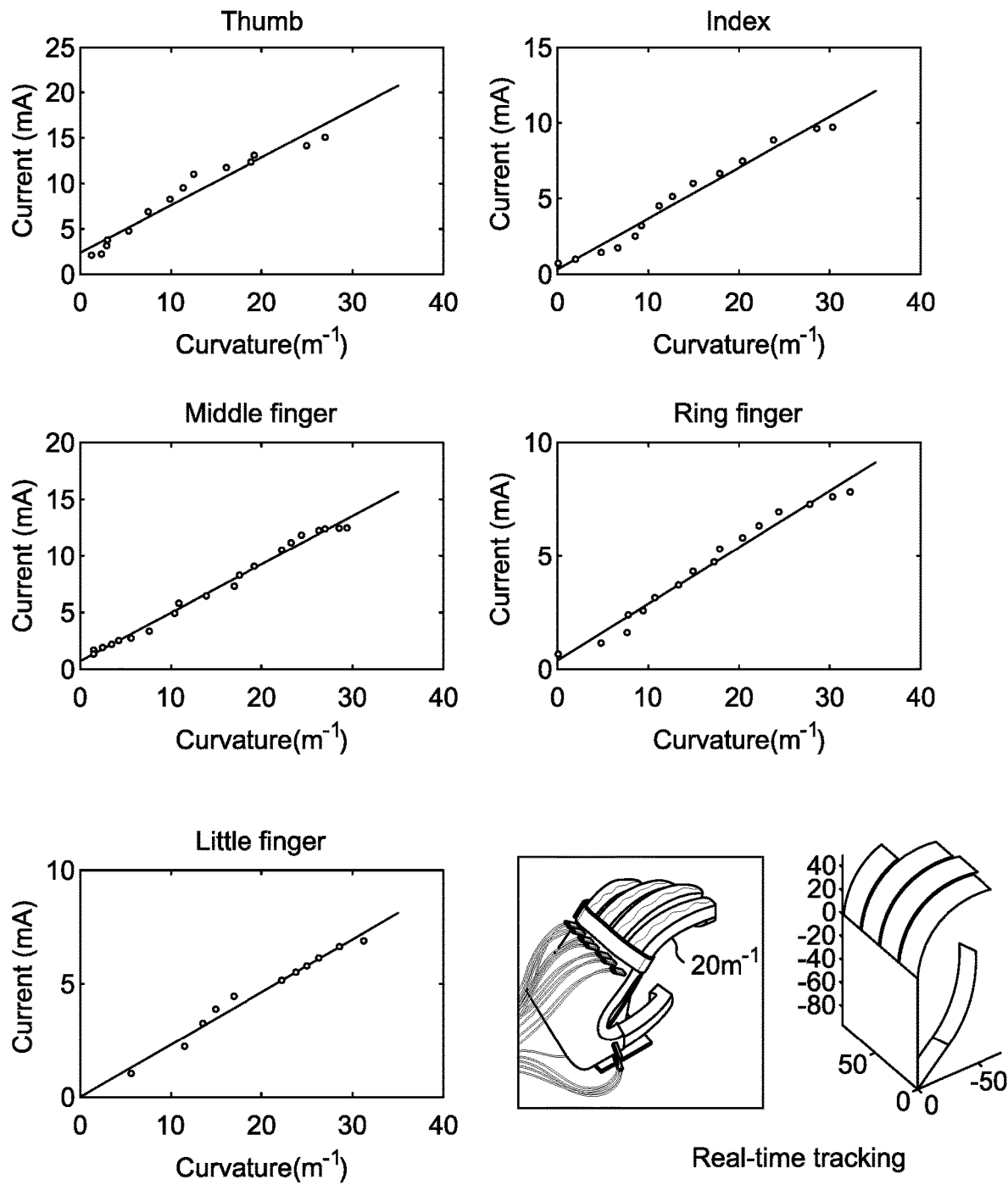
FIG. 23 shows photodetector current output at various curvatures of the actuators, wherein dots are measured results and lines are linear fits, and wherein the last figure shows the real time curvature tracking of the glove after calibration where all fingers are bent at a curvature of 20 $m^{-1}$.

To calibrate the curvature sensors, each finger was imaged from a viewpoint perpendicular to the neutral plane of the actuator while measuring the current output (I) from the photo-detector (FIG. 23). The curvature ($\kappa$) was calculated by picking 4-7 points (determined by the number of chambers in the actuator) from each picture and fitting them to a circle. For curvature from 0 to 35 m^(-1), the calibrations of all five fingers were linearly fit with a sensitivity ($\kappa \propto \Delta I/\Delta \kappa$) range of $0.23 < \lambda < 0.49$ mA·m. This sensitivity can be adjusted by changing both the engraving pattern and LED intensity. Some other features of this sensor include: (i) a fast response time of 5 ms; (ii) a high resolution of 0.04 m^(-1); (iii) excellent repeatability of 0.05 m^(-1), measured by the standard deviation of a single curvature over five different tests. The sensor, however, has a nonlinear response beyond the range that was tested, wherein $\lambda$ decreases at higher curvatures.

After all five sensors were calibrated, an interface for visual simulation of the motions of the soft orthosis was developed, as shown in FIG. 23.

Figure 24:
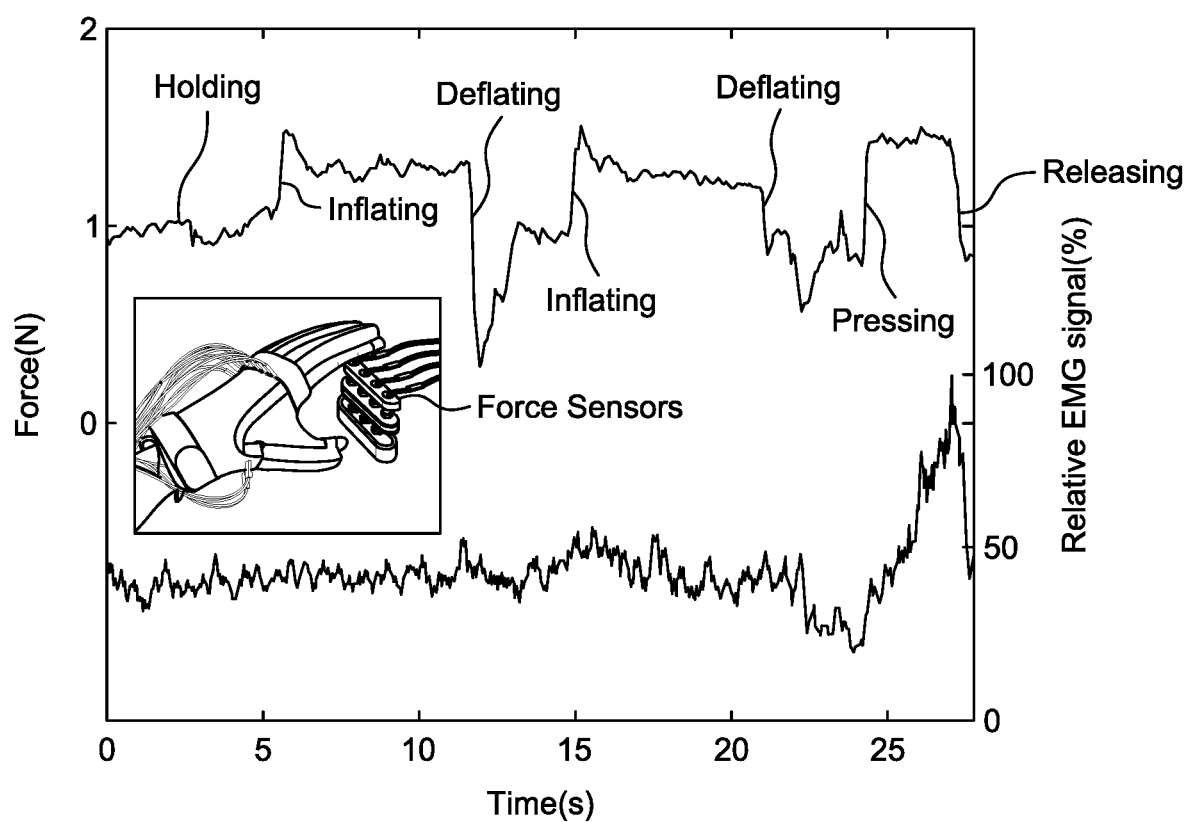
FIG. 24 illustrates a force test by wearing the glove, wherein a hand exerciser with force sensor attached to each button was held by the user and the EMG signal was recorded at the same time.

To better understand how this orthosis functions as a hand assistive device, the applied force of four fingers was measured while monitoring the EMG intensity as a measure of the user's metabolic power consumption. A healthy user wore the glove and held a hand exerciser as shown in FIG. 24. On each button of the hand exerciser, a force sensor (FlexiForce A301 Sensor from Tekscan) was attached to record the force exerted on it. Simultaneously, forearm muscle exertion was measured using a Myo armband (manufactured by Thalmic Labs Inc.) that uses eight EMG sensors applied uniformly around the forearm.

The wearer pressed the four buttons to an average force of 1.0 N. Then the orthosis was activated. An immediate increase in force from 1.0 N to 1.6 N was observed, which then dropped to 1.4 N. The orthosis was then depressurized and an immediate drop in applied force to 0.3 N was observed, which then rose up to 1.0 N. This process was repeated with similar results. Finally, the user was asked to press the buttons to achieve a force of 1.6 N, using solely their own effort.

From the above experiments, the actuator caused a significant impulse force when activated and deactivated, and the system then reached a stable state. During the later period, when the user was achieving 1.6 N of applied force from 1.0 N, an increase of the EMG intensity (the summation of all eight sensors of the armband) was recorded. While the user was applying 1.0 N of force and the orthosis was augmenting to 1.6 N, the measured EMG intensity remained constant. This experiment demonstrated that the orthosis was assisting the user by augmenting his force by a factor of 1.6, saving metabolic consumptions.

To test the performance of the controller, reference-tracking tests of step inputs were first performed. The controller ran in an Arduino Mega using a sampling frequency of 200 Hz ($\Delta t$=5 ms). To track the curvature signal, the current from the photodetector was directly used as the output and feedback variable. a=0.1 mA, X=Y=3 was set and three different values of b and c were chosen.

Figure 25:
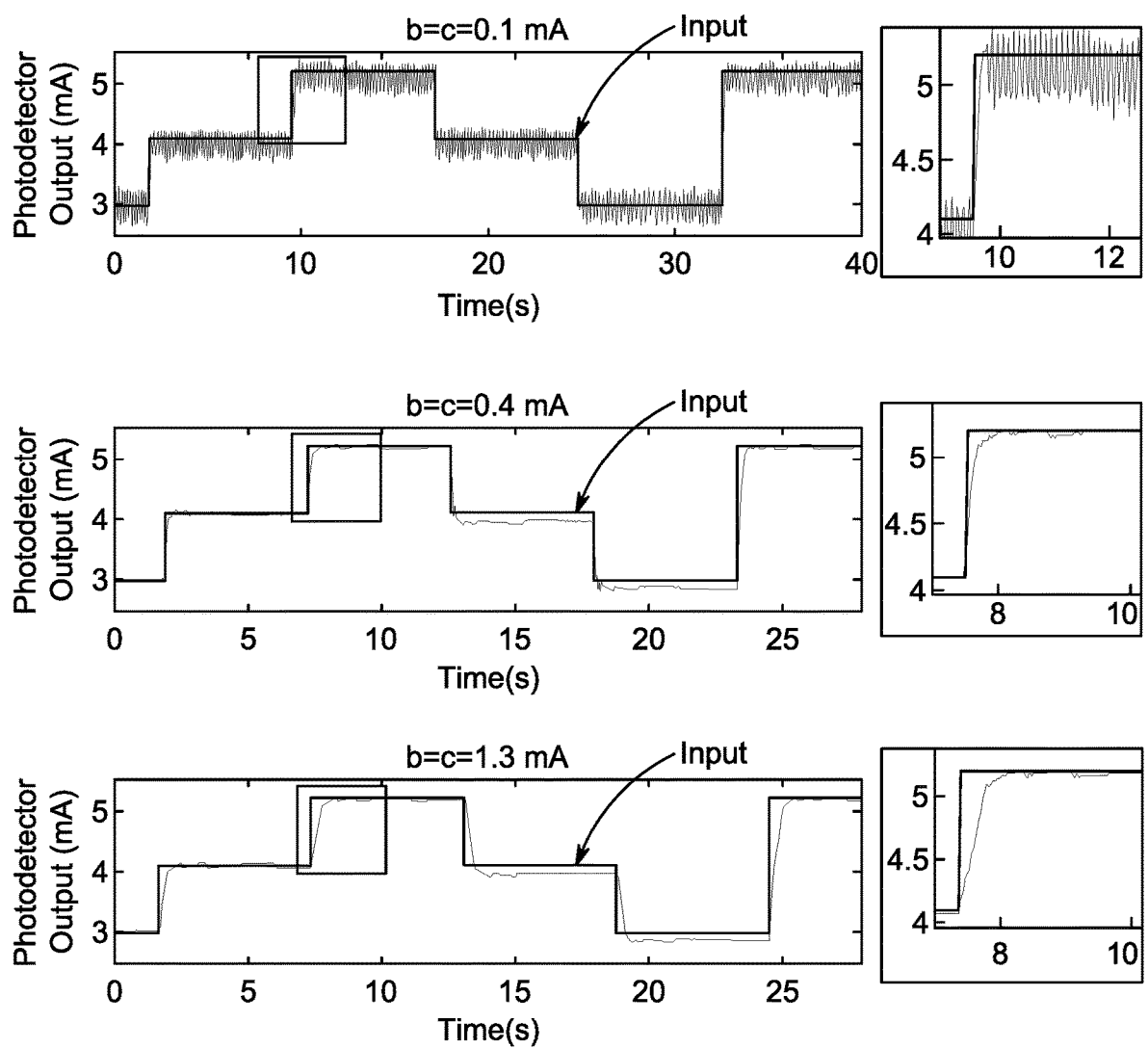
FIG. 25 shows step response of the controller with three different parameter sets, wherein straight lines are the input signals and wavy lines are the output signals, and wherein the right plots show enlarged views of step response data corresponding to the boxes in the left plots.

The controller's step response was tested by inputting several step stimuli along time (FIG. 25). When b=c=a=0.1 mA, the controller became an on-off controller with dead-band and no transitional states and a high degree of oscillation around the reference signal was observed. When b=c=0.4 mA, good accuracy (within 0.1 mA), good stability (no oscillation or overshoot), and high speed (rising time of about 150 ms) were observed. When b=c=1.3 mA, the rising time increased to 500 ms.

To demonstrate the potential of the orthotic towards a goal of using EMG signals for intuitive control of orthotics to follow the user's intent, an EMG signal was used to translate the wearer's intent into the bending curvature of the finger actuators. Using a filtered EMG signal as a reference is a control strategy for a hand orthosis to transfer the user's own intention to the motion or force output of the orthosis.

Figure 26:
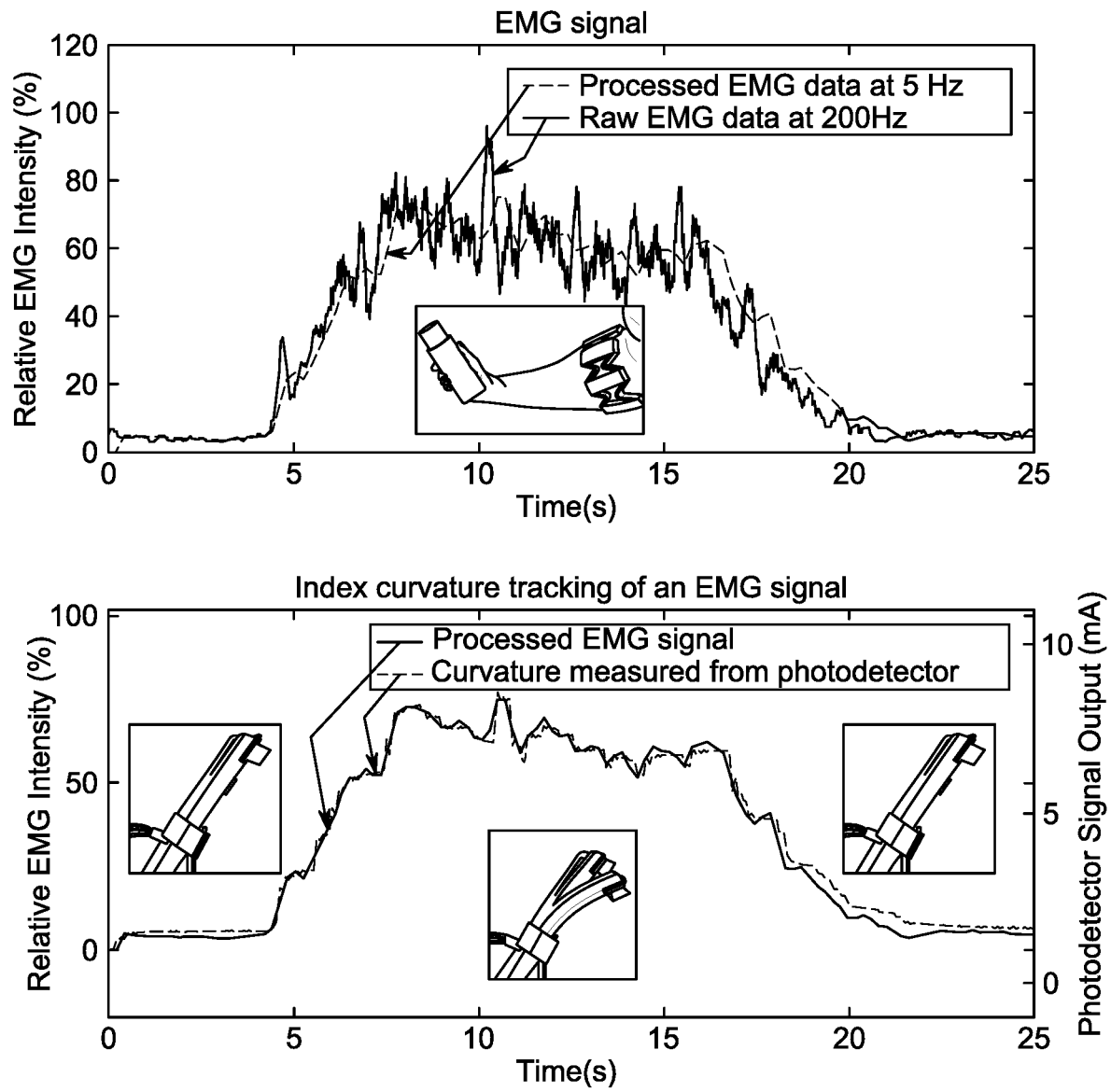
FIG. 26 shows index curvature tracking of an EMG signal collected from a healthy user.

Instead of a Butterworth low-pass filter for processing of myoelectric signals, the resultant reference signals were not desirable for control methodology, wherein constant force application by the fingers did not translate into a constant filtered signal. An EMG signal was collected from a user's forearm using the Myo armband at 200 Hz and used a moving average filter of 100 samples every 200 ms to produce a 5 Hz signal with less noise. This signal was then fed into the controller as the reference signal. FIG. 26 shows both the raw EMG signal and the processed data for tracking. The results show that the orthosis using a state machine controller can follow an EMG signal very well, with small deflection and small oscillation.

Elastomeric actuators, powered via fluid pressurization are excellent candidates for orthotic devices due to their intrinsic compliance and low elastic modulus for improved safety and comfort. Both the hardware and control method for a closed loop soft orthosis and performed initial quantification of its force augmenting capabilities are disclosed in this Example. The feedback control via optical fiber sensors embedded into the orthotic was achieved and the controllers for tracking reference signals and realizing intuitive control from an EMG signal were disclosed.

However, the materials and actuator design may not produce enough force or torque to conduct many daily activities for people living with hand disabilities that require high forces. For example, opening a jar requires a torque of about 1 to 2 N·m, which requires tens of Newtons of normal force on a 10 cm diameter lid. Tougher materials in the actuator can enable higher forces. Controllers can be designed to improve the system's reference tracking ability. Compliant force sensors can be incorporated into the system to realize stiffness and compliance control to enable improved interaction with the wearer's environment. Ultimately, this work shows promise beyond the field of orthotic devices and can be extended into the field of EMG controlled prosthetic devices. The low cost of the device, coupled with intuitive control, can allow a wider population of patients in need of upper limb prostheses to improve their quality of life.

EXAMPLE 4

It may be desired to form a prosthetic hand that can achieve both dexterous manipulation and rich sensation. Fluidically actuated soft actuators show potential as prosthetics and orthotics, and are lighter, undergo continuous and more natural deformations with simple control, easier to fabricate, compared with their motor-driven counterparts, yet lack of reliable, easy to fabricate, safe and chemically stable stretchable sensors. The use of stretchable optical waveguides for strain sensing in a prosthetic hand is disclosed. These photonic strain sensors are easy to fabricate, chemically inert, demonstrate low hysteresis and high precision in their output signals. As a demonstration of their potential, the photonic strain sensors were used as curvature, elongation, and touch sensors integrated into a fiber reinforced soft prosthetic hand. The synthetically innervated prosthetic hand was used to conduct various active sensation experiments inspired by the capabilities of a real hand. Results demonstrated that, soft prosthetic hands could not only perform dexterous manipulation, but also achieve various haptic sensing, through simple innervation and control.

Human hands not only serve prehensile functions, but also serve as powerful sensory organs: humans feel the world by sense of touch mostly through their hands. Hence, the loss of a hand means not only losing the ability of grasping, manipulating and holding, but it also closes a door to sensory perception. Hand amputees can no longer touch and feel through the amputated hand. Therefore, an ideal prosthetic hand should achieve dexterous manipulation as well as rich sensation. Fortunately, many kinds of brain-computer interfaces (BCI) are being developed to realize the direct communication between human brain and external devices, and the effectiveness of using feedback sensation to enhance the functionality of prosthetic hands has been demonstrated by other researchers through patient-involved experiments. This disclosure seeks to increase sensation in a soft and dexterous prosthetic hand.

Advanced prosthetic hands have realized dexterous motions by increasing the number of degree of freedom (DOF) or using under-actuated mechanisms. Most of these hand prosthetic systems are powered by motors. Recently, fluidically powered soft actuators have shown their potential as prosthetics and orthotics; these devices, compared with motor-driven counterparts, are lighter, undergo continuous and more natural deformation with simple control inputs, are easier to fabricate, and due to their liquid phase processing are more likely to be realized in mass production (e.g., replica molding, injection molding). Very few soft prosthetics, however, have demonstrated equivalent sensing ability as motor-driven hand prosthetics, which many times achieve proprioceptive sensing through motor motion encoders and realize force sensing through multi-axial Force/Torque load cells, which are bulky and rigid. On the contrary, fluidically driven soft systems operate via stretching of their bodies at strains, $\varepsilon=(L-L_0)/L$, >50%. Most existing sensors are incompatible with these large strains and, while excellent efforts are being made in the area of developing stretchable sensors for soft actuators, there is still an opportunity for reliable, easy to fabricate, safe, and chemically stable ones.

This embodiment uses of stretchable optical waveguides for strain sensing in a prosthetic hand. These photonic strain sensors are easy to fabricate, chemically inert, demonstrate low hysteresis and high precision in their output signals. As a demonstration of their potential, the optical waveguides are used in this embodiment as curvature, elongation, and touch sensors integrated into a fiber reinforced soft prosthetic hand. This synthetically innervated prosthetic hand is used to conduct various active sensation experiments inspired by the capabilities of a real hand.

1. Stretchable Sensors Based on Waveguides

Disclosed herein is a sensor on the scale of human hands based on an optical waveguide composed entirely of elastomeric material. This waveguide is fabricated to be intentionally lossy. Thus, as light propagates through it some radiates to the environment, and the more it is deformed the more light is lost. The amount of light power loss is the output signal for strain. Specifically, the sensory waveguide is a step index multimode optical fiber composed of a high index of refraction, $n_{core}$~1.46, core with cross sectional area $A_{core}$~1 mm×1 mm, clad with a lower $n_{clad}$~1.40 elastomer of $A_{clad}$~3 mm×3 mm. To fabricate the stretchable waveguide, a four step soft lithography process is used (FIG. 28A): (i) 3D print a mold for making the cladding, (ii) pour pre-elastomer for cladding into the mold and demold after curing, (iii) fill the cladding with the pre-elastomer of core material, and (iv) pour pre-elastomers of the cladding to enclose the core. Two holes are also cast at each end of the waveguide to house the LED and photodetector (i.e., photodiode). Soft lithography ensures that all structures of the initial mold are replicated in the final waveguide without any detail loss, including surface roughness.

Figure 34:
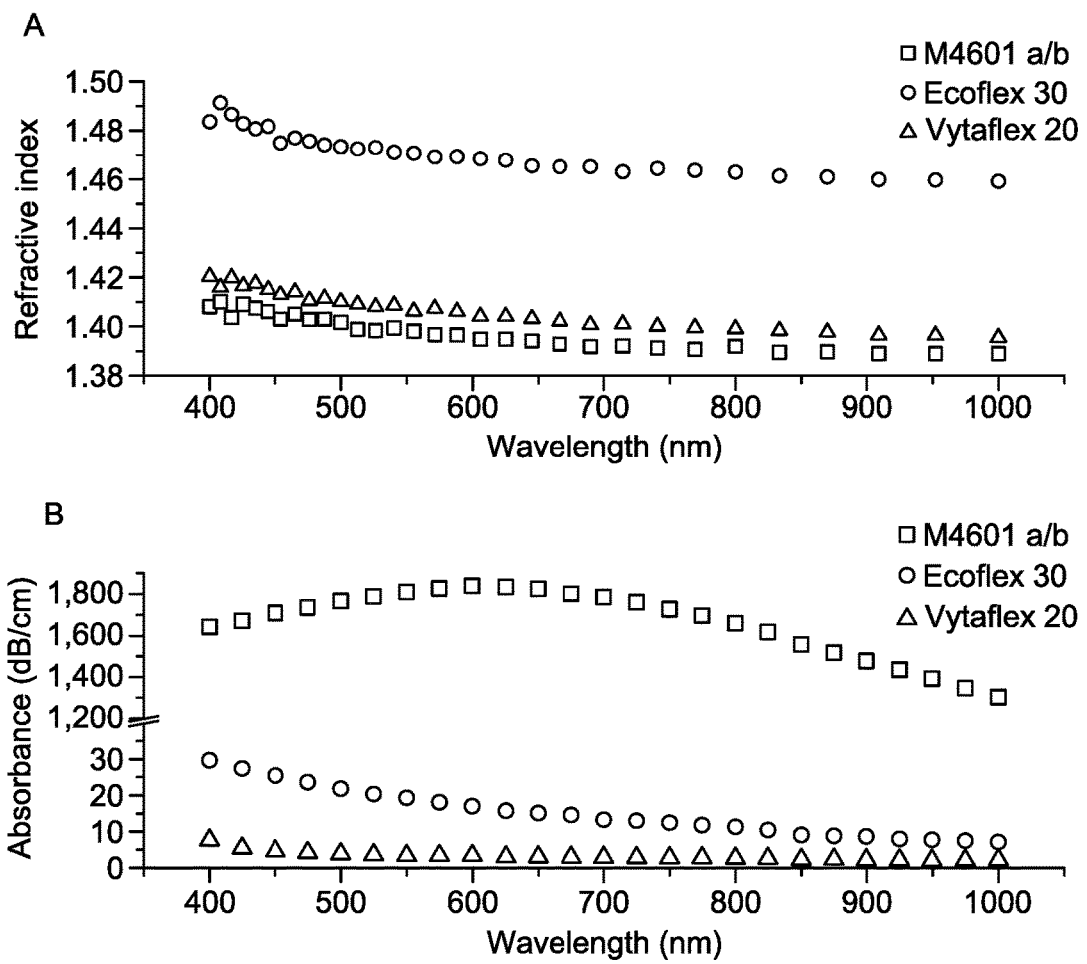
FIG. 34 shows optical properties of M4601 a/b, Ecoflex 30, and Vytaflex 20, wherein (A) refractive index over 400 nm to 1,000 nm; (B) absorbance over 400 nm to 1,000 nm.

The core material of the waveguide is a transparent polyurethane rubber (Vytaflex 20; Smooth On, Inc.) with a refractive index of $n_{core}$=1.461 and a propagation loss of 2.4 dB $cm^{-1}$ at a wavelength of 860 nm and the cladding material is a highly absorptive silicone composite (ELASTOSIL® M 4601 AB; Wacker Chemie AG) with a refractive index of $n_{core}$=1.389 and a propagation loss of 1,500 dB $cm^{-1}$ at a wavelength of 860 nm. The optical properties for these two materials over a larger wavelength range (400 nm to 1,000 nm) are shown in FIGS. 34A and 34B. Due to the relatively large difference in n for elastomers, the numerical aperture (NA=0.45 at 860 nm) ensures a large acceptance angle ($\theta_{max}$~26°) of light input and thus lowers the coupling difficulties for the LED and the photodetector at the extents of the waveguide.

The resulting waveguide provides several benefits.

Figure 35:
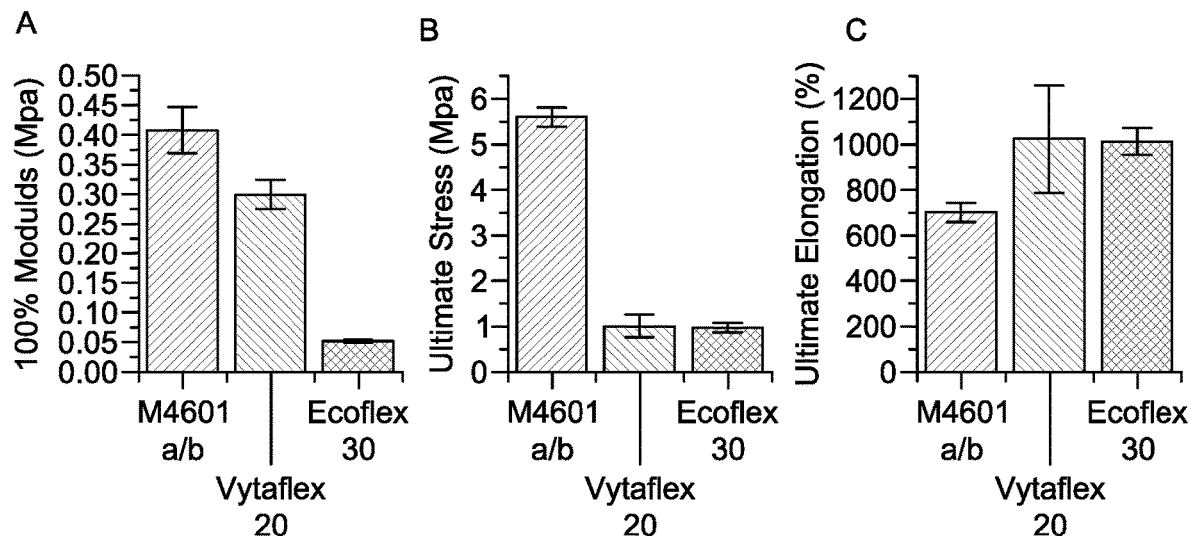
FIG. 35 shows mechanical properties of M4601, Ecoflex 30, and Vytaflex 20, wherein (A) 100% elastic modulus; (B) ultimate stress; (C) ultimate elongation.

(i) It is highly compliant and stretchable. The core material has an ultimate elongation, $\varepsilon_{ult}$~10 and elastic modulus, E'~300 kPa (measured at 100% strain) and the cladding material is of $\varepsilon_{ult}$~7 and E'~400 kPa (FIG. 35). The combination of compliance and extensibility allows these waveguides to operate as bending, elongation and pressure sensors.

(ii) The core material has a relatively large propagation loss as compared to ones used for fiber optic communication. As the waveguides are applied to prosthetic hands for sensation, this relatively large propagation loss improves sensitivity during elongation while still allowing a detectable amount of light over the size scales of a human hand using a low-cost photodiode and a simple current amplifying circuit.

(iii) The cladding material is light absorptive (1500 dB $cm^{-1}$). This low-index material not only serves as the cladding to ensure total internal reflection (TIR) for the allowing propagation of light inside the waveguide, but also serves as the jacket, protecting the core and forms the coupling house for LED and photodetector, preventing ambient light from altering the signal.

(iv) The molds for the optical waveguides are 3D printed using a polyjet printer (Objet 30). This fabrication process generates a surface roughness between the core and cladding of 6 nm (RMS, see FIG. 36). This relatively rough interface causes scattering and thus more loss of propagation, however, the design freedom of 3D printing allows for complex sensor shapes.

After the waveguides are fabricated, three of them are cast into a finger actuator using over-molding (FIG. 28E). The body of the finger is made of silicone elastomer (Ecoflex 0030, Smooth On, Inc.), whose optical and mechanical properties are shown in FIGS. 34A and 34B. The three dimensional integration of the sensors and actuators means the waveguides are parts of the body and they will deform when the actuator does, serving as proprioceptive sensors.

2. Characterization of Waveguide Sensors

The output power of a waveguide with no bending, no elongation and no pressing deformation is defined as the baseline power $I_0$. With the output power as I, the output power loss in decibel (dB) is then defined as:

$$a=10\log_{10}(I_0/I)$$

By this definition, the output power loss compared to the baseline is always 0; with increasing power, a<0 and with decreasing power, a>0.

Figure 36:
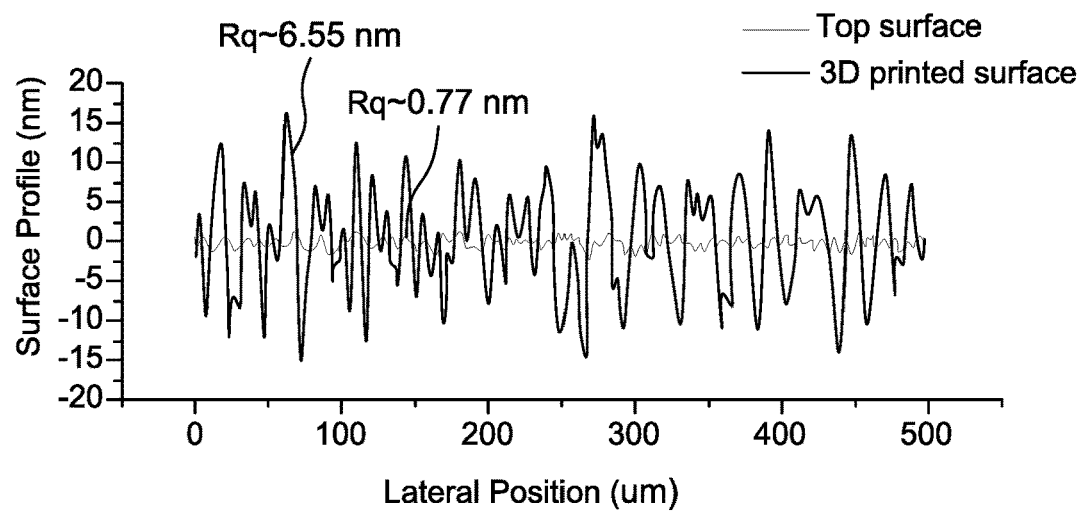
FIG. 36 shows surface profile of waveguide core/cladding interfaces.
Figure 37:
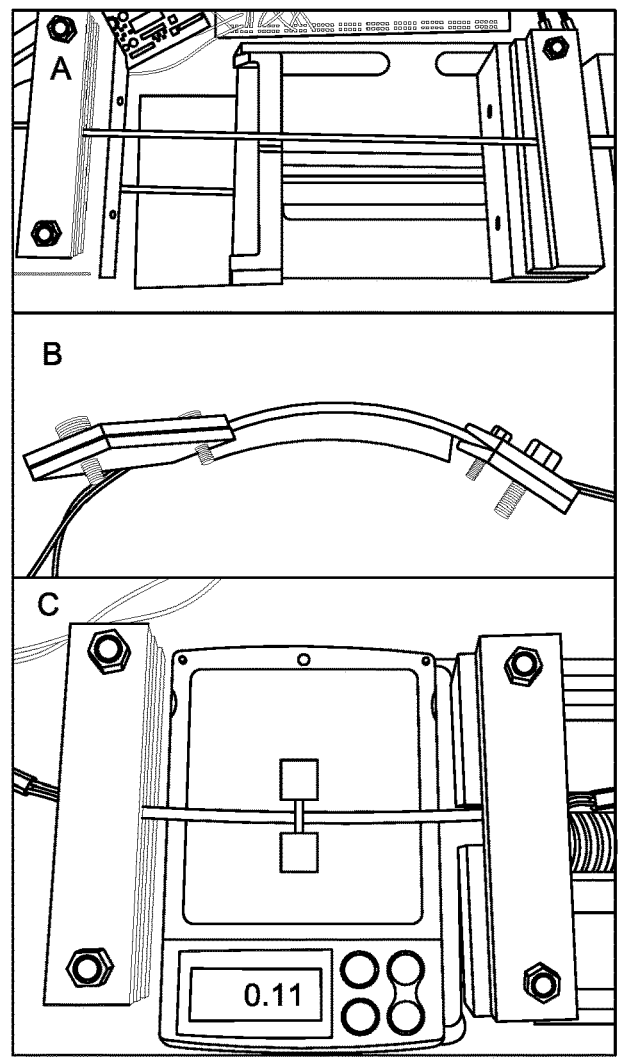
FIG. 37 shows characterization setups, wherein (A) elongation; (B) bending; (C) pressing.
Figure 38:
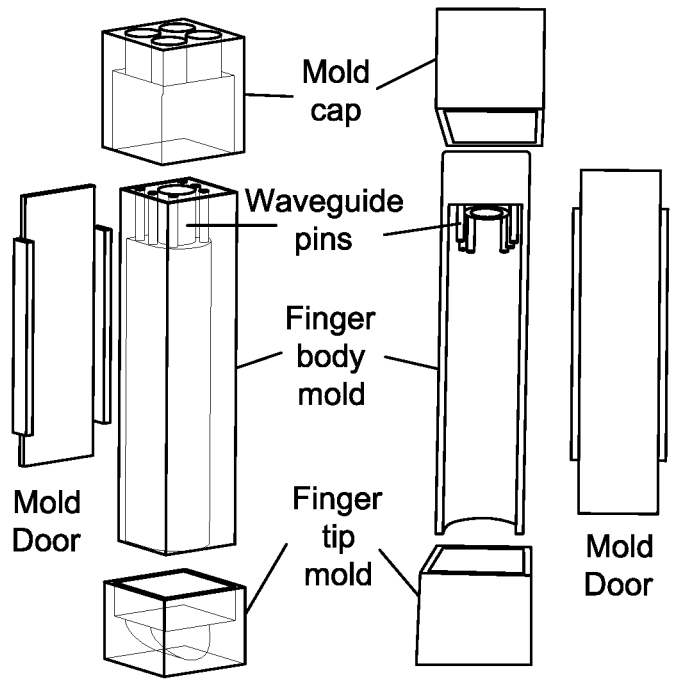
FIG. 38 shows a mold design for the middle finger.

To characterize the sensitivity of the waveguides during different deformation modes, the output power of a length of stretchable waveguide was measured during (i) elongation, (ii) bending, and (ii) pressing (see FIGS. 35-37 for characterization methods).

Elongation: For the elongation data (FIG. 29A), a highly linear response curve of power loss with strain was observed. This linear curve can be derived from the Beer-Lambert law:

$$A=eLc$$

Where A is absorbance, L is the path length, e is the absorptivity of the material and c is the concentration of the attenuation species. Assume constant e and c while stretching, A is proportional to L, and by definition of A, $$A=\log_{10}(I_0/I)+b=a/10+b$$

where b is the baseline absorbance. Strain is defined as $$\varepsilon=(L-L_0)/L_0$$

So that $$a=10ecL_0\varepsilon$$

and $10ecL_0$ is a constant.

Experimental results using a $L_0$=100 mm waveguide yielded a linear, stretch dependent loss of 2 dB cm$^{-1}$ over $\Delta e$~0.85 using an LED (peak wavelength ~875 nm, TSHA4400 from Vishay Intertechnology, Inc.) and a photodiode (380 nm-1100 nm, SFH 229 from OSRAM Licht AG); using different input power, input light frequency or photodetector, however, would change this sensitivity. It may be important to calibrate the waveguides accordingly. In addition to linearity, the waveguide when operating as a stretch sensor also shows high repeatability, high precision and high signal-to-noise ratio (error bars show the noise) over the tested range.

Figure 29:
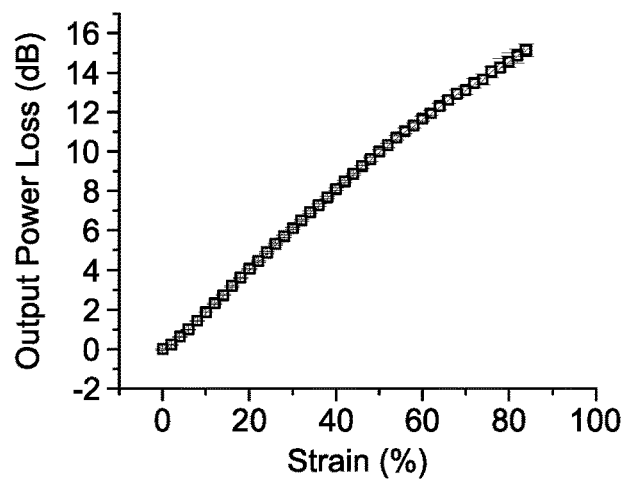
FIG. 29 is a characterization of waveguide sensor for: (A) pure elongation, (B) pure bending, and (C) pure pressing.
Figure 29:
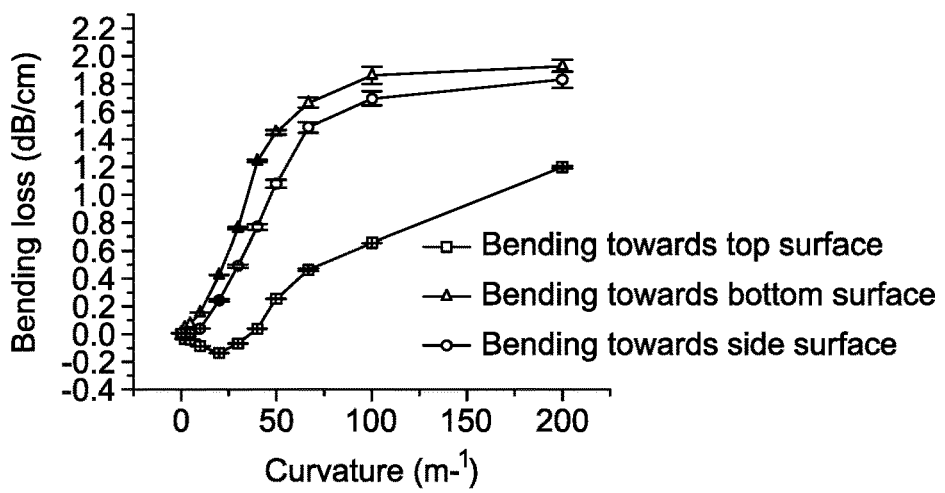
Figure 29:
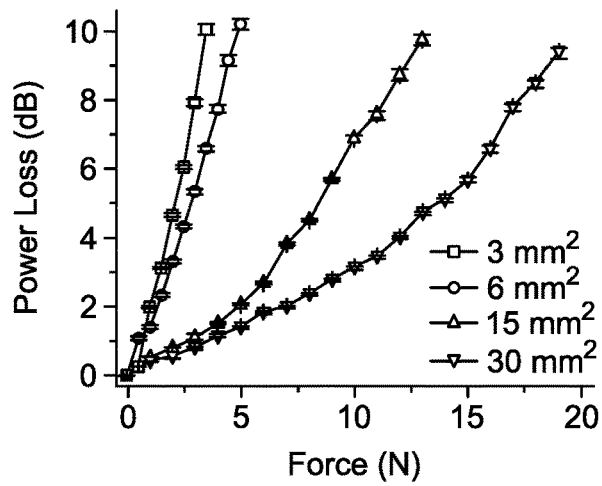

Bending: The waveguide in this embodiment has anisotropic optical transmission properties (FIG. 29B). The "top" of the waveguide core interface (indicated in FIG. 28A) is atomically smooth, while the "bottom" core interface has an RMS roughness of 6 nm due to demolding from a 3D printed surface. The result of this anisotropy is that the signal output in bending is different depending on the direction the sensor is bent. Bending towards the top surface (i.e., top is in compression, bottom is in tension) leads to a raise followed by a drop in output power, while bending toward the bottom surface, the output power decreases monotonically. Using this difference, it can be determined whether the sensor is being bent up or down. There is no anisotropy in bending side to side. The optical bending loss rate depends on curvature. The power output was measured during bending at uniform curvature up to k~200 m$^{-1}$. The output power loss vs. k shows a linear trend in the medium curvature range of 20-70 m$^{-1}$ and a sensitivity of 0.02 dB·m cm$^{-1}$. Although the sensing profile is non-linear, it is highly repeatable and precise, and thus easy to calibrate.

Pressing: Due to the low elastic moduli of the constituent elastomers, small forces exerted over the area of a fingertip can cause a large local deformation in the waveguide. This property was used to sense pressing, and tested the power output response to varying forces exerted externally. Results show acute pressing (e.g., DA<6 mm$^2$) causes a linear response in output power; however, blunt pressing (e.g., DA>15 mm$^2$) results in a non-linear response (FIG. 29C). These results mean the sensitivity of the waveguide can be changed by changing its dimensions to fit the working range of a particular application.

This compliant, stretchable waveguide shares the same material library as many commonly developed soft robots. It shows high linearity to elongation, bending and local pressing and is highly repeatable and precise. To demonstrate the capability of these waveguides for imparting sensation to soft robots, waveguides were incorporated into the fingers of a soft prosthetic hand.

3. Innervated Prosthetic Hand Design

Figure 30:
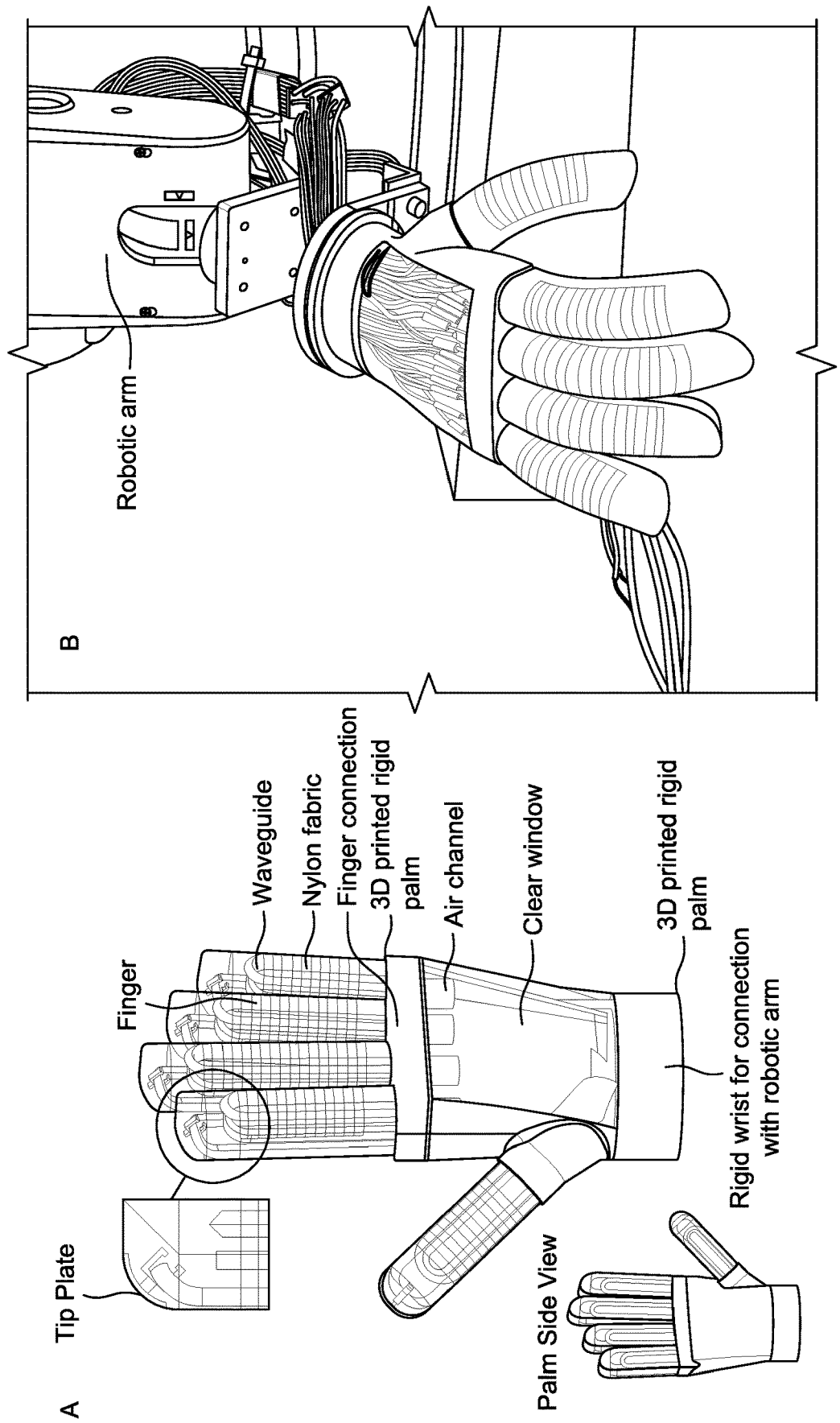
FIG. 30 is an innervated prosthetic hand, wherein (A) schematic of hand structure and components; (B) picture of the fabricated hand mounted on robotic arm with each finger actuated at ΔP=100 kPa.

The prosthetic hand is composed of four pneumatically actuated soft fingers and a thumb mounted onto a 3D-printed rigid palm (FIG. 30A). Each digit is a hollow silicone tube (outer diameter=18 mm, inner diameter=1 mm; FIG. 28E) with fibers patterned into the elastomer. Compressed air enters each finger through their hollow cores and the inflation pressure causes the fingers to bend and the hand to grasp.

Actuation: The fabric in the actuator was patterned to cause a finger-like motion upon pressurization. The nylon fabric is laser cut to be solid on one side and have slits on the other. This design is based on a mechanical model, where constraining circumferential strain during inflation causes more axial actuation and constraining one side of the elastomeric structure causes bending around that constraint. The slits allow for radial constraint while still allowing the gaps in between to stretch for actuation. FIG. 28E shows that the finger curves in between the slits, yet there is negligible circumferential bulging. On the palm side of the actuators (i.e., the neutral bending plane), there was no elongation due to the solid sheet of nylon.

Control: For the demonstration, a single air supply was used for all four fingers and the thumb and two solenoid valves (X-valve, Parker Hannifin Corporation) were used for each to control actuation: one for allowing flow into a finger (actuate) and the other to exhaust it (de-actuate). The on/off state of each valve was controlled to determine the pressure inside each finger and, thus, its motion. Though actuator control techniques are possible, "open loop" was used in this disclosure to focus on the importance of the stretchable waveguides for active sensation. To test the capabilities of the prosthetic hand, it was affixed to the end joint of a 5-DOF robotic arm (CRS CataLyst Express; FIG. 30B).

Sensing: To impart the sense of touch to the soft prosthetic, the photonic strain sensors were embedded into the actuators. In the demonstration, three waveguides were incorporated into each finger, where each is bent into a U-shape (towards the gravity-driven interface) so that LEDs can transmit light through the entirety of the actuators and the photodetectors can sense it on the other side (FIG. 28E). The photonic sensor located at the top of the actuator experiences the largest axial strain and thus the largest sensitivity to the bending motion. The second sensor was placed in the middle plane of the finger, which has medium axial strain, but also relays information about internal pressure.

Figure 31:
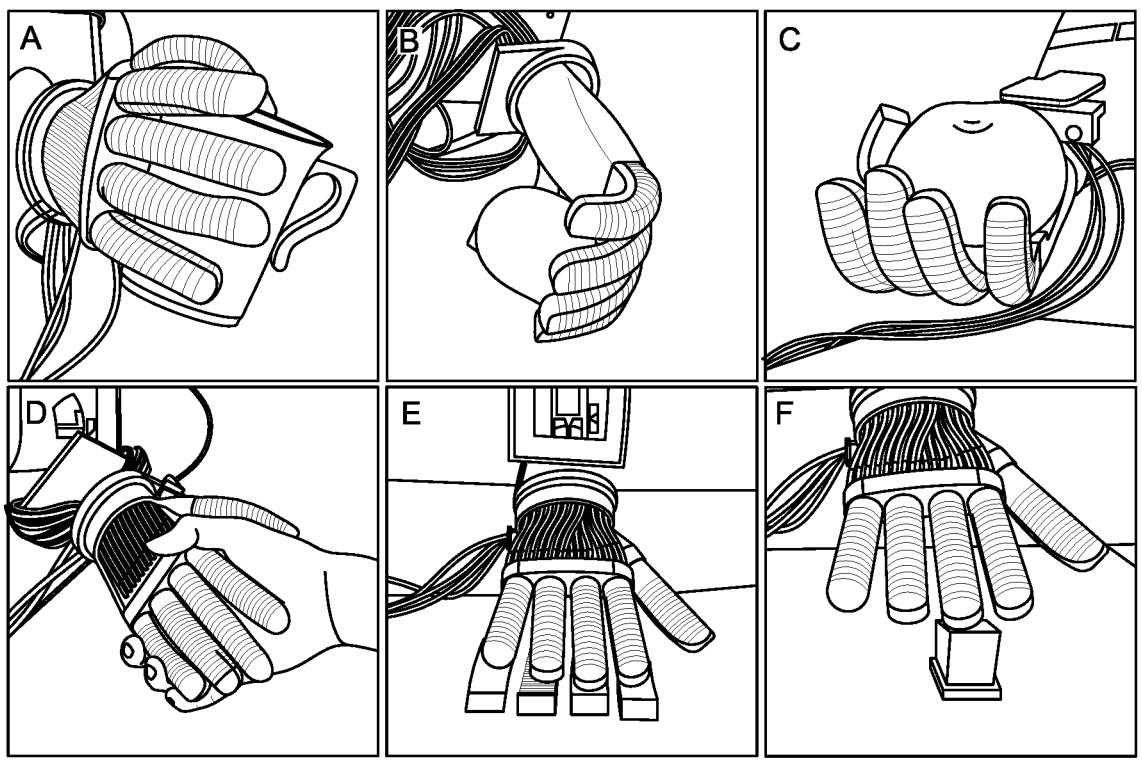
FIG. 31 illustrates capabilities of the hand, wherein (A) holding a coffee mug; (B) grasping a tomato with the palm facing down; (C) holding a tomato with palm facing up; (D) shaking with a human hand; (E) lateral scanning over surfaces to detect roughness and shape; and (F) probing the softness of a soft sponge using the middle finger.

The final waveguide serves as a touch sensor for the fingertip of the prosthetic hand; this isolated function was achieved by placing it at the neutral bending plane, where there is no axial strain. This photonic sensor is different from the other two sensors because it is longer and extends to the tip of the finger. The tip of the finger experiences no deformation while inflating and is used solely for detecting contact force when touching objects. In order to tune the external force sensing range of the prosthetic hand's fingertips, a stiff plate with a smaller contact area ($\Delta A \sim 2 \times 3$ mm$^2$) was integrated with the sensor into the fingertips to enhance the sensitivity (FIG. 31A). This force amplifying structure directly transmits external tip force to the waveguide.

4. Active Haptic Sensing Experiments

The soft prosthetic hand is a multifunctional one with both powerful motor capabilities (FIG. 31A, B, C) and versatile sensory ones (FIG. 31D, E, F). Each digit of the hand is capable of both proprioception (sensing internal pressure and active bending) and exteroception (sensing passive bending/conformation and external force at the fingertip). To demonstrate these capabilities, three experiments inspired by common tasks of the human hand were designed including: detecting shape and texture, probing softness and object recognition.

Figure 32:
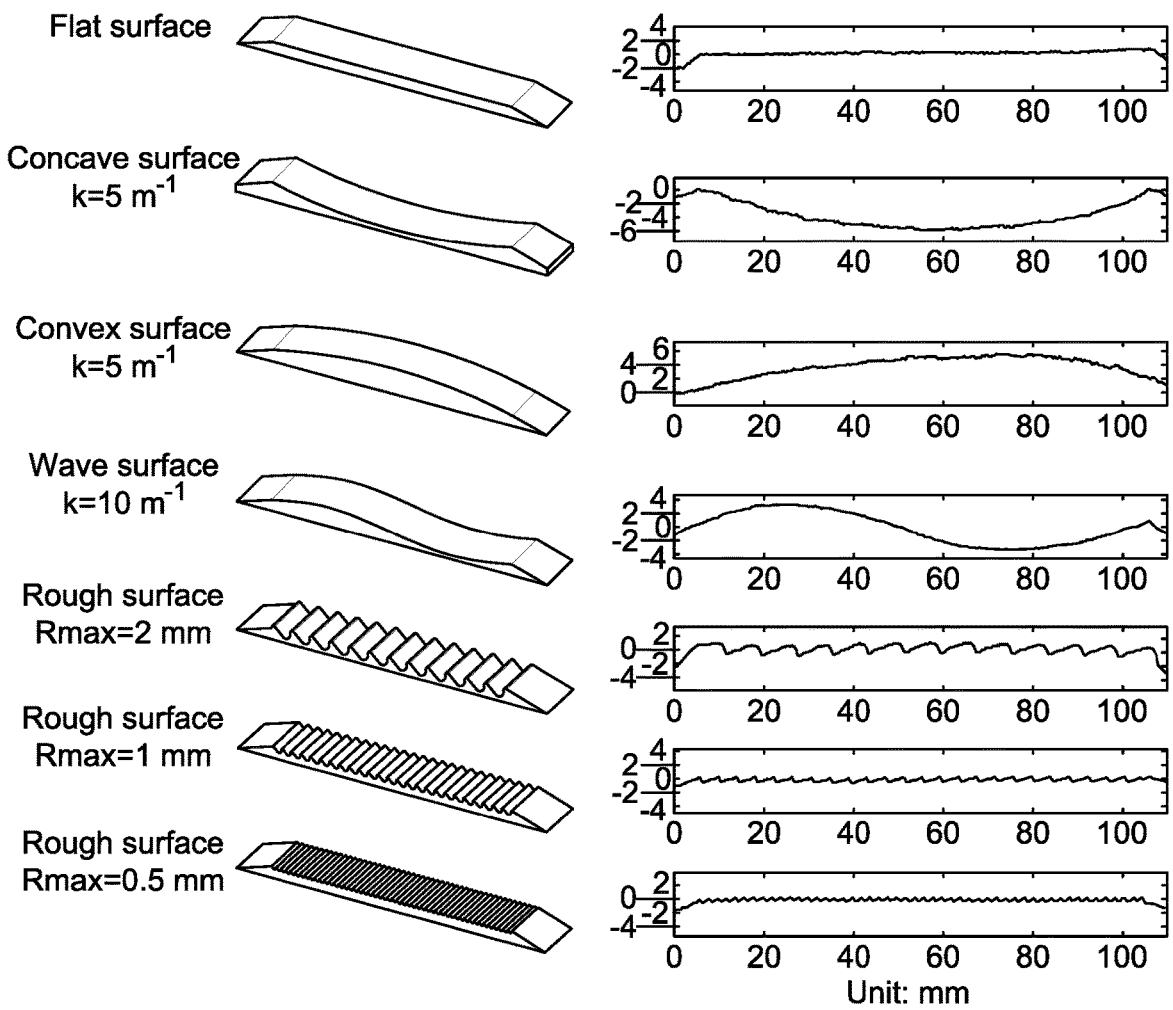
FIG. 32 shows shape and texture detection, wherein (A) seven surfaces of different shape and roughness and the reconstructed surfaces by the hand; (B) picture of the lateral scanning; (C) lateral scanning on a computer mouse; (D) mouse and the reconstructed shape.
Figure 32:
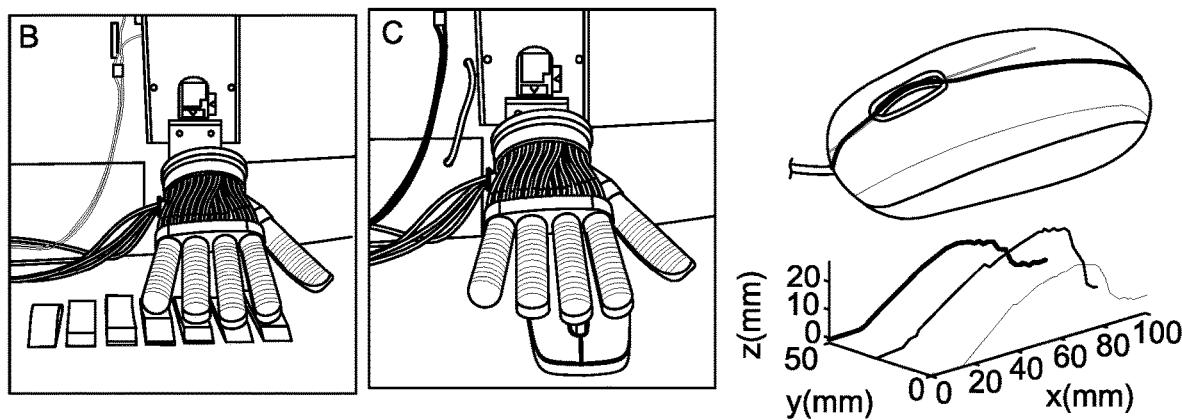

The most commonly used exploratory procedure for detecting roughness and shape of a surface by a human hand is lateral scanning. Using the robotic arm, the palm was guided, which serves as a fixed ground for each finger at its root, to conduct lateral scans at a fixed height over several surfaces to distinguish their shape and texture. The palm is oriented at a shallow angle (20°) with the surface so that each fingertip is touching the surface. When doing lateral scanning, the soft finger can be seen as a soft spring and the height of the point it is touching changes the states of the spring—the compression and the contact force. The contact force was used as a measurement of the surface height. The fingers were actuated at 100 kPa (~15 psi) to increase the stiffness of the "spring" so as to increase the sensitivity ($k=\Delta F/\Delta H$). As the fingers moved along the contoured surfaces, the tip force of the finger ($\Delta F$), measured by the bottom waveguide sensor, changed with the surface height ($\Delta H$). Seven different topographically patterned surfaces were 3D printed for the fingers to distinguish between (FIG. 32A, left). After a simple calibration using an inclined plane with known height and angle, the height profile of the seven surfaces (FIG. 32A, right) was reconstructed. From this data, it was observed that the hand could distinguish curves as small as 5 m$^{-1}$ and a roughness on the order of 100 microns. It also found that the hand can be used to reconstruct the shape of simple objects such as a computer mouse (FIG. 32C, D) including the scroll wheel and the click of the mouse buttons. Thus, a promising system for replicating shape and texture detection using stretchable, optical sensors with a soft hand was demonstrated.

Softness Detection

Figure 33:
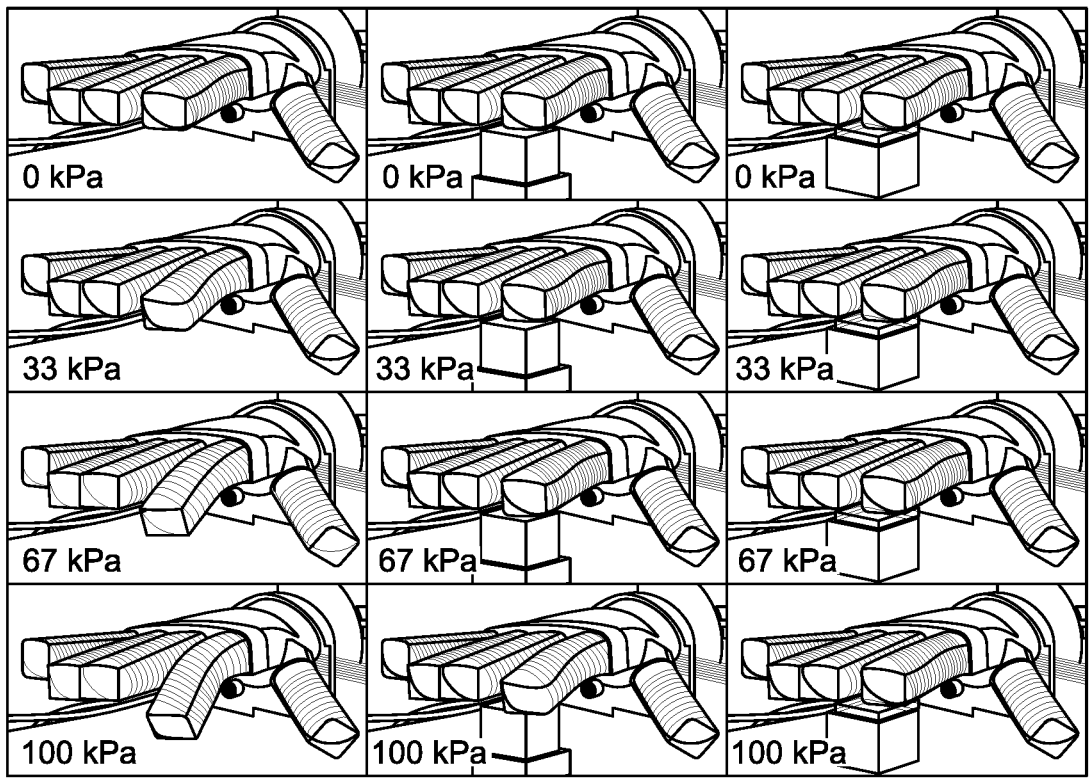
FIG. 33 shows softness detection, wherein (A) states of the softness detection at different air pressures for unblocked (right), sponge (middle) and acrylic (right); (B) model of softness detection; (C) force-curvature curves for different objects.
Figure 33:
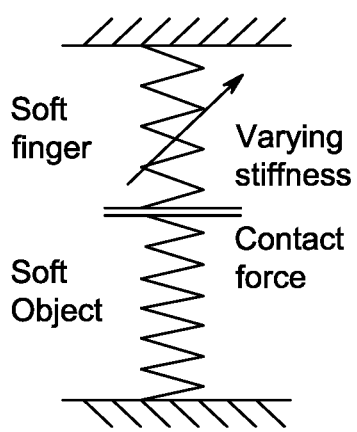
Figure 33:
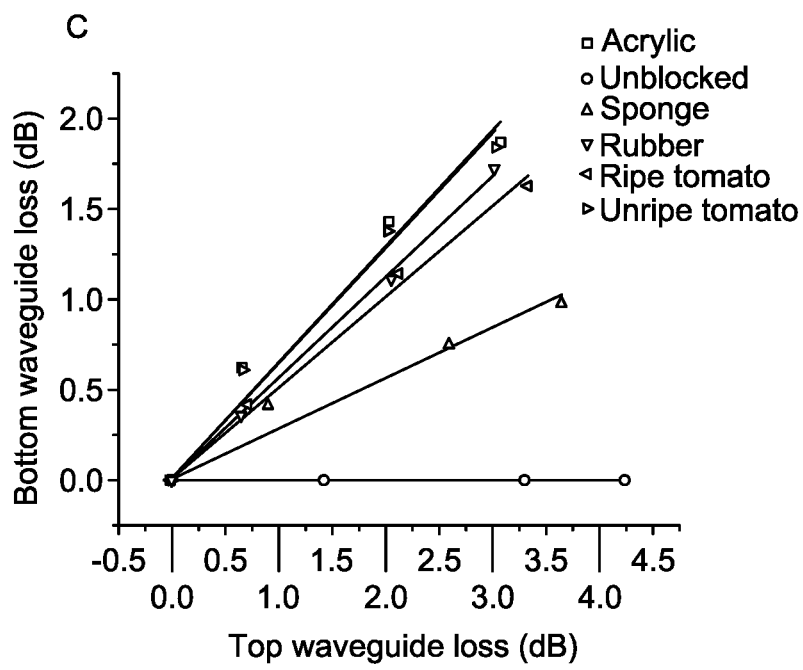

Along with shape and texture, the hand can detect the softness of objects. To demonstrate this capability, the soft hand was used to probe the softness of an unblocked (control) state along with five common materials/objects: acrylic, sponge, silicone rubber, a ripe tomato, and an unripe tomato. The softness was measured by positioning the tip of an unactuated (0 kPa) finger so that it was barely touching the top of the object to be measured. Readings of the tip force and the degree of bending were taken in the unactuated state as well as at varying internal pressures, indicated by the bottom waveguide power loss and the top waveguide power loss, respectively. FIG. 33A shows the index finger measuring softness of the unblocked state, sponge, and acrylic. The system, consisting of the finger and the material being probed, can be modeled as a two-spring system (FIG. 33B). By varying the stiffness of the finger (via the internal pressure, which is monitored by the middle waveguide power loss), a stress-strain curve was generated for each of the measured materials (FIG. 33C). The loss in the bottom waveguide is proportional to the contact force (thus stress) on the object while the loss in the top waveguide is proportional to its deformation (thus strain). Four states (0 kPa, 33 kPa, 67 kPa and 100 kPa) were taken for each object and fit it into a linear curve. The slope of these fitted lines is the selected indicator for the softness of the objects (larger slopes indicate harder objects). As expected, this figure shows the objects decreasing in softness in the following order: unblocked, sponge, rubber, ripe tomato, unripe tomato, acrylic. Note that the hand can distinguish the softness of an unripe tomato and the acrylic, mainly because of the big contrast between the object stiffness and the finger stiffness. Higher internal pressure is required for detecting very hard object to achieve a detectable position change. This result is similar to that of human's process of detecting softness. A large force was applied to detect a hard object and a gentle press for a soft one.

Object Recognition

In a final demonstration, shape and softness measurement were combined to select the ripest (softest) among a group of three tomatoes aligned in a row. First, the lateral-scanning, shape-reconstruction method was used to determine the location of three tomatoes. After determining their location, the index finger was positioned to measure their softness. The hand was able to locate and select the ripe (red) tomato based upon its softness. During the process of scanning and probing, a human-like gentle motion performed by the soft prosthetic hand was observed, without any risk of destroying the tomatoes.

III. Discussion

A soft prosthetic hand is disclosed with rich sensation realized via stretchable optical waveguides. This sensor outperforms other type of sensors in terms of accuracy and stretchability. The easy fabrication, low cost, chemical compatibility, and high repeatability of the developed stretchable waveguide sensors will benefit the soft robotic field. Also, it was demonstrated that soft prosthetic hands can not only perform dexterous manipulation, but also achieve various haptic sensing functions through innervation and control.

Other embodiments of the hand prototype are possible. First, sensory density can be greatly increased. Because waveguide sensors and the body of the actuator share the same material library, there is no fundamental limitation to incorporating more sensors to achieve more information of both proprioceptive and external. Next, the current low sensitivity mainly comes from the narrow power range from the LED (from the baseline power to ambient light power), and by using high-power laser diodes, sensitivity can get closer to that of human. Thirdly, more complex shapes can be designed for the waveguide distribution by utilizing the 3D printing technology. Finally, the waveguide sensor is a strain sensor based on geometric change. There is still coupling even though the waveguide was used as bending sensor, internal pressure sensor and fingertip force sensor by positioning them in different places of the actuator to decouple the signals. However, machine learning can be applied to decouple the versatile information gathered through repeatable, precise waveguide sensors. Fluidically powered actuators, combined with stretchable waveguide sensors, can produce the most practical anthropomorphic prosthetic hand in the future.

IV. Materials and Methods

Fabrication of waveguides. Mold for cladding was 3D printed using Objet in glossy mode. The mold was put in oven at 60° C. for 4 hours. Mold release was applied on the surface of the mold. ELASTOSIL M4601 part A and part B were mixed at a ratio of 1:1 using a planetary centrifugal mixer at speed of 2000 rpm for 30 s and the mixed pre-elastomer was poured into the mold for cladding and put in oven at 60° C. for 1 h for curing. The cured piece was demolded from the mold and laid flat on a tray. Vytaflex 20 part A and part B was mixed at a ratio of 1:1 using planetary centrifugal mixer at speed of 2000 rpm for 1 min and the mixed pre-elastomer was poured into the cured cladding piece within 10 min. The cladding with the uncured core was put on a hot plate at 70° C. for 1 h. After the core was cured, pre-elastomer of M4601 (prepared in the same way as the cladding piece) was poured onto the top of the core and cured in oven.

Figure 39:
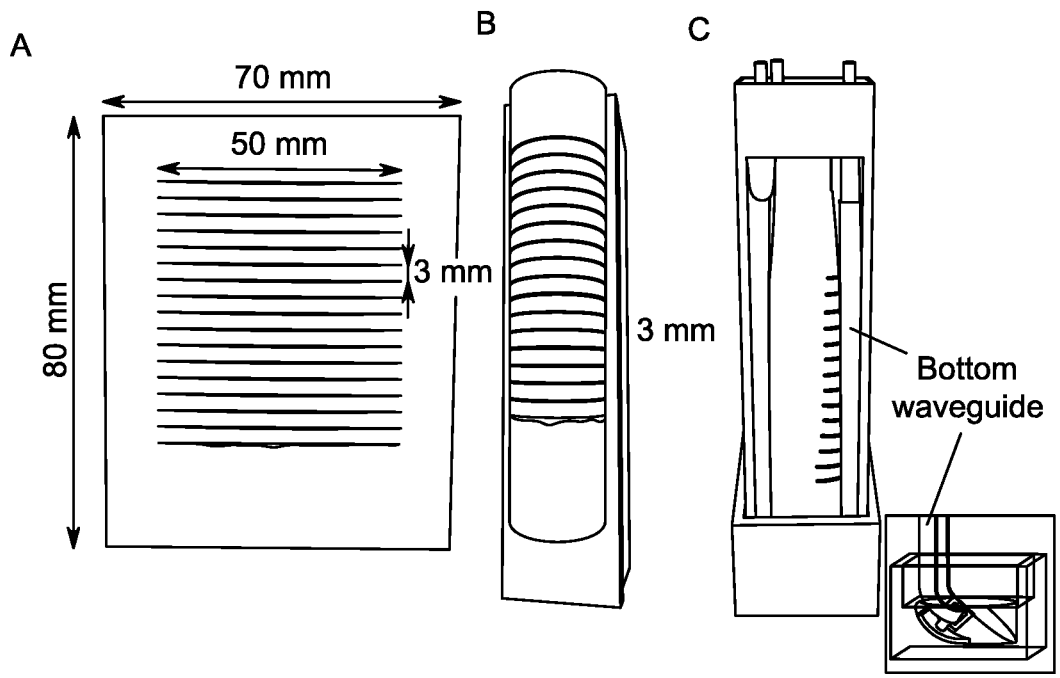
FIG. 39 shows nylon fabric and mold assembly, wherein (A) cut nylon fabric; (B) rolled nylon fabric; (C) waveguides and nylon fabric assembled into finger mold.

Fabrication of the innervate finger. Two shorter waveguides and one longer one was prepared in advance. Nylon fabric in a rectangular shape was cut slits using laser cutter (see FIG. 39). Three waveguides, nylon fabric and the finger molds were assembled together and the mold cap was put on (see FIG. 39). Pre-elastomers of Ecoflex 30 was poured into the mold. Finally, a thin steel spring wire was inserted into the mold through a thin hole on the mold cap. The assembly was put in oven at 60° C. for 30 min. The assembly was open and the steel wire was taken off and the cured finger was demolded. A tube was inserted from the end hole and a clamp was used to fasten the air inlet.

Characterization of materials. The refractive index of materials was measured using a Woollam Spectroscopic Ellipsometer using 30 mm×30 mm×3 mm samples. The absorbance of materials was measure using a Shimadzu UV-Vis-NIR Spectrometer. The mechanical tests were conducted on a Zwick tensile test machine. Surface roughness was measured using a MicroXAM optical profilometer.

Characterization Methods.

Elongation: two ends of the waveguide were fixed onto the two jaws of a bench vise and precisely rotated the screws to stretch the waveguide to different strains, and at the same time, the power loss was recorded. Bending: the waveguide was manipulated to conform to the laser cut acrylic arcs and recorded corresponding power loss. Pressing: the ends of the waveguide were fixed and it was laid flat on a scale, and a plate with a certain width was put onto the waveguide, and then different weights were put onto the plate and recorded the power loss for each weight. Then a plate was swathed with a different width and r the above process was repeated.

Data Acquisition and Procession

Figure 40:
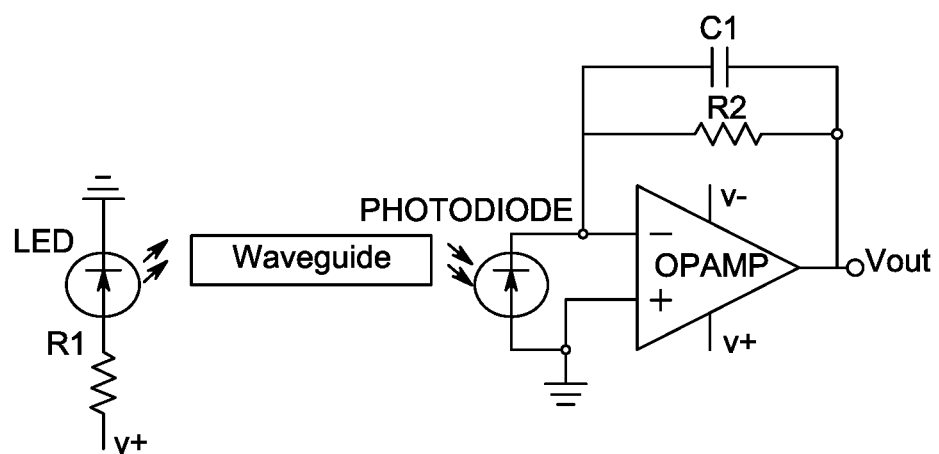
FIG. 40 shows a circuit for powering LED and amplifying photodiode current.
Figure 41:
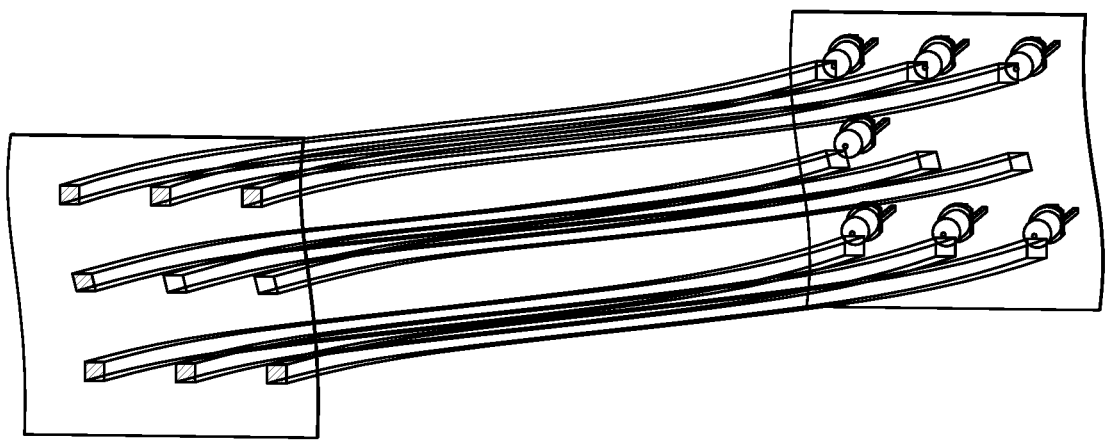
FIG. 41 shows an embodiment of a flexible display in accordance with the present disclosure.
Figure 42:
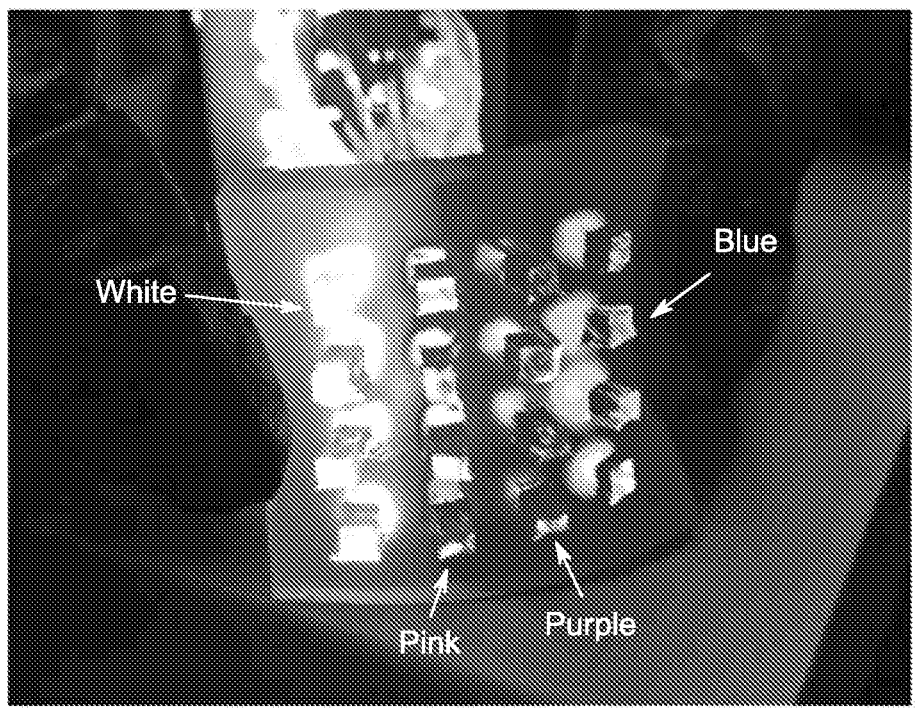
FIGS. 42-46 show a flexible display during operation.
Figure 43:
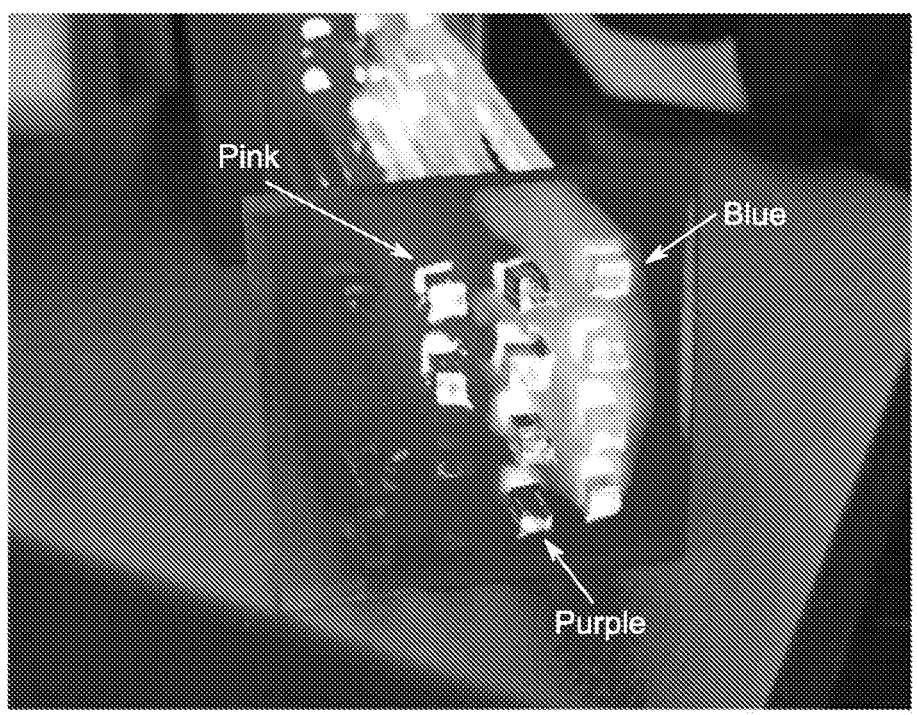
Figure 44:
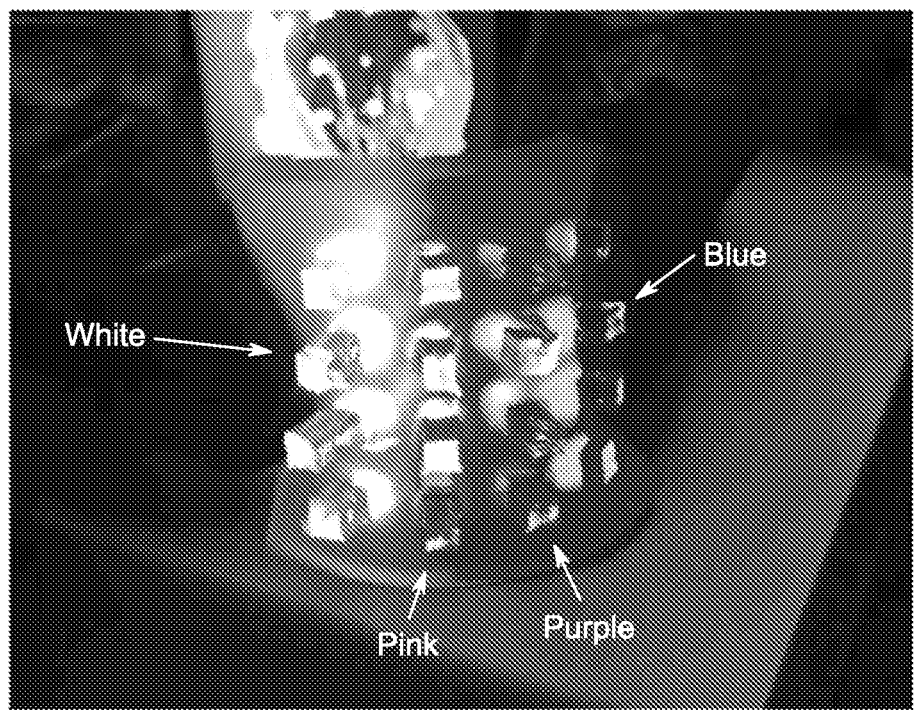
Figure 45:
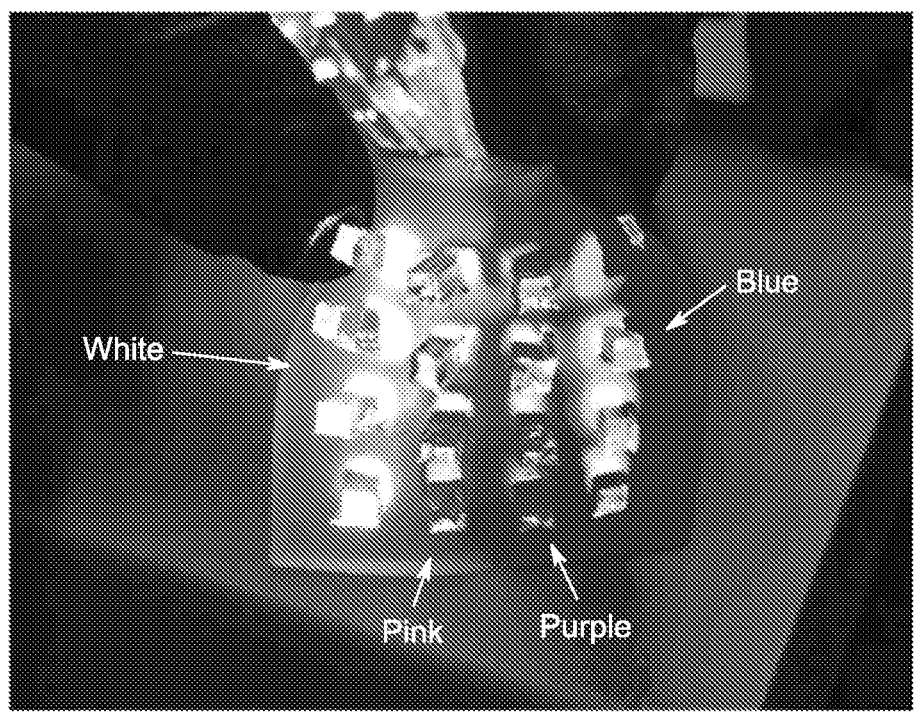
Figure 46:
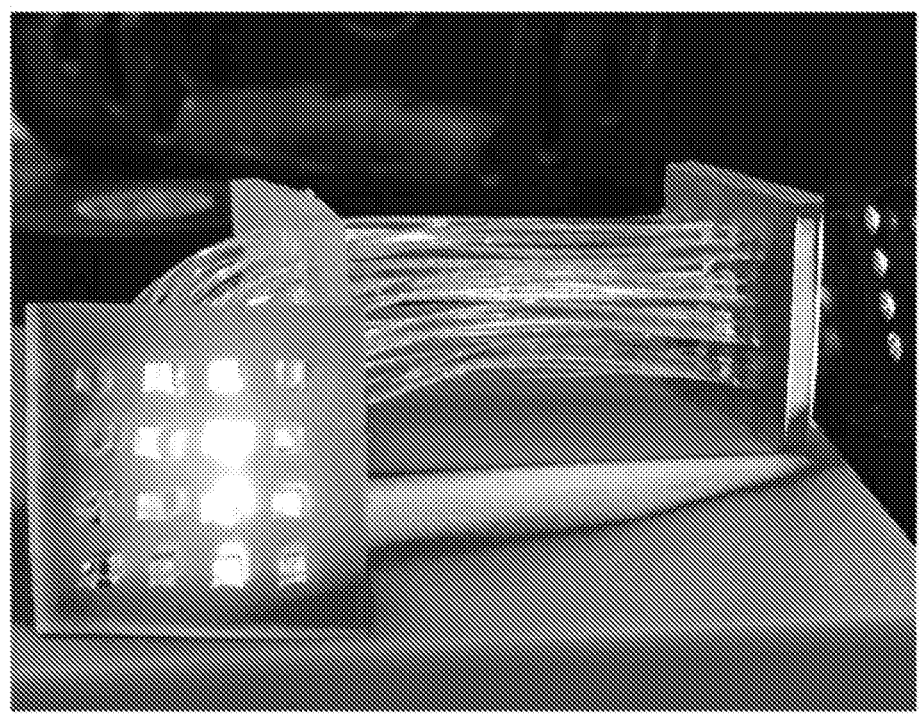

An LED was used as the light source and photodetector as the light sensor for the optical waveguides. Using current to voltage (UV) converter circuits (FIG. 40), the light power received at the photodetector was detected. Due to slight variations in manufacturing, some waveguides had higher intrinsic power loss than others. The resistance values for the LED and UV converter circuits were selected to adjust for these differences in transmissivity between waveguides. Smaller resistors were chosen for waveguides with low intrinsic losses, while bigger resistors were chosen for those with higher intrinsic losses. Also, lower resistance values were placed in series with the LEDs of waveguides with higher intrinsic losses. With appropriate resistor values selected (Table 1), each waveguide sensor produced a maximum voltage of approximately 5V. By measuring decreases in voltage the power loss of the sensors when stretched, bent, or touched was determined. Capacitance was chosen to be 4,700 pF to ensure low noise and fast speed.

The output voltage of the circuits was measured using 15 analog pins of an Arduino (Arduino MEGA 2560) Microcontroller, and the Arduino's serial port was used with baud rate of 9600 to collect data to computer. The data sampling frequency was approximately 60 Hz for 15 channels analog reading. This data was transmitted to MATLAB R2016, for further processing and plotting.

TABLE 4

Resistors, capacitors used in LED-photodiode circuits for waveguide

| Finger | Waveguide | $R_1$ (Ω) | $R_2$ (MΩ) | $C_1$ (pF) |
|---|---|---|---|---|
| Index | Top waveguide | 220 | 1 | 4700 |
| | Middle waveguide | 220 | 1 | 4700 |
| | Bottom waveguide | 220 | 2 | 4700 |
| Middle | Top waveguide | 100 | 2 | 4700 |
| | Middle waveguide | 100 | 2 | 4700 |
| | Bottom waveguide | 100 | 2 | 4700 |
| Ring | Top waveguide | 220 | 2 | 4700 |
| | Middle waveguide | 220 | 2 | 4700 |
| | Bottom waveguide | 47 | 2 | 4700 |
| Pinky | Top waveguide | 100 | 1 | 4700 |
| | Middle waveguide | 220 | 1 | 4700 |
| | Bottom waveguide | 100 | 1 | 4700 |
| Thumb | Top waveguide | 100 | 2 | 4700 |
| | Middle waveguide | 100 | 2 | 4700 |
| | Bottom waveguide | 100 | 1 | 4700 |

EXAMPLE 5

In addition to optical sensors, a system including stretchable waveguides can be used in a soft stretchable display. Arrays of stretchable waveguides can be fixed at two ends by flexible front and rear panels made of rubbery sheets (as shown in FIGS. 41-46). Light sources can be coupled to the waveguides at the rear panel. To display the original color of the source, the core material may need to be a transparent elastomer. Additional cladding of the waveguide is optional, as air has a sufficiently low refractive index (n~1.0) compared to elastomers (n~1.4 to 1.5). This mismatch in refractive index ensures a large acceptance angle, and therefore, the light sources have a selection from direct backlights, such as bundles of LEDs or projected lights, and whatever pattern formed by the light sources at the rear will be transmitted to the front display panel via these waveguides. By improving the density of the waveguides and incorporating control schemes, more sophisticated static/dynamic patterns can be displayed using this system.

The front and rear panels in the stretchable display can be made using a variety of elastomeric materials, such as silicones or polyurethanes. Other elastomeric materials can be used. These panels can serve as matrices that hold the waveguides in their relative positions and provide a stretchable substrate for the display. The front and rear panels can be adhered to the waveguides by chemical bonding or by physical forces. The panel material can determine the elasticity of the display.

Figure 47:
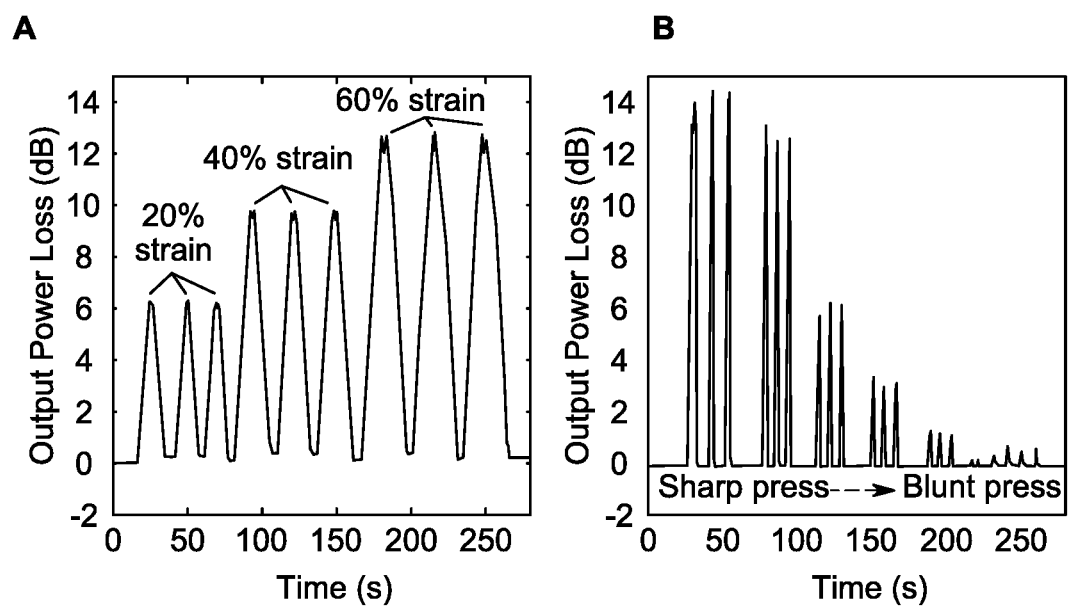
FIG. 47 shows repeatability tests. (A) Repeated elongation tests for a waveguide stretched to 20%, 40%, and 60% of its original length. (B) Repeated pressing tests for a waveguide being pressed to 5 N through plates of different areas.

As seen in FIGS. 42-46, light can be transmitted through the waveguide and displayed at the flexible panels even when bent. FIGS. 42-46 show that in addition to unicolor patterns, this display panel can output multiple colors in a squared matrix in response to a multiple color input. FIG. 47 suggests that, since the display is in part adopting similar principle of the stretchable waveguide sensor, it shares similar properties as those of the sensor. For example, while being strained or pressed, the output power loss follows similar trend.

Such a stretchable display can be used with soft machines and actuators where large deformations along the body occur. For example, these stretchable displays can be integrated to the skin of an underwater robotic octopus to actively display colors and body patterns for biomimetic camouflage implementations.

EXAMPLE 6

Embodiments disclosed here can be used as sensors. Different wavelengths can be used in the sensors to enable determination of where deformation is occurring along the fiber. The principle derives from this equation:

$$P_{out} = P_{in} e^{-\gamma * L}$$

where L is the total length of the fiber (e.g., waveguide or light guide) that changes in the case of an applied strain, $\gamma$ is the attenuation coefficient of the materials, which is wavelength dependent, and $\gamma(\lambda)$ is the wavelength dependent attenuation coefficient. $P_{in}$ is the power output of the light source (e.g., power input to the waveguide) and $P_{out}$ is the power output of the waveguide. With an appropriate difference in $\gamma$, the power output will vary with wavelength and the rates at which they fall off are non-linear in the fiber. Therefore, by looking at the difference in power outputs ($P_{in}$, $P_{out}$), the position along L where the strain occurred can be determined.

FIG. 48 is an illustration of the working principle of multi-wavelength sensor. In the diagram on the left, a broad spectrum light source is coupled into the stretchable light guide, and RGB lights are attenuated by different amount because of wavelength dependent attenuation coefficient. The middle diagram is an example of waveguide with light absorbing dyes. As the region with green light absorbing dyes is pressed, intensity of all RGB decreases, with power output of green light decreasing the most. The same principle explains the sensing of deformation in other dyed regions. Therefore, deformation sensing along the light guide is achieved.

For small differences in $\gamma$, light absorbing or scattering species (e.g., dyes or particles) can be added to enhance the differences in power output. The dyes or particles can be directly added to the core of the waveguide, such as by pasting a thin layer or imbibing via diffusion, or the dyes or particles can be mingled to the cladding for the same purpose.

The power output of the light source may be selected or may be based on the specifications of the light source. The power output of the waveguide for different wavelengths can be measured using color sensor. A spectrometer, semiconductor-based RGB color sensor, or other device can be used to determine behaviors of power output for different wavelengths of light. The spectrometer, semiconductor-based RGB color sensor, or other device can be connected to a controller to determine the location of the strain.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. An apparatus comprising:
an optical waveguide that includes at least two elastomer materials, the optical waveguide comprising a core and a cladding, wherein the elastomer materials are lossy and more light is lost to an environment as deformation of the optical waveguide increases, wherein ultimate elongation of the core and the cladding of the optical waveguide is greater than 50%.

2. The apparatus of claim 1, wherein the difference in refractive index is from 0.001 to 2.

3. The apparatus of claim 1, wherein the optical waveguide is entirely fabricated of the elastomer materials.

4. The apparatus of claim 1, wherein the optical waveguide is a step index multimode optical fiber.

5. The apparatus of claim 1, wherein the optical waveguide has a core/cladding interface roughness that includes features having dimensions from 1 nm to 500 nm.

6. The apparatus of claim 1, wherein the elastomer materials include synthetic rubbers, natural latex rubbers, or biodegradable materials.

7. The apparatus of claim 6, wherein one or more of the elastomer materials includes at least one functional group grafted onto at least one main chain of the elastomer material to modify optical properties of the core and/or the cladding.

8. The apparatus of claim 1, wherein the elastomer materials are polyurethane rubber and a silicone composite.

9. The apparatus of claim 1, wherein the optical waveguide further includes a coating around at least part of the optical waveguide, wherein the coating is configured to contain light within the light guide.

10. The apparatus of claim 9, wherein the optical waveguide and/or the coating is configured to be stretchable, non-metallic, crack-resistant, and includes a dopant with a high index of refraction.

11. The apparatus of claim 1, wherein the optical waveguide does not include a coating around at least part of the optical waveguide.

12. The apparatus of claim 1, wherein the optical waveguide defines a flat region or a disc-shaped region.

13. The apparatus of claim 1, further comprising:
a light source; and
a photodetector.

14. The apparatus of claim 13, wherein the light source is a light-emitting diode.

15. The apparatus of claim 13, wherein the optical waveguide, the light source, and the photodetector are configured for use in one or more of a strain sensor, a curvature sensor, or a force sensor.

16. A sensor comprising:
a light source;
a photodetector; and
a light guide disposed between the light source and the photodetector, wherein the light guide comprises at least one indent on an outer surface of the light guide, wherein a first point of the light guide is in optical communication with the light source and a second point of the light guide is in optical communication with the photodetector.

17. The sensor of claim 16, wherein the indent comprises a zebra crossing.

18. The sensor of claim 16, wherein the light guide is u-shaped or tube-shaped.

19. The sensor of claim 16, wherein the light source is a light-emitting diode.

20. The sensor of claim 16, wherein the light guide is a fiber optic wire.

21. The sensor of claim 16, wherein the light guide further includes a coating around at least part of the light guide, wherein the coating is configured to contain light within the light guide.

22. The sensor of claim 16, wherein the light guide comprises a plurality of the indents, and wherein each of the indents is from 0.5 mm to 4 mm in length and spaced at intervals from 0.5 mm to 4 mm.

23. The sensor of claim 16, wherein a depth of the indents from an outer surface of the light guide is from 100 nm to 1 mm.

24. The sensor of claim 16, wherein the sensor is configured to sense at least one of curvature, force, strain, elongation, or pressure.

25. A device comprising:
the sensor of claim 16; and
a soft actuator.

26. The device of claim 25, wherein the soft actuator completely encloses the light source, the photodetector, and the light guide.

27. The device of claim 25, wherein the light source is disposed in the soft actuator at a first end and the photodetector is disposed in the soft actuator at the first end.

28. The device of claim 27, wherein the light guide is u-shaped.

29. The device of claim 25, wherein the soft actuator defines a plurality of chambers.

30. A method comprising:
illuminating the optical waveguide of claim 1 with a light input at a first power level;
measuring light output from the optical waveguide, wherein the light output is at a second power level less than the first power level; and
determining a position on the optical waveguide where a strain was applied based on the first power level, second power level, total length of the optical waveguide, and an attenuation coefficient of material in the optical waveguide.

31. The method of claim 30, wherein the waveguide is a light guide comprising a light guide disposed between the light source and the photodetector, wherein the light guide defines at least one indent on an outer surface of the light guide, wherein a first point of the light guide is in optical communication with the light source and a second point of the light guide is in optical communication with the photodetector, and wherein the illuminating and measuring use the light source and a photodetector.

32. The sensor of claim 16, wherein the at least one indent on the outer surface of the light guide enables more light to be lost or not received by the photodetector as deformation of the light guide increases.

33. The sensor of claim 16, wherein light guide is configured to bend in a direction to close at the least one indent.

34. The sensor of claim 16, wherein the orientation of the at least one indent comprises toward a bending direction, opposite to a bending direction, or any other orientations therebetween.

35. The sensor of claim 16, wherein the at least one indent is positioned in at least part of a cladding layer of the light guide.

36. The sensor of claim 16, wherein the at least one indent is formed by engraving, sand blasting, bead blasting, tooling, grinding, or acid etching on the outer surface of the light guide.

37. The sensor of claim 16, wherein the light guide comprise regular or irregular roughening pattern on the surface of the light guide.

38. The apparatus of claim 1, wherein the waveguide comprises anisotropic roughness on an outer surface of the optical waveguide or an interface between the core and the cladding of the optical waveguide.

39. The apparatus of claim 1, wherein the waveguide is configured to measure deformations comprising elongation.

40. The apparatus of claim 1, wherein the core is made from a first elastomer material of the at least two elastomer materials, and the cladding is made from a second elastomer material of the at least two elastomer materials.

* * * * *